(12) United States Patent
Yan

(10) Patent No.: US 11,102,844 B2
(45) Date of Patent: Aug. 24, 2021

(54) POLICY CONTROL METHOD, DEVICE, AND SYSTEM

(71) Applicant: HUAWEI TECHNOLOGIES CO., LTD., Guangdong (CN)

(72) Inventor: Yali Yan, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 6 days.

(21) Appl. No.: 16/825,537

(22) Filed: Mar. 20, 2020

(65) Prior Publication Data
US 2020/0221541 A1 Jul. 9, 2020

Related U.S. Application Data

(63) Continuation of application No. PCT/CN2019/090433, filed on Jun. 6, 2019.

(30) Foreign Application Priority Data

Sep. 19, 2018 (CN) .......................... 201811096126.8
Oct. 31, 2018 (CN) .......................... 201811288799.3

(51) Int. Cl.
*H04W 80/10* (2009.01)
*H04W 76/11* (2018.01)
(Continued)

(52) U.S. Cl.
CPC .......... *H04W 80/10* (2013.01); *H04M 15/66* (2013.01); *H04W 48/16* (2013.01); *H04W 48/18* (2013.01); *H04W 76/11* (2018.02)

(58) Field of Classification Search
CPC ..... H04W 80/10; H04W 76/00; H04W 76/11; H04W 67/14; H04W 15/66; H04W 48/16; H04W 48/18
(Continued)

(56) References Cited

U.S. PATENT DOCUMENTS

2016/0112896 A1* 4/2016 Karampatsis ..... H04W 28/0289
370/230.1
2017/0359768 A1 12/2017 Byun et al.
(Continued)

FOREIGN PATENT DOCUMENTS

CN 108401275 A 8/2018

OTHER PUBLICATIONS

3GPP TS 23.501 V153.0 (Sep. 2018), "3rd Generation Partnership Project;Technical Specification Group Services and System Aspects; System Architecture for the 5G System; Stage 2 (Release 15)," Sep. 2018, 226 pages.
(Continued)

*Primary Examiner* — Mong-Thuy T Tran
(74) *Attorney, Agent, or Firm* — Fish & Richardson P.C.

(57) ABSTRACT

Embodiments of this application provide a policy control method, device, and system. The method includes: sending, by a mobility management network element to a first session management network element, a first request message used to create a first session, where the first request message includes an identifier of a terminal, single network slice selection assistance information (S-NSSAI), and a data network name (DNN); receiving, by the first session management network element, the first request message from the mobility management network element, and sending a second request message to a binding support network element, where the second request message includes the identifier of the terminal, the S-NSSAI, and the DNN; and receiving, by the first session management network element, an identifier of a policy control network element from the binding support network element, and selecting the policy control network element based on the identifier of the policy control network element.

16 Claims, 20 Drawing Sheets

(51) Int. Cl.
   *H04M 15/00* (2006.01)
   *H04W 48/16* (2009.01)
   *H04W 48/18* (2009.01)

(58) Field of Classification Search
   USPC .......................................................... 370/329
   See application file for complete search history.

(56) References Cited

U.S. PATENT DOCUMENTS

| | | | |
|---|---|---|---|
| 2019/0053104 A1* | 2/2019 | Qiao | H04L 47/20 |
| 2020/0120487 A1* | 4/2020 | Tang | H04L 12/1407 |
| 2020/0145953 A1* | 5/2020 | Youn | H04W 60/04 |
| 2020/0187106 A1* | 6/2020 | Salkintzis | H04W 48/00 |
| 2021/0029046 A1* | 1/2021 | Mas Rosique | H04L 12/1407 |
| 2021/0076250 A1* | 3/2021 | Wang | H04W 72/087 |
| 2021/0120596 A1* | 4/2021 | Youn | H04W 28/02 |

OTHER PUBLICATIONS

3GPP TS 23.502 V153.0 (Sep. 2018), "3rd Generation Partnership Project;Technical Specification Group Services and System Aspects; Procedures for the 5G System; Stage 2 (Release 15)," dated Sep. 2018, 329 pages.
3GPP TS 23.503 V15.3.0 (Sep. 2018), "3rd Generation Partnership Project;Technical Specification Group Services and System Aspects; Policy and Charging Control Framework for the 5G System; Stage 2 (Release 15)," Sep. 2018, 69 pages.
3GPP TS 29.501 V15.0.1 (Jul. 2018), "3rd Generation Partnership Project;Technical Specification Group Core Network and Terminals; 5G System; Principles and Guidelines for Services Definition; Stage 3 (Release 15)," Jul. 2018, 55 pages.
3GPP TS 29.521 V15.0.0 (Jun. 2018), "3rd Generation Partnership Project;Technical Specification Group Core Network and Terminals; 5G System; Binding Support Management Service; Stage 3 (Release 15)," Jun. 2018, 19 pages.
Cisco, "BSF storing the selected PCF Address in UDR structured data should be optional," 3GPP TSG-SA2 Meeting #125, S2-180076, Guttenburg, Sweden, Jan. 22-26, 2018, 2 pagese; Stage 3 (Release 15), Jun. 2018, 19 pages.
Huawei, HiSilicon, "Cleanup to PCF selection in AMF and SMF," 3GPP TSG-SA WG2 Meeting #127, S2-183332, Sanya, China, Apr. 16-20, 2018, 23 pages.
PCT International Search Report and Written Opinion issued in International Application No. PCT/CN2019/090433 dated Aug. 2, 2019, 12 pages (partial English translation).
3GPP TS 29.513 V15.1.0 (Sep. 2018), "3rd Generation Partnership Project; Technical Specification Group Core Network and Terminals; 5G System; Policy and Charging Control signalling flows and QoS parameter mapping; Stage 3 (Release 15)," Sep. 2018, 69 pages.
Extended European Search Report issued in European Application No. 19861348.1 dated Dec. 17, 2020, 10 pages.

\* cited by examiner

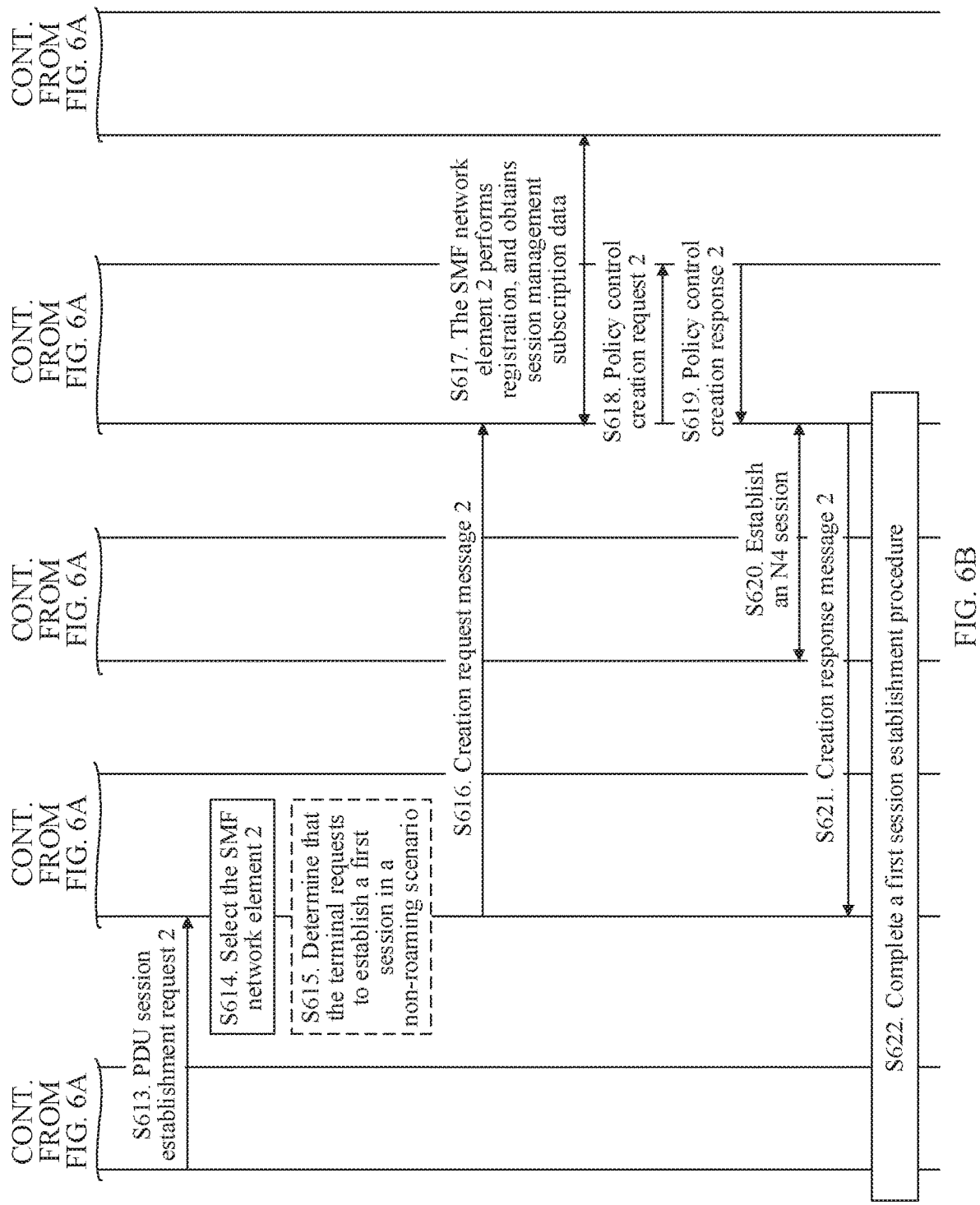

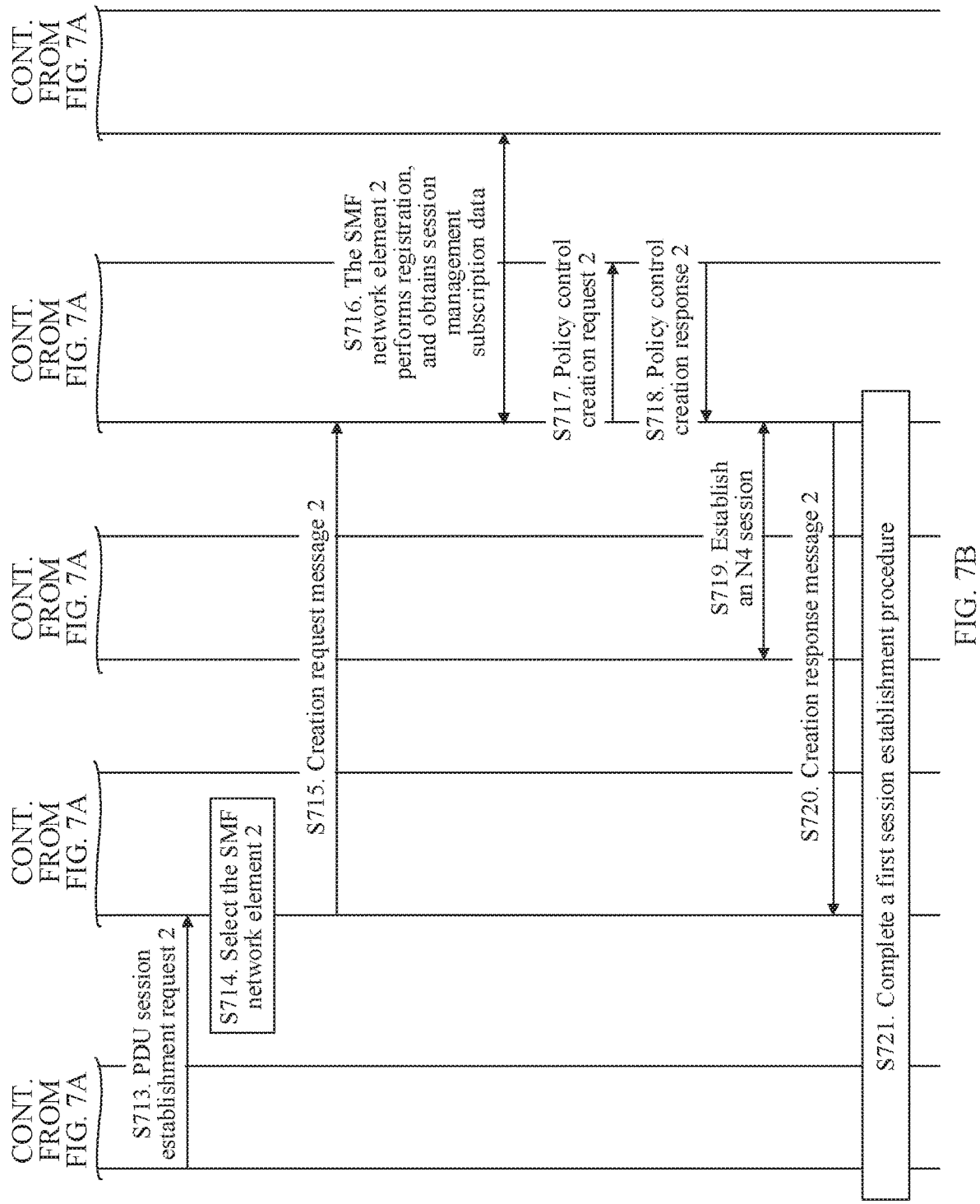

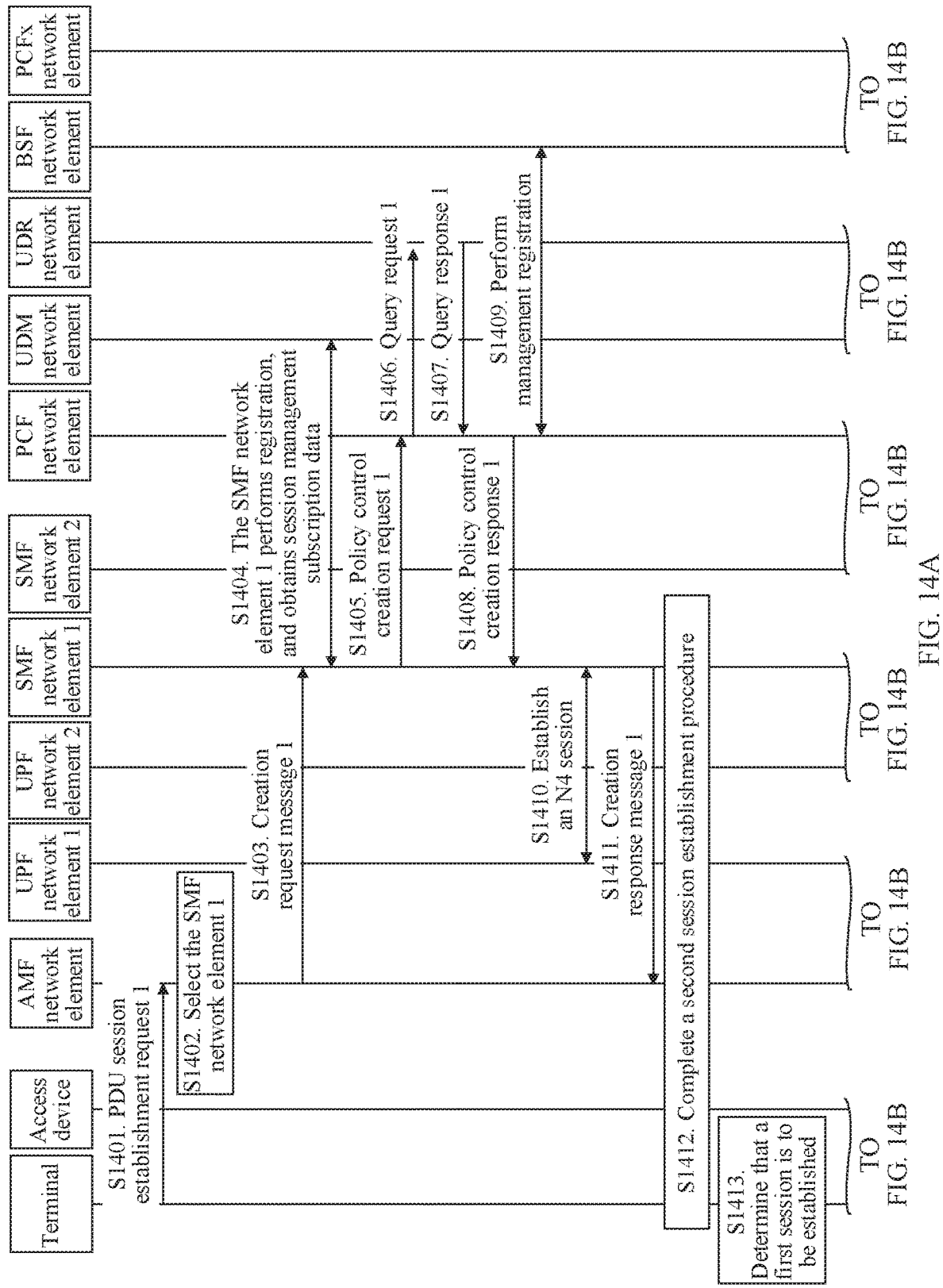

POLICY CONTROL METHOD, DEVICE, AND SYSTEM

CROSS-REFERENCE TO RELATED APPLICATIONS

This application is a continuation of International Patent Application No. PCT/CN2019/090433, filed on Jun. 6, 2019, which claims priority to Chinese Patent Application No. 201811096126.8, filed on Sep. 19, 2018, and Chinese Patent Application No. 201811288799.3, filed on Oct. 31, 2018, all of which are hereby incorporated by reference in their entireties.

TECHNICAL FIELD

This application relates to the field of communications technologies, and in particular, to a policy control method, a device, and a system.

BACKGROUND

In an existing 5th generation (5G) network, in a procedure in which a terminal requests to establish a plurality of protocol data unit (PDU) sessions having same single network slice selection assistance information (S-NSSAI) and a same data network name (DNN), for different PDU sessions, an access and mobility management function (AMF) network element selects different session management function (SMF) network elements, and different SMF network elements select different policy control function (PCF) network elements, to obtain a policy and charging control (PCC) rule and another PDU session-related policy from a corresponding PCF network element.

However, the PCF network element formulates the PCC rule and the another PDU session-related policy based on subscription information obtained from a unified data repository (UDR) network element. The subscription information may include, for example, a maximum guaranteed bandwidth that is allowed to be authorized by the PCF to the terminal, or remaining usage that is authorized by the PCF network element to the terminal. In this case, a plurality of PCF network elements each make a policy decision based on the subscription information. Consequently, a conflict between the subscription information and policies formulated for a plurality of PDU sessions of a same terminal that have same S-NSSAI and a same DNN may be caused. For example, a total maximum guaranteed bandwidth authorized to the plurality of PDU sessions of the same terminal that have the same S-NSSAI and the same DNN exceeds the maximum guaranteed bandwidth that is allowed to be authorized by the PCF network element to the terminal in the subscription information, or a total amount of accumulated usage for the plurality of PDU sessions of the same terminal that have the same S-NSSAI and the same DNN exceeds an amount of the remaining usage that is authorized by the PCF network element to the terminal in the subscription information.

Therefore, how to avoid the conflict between the policies formulated for the plurality of PDU sessions of the same terminal that have the same S-NSSAI and the same DNN and the subscription information obtained from the UDR network element is an urgent problem to be resolved currently.

SUMMARY

Embodiments of this application provide a policy control method, a device, and a system, to avoid a conflict between policies formulated for a plurality of PDU sessions of a same terminal that have same S-NSSAI and a same DNN and subscription information obtained from a unified data repository network element.

To achieve the foregoing objective, the following technical solutions are used in the embodiments of this application.

According to a first aspect, a policy control method is provided. The method includes: sending, by a mobility management network element to a first session management network element, a first request message used to create a first session, where the first request message includes an identifier of a terminal, single network slice selection assistance information S-NSSAI, and a data network name DNN; receiving, by the first session management network element, the first request message from the mobility management network element, and sending a second request message to a binding support network element, where the second request message includes the identifier of the terminal, the S-NSSAI, and the DNN; and receiving, by the first session management network element, an identifier of a policy control network element from the binding support network element, and selecting the policy control network element based on the identifier of the policy control network element. According to the policy control method provided in this embodiment of this application, the mobility management network element may send, to the first session management network element, the first request message used to create the first session, and the first request message includes the identifier of the terminal, the S-NSSAI, and the DNN. Therefore, the first session management network element may obtain the corresponding identifier of the policy control network element from the binding support network element based on the identifier of the terminal, the S-NSSAI, and the DNN, and select the policy control network element based on the identifier of the policy control network element. The policy control network element may be a policy control network element corresponding to a second session. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, before the sending, by a mobility management network element, the first request message to a first session management network element, the method further includes: determining, by the mobility management network element, that the first session has the same S-NSSAI and the same DNN as an established second session of the terminal, where correspondingly, the first request message further includes indication information, and the indication information is used to instruct the first session management network element to obtain the identifier of the policy control network element from the binding support network element; or the indication information is used to indicate that a session that is of the terminal and that has the same S-NSSAI and the same DNN as the first session is established; or the indication information is used to indicate that the first session has corresponding binding information. In other words, in this embodiment of this application, after determining that the first session has the same S-NSSAI and the same DNN as the established second session of the terminal, the mobility management network element may add the indication information to the first request message sent to the first session management network element, so that the first session management network element may obtain the identifier of the policy control network element from the binding support network element.

In a possible design, before the sending, by a mobility management network element, a first request message to a first session management network element, the method further includes: determining, by the mobility management network element, that the terminal establishes the first session in a non-roaming scenario or a home routing scenario.

In a possible design, the method further includes: in a process of establishing the second session, selecting, by the second session management network element, the policy control network element, and sending a registration request to the binding support network element, where the registration request includes the identifier of the terminal, the S-NSSAI, the DNN, and the identifier of the policy control network element. In this case, the binding support network element may store a correspondence between the identifier of the policy control network element and a combination of the identifier of the terminal, the S-NSSAI, and the DNN, so that subsequently, the binding support network element may determine, based on the correspondence, the identifier that is of the policy control network element and that corresponds to the identifier of the terminal, the S-NSSAI, and the DNN.

According to a second aspect, a policy control method is provided. The method includes: determining, by a mobility management network element, that a first session that is of a terminal and that is being established has same single network slice selection assistance information S-NSSAI and a same data network name DNN as an established second session of the terminal; sending, by the mobility management network element to a first session management network element, a first request message used to create the first session, where the first request message includes an identifier of the terminal, the S-NSSAI, the DNN, and indication information, and the indication information is used to instruct the first session management network element to obtain an identifier of a policy control network element from a binding support network element; or the indication information is used to indicate that a session that is of the terminal and that has the same S-NSSAI and the same DNN as the first session is established; or the indication information is used to indicate that the first session has corresponding binding information. According to the policy control method provided in this embodiment of this application, the mobility management network element may send, to the first session management network element, the first request message used to create the first session, and the first request message includes the identifier of the terminal, the S-NSSAI, and the DNN. Therefore, the first session management network element may obtain the corresponding identifier of the policy control network element from the binding support network element based on the identifier of the terminal, the S-NSSAI, the DNN, and the indication information, and select the policy control network element based on the identifier of the policy control network element. The policy control network element may be a policy control network element corresponding to the second session. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the determining, by a mobility management network element, that a first session that is of a terminal and that is being established has the same S-NSSAI and the same DNN as an established second session of the terminal is specifically: determining, by the mobility management network element based on at least one of subscription data of the terminal, an operator policy, and a session establishment request from the terminal, that the first session that is of the terminal and that is being established has the same S-NSSAI and the same DNN as the established second session of the terminal.

In a possible design, before the sending, by the mobility management network element, the first request message to a first session management network element, the method further includes: determining, by the mobility management network element, that the terminal establishes the first session in a non-roaming scenario or a home routing scenario.

According to a third aspect, a policy control method is provided. The method includes: determining, by a network device, that a first session that is of a terminal and that is being established has same single network slice selection assistance information S-NSSAI and a same data network name DNN as an established second session of the terminal; and sending, by the network device to a first session management network element corresponding to the first session, an identifier of a policy control network element selected by a second session management network element corresponding to the second session, where the identifier of the policy control network element is used by the first session management network element to select the policy control network element. According to the policy control method provided in this embodiment of this application, after determining that the first session that is of the terminal and that is being established has the same S-NSSAI and the same DNN as the established second session of the terminal, the network device sends, to the first session management network element, the identifier of the policy control network element selected by the second session management network element corresponding to the second session, so that the second session management network element can select the corresponding policy control network element based on the identifier of the policy control network element. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the method further includes: receiving, by the network device, the identifier of the policy control network element from the second session management network element in a process of establishing the second session.

In a possible design, the network device is a unified data management network element, and the method further includes: sending, by the unified data management network element, a subscription request for a binding information change notification to a unified data repository network element in a process of establishing the second session; and receiving, by the unified data management network element, the binding information change notification from the unified data repository network element, where the binding information change notification includes the identifier that is of the policy control network element and that corresponds to an identifier of the terminal, the S-NSSAI, and the DNN. According to this solution, the unified data management network element may obtain the identifier that is of the policy control network element and that corresponds to the identifier of the terminal, the S-NSSAI, and the DNN.

In a possible design, the method further includes: storing, by the network device, a correspondence between the identifier of the policy control network element and a combination of the identifier of the terminal, the S-NSSAI, and the DNN. In this case, the network device may subsequently determine, based on the correspondence, the identifier that is of the policy control network element and that corresponds to the identifier of the terminal, the S-NSSAI, and the DNN.

In a possible design, before the sending, by the network device, an identifier of the policy control network element to the first session management network element, the method further includes: determining, by the network device, the identifier of the policy control network element based on the identifier of the terminal, the S-NSSAI, the DNN, and the correspondence.

In a possible design, the network device is a unified data management network element, and before the sending, by the network device, an identifier of a policy control network element to a first session management network element, the method further includes: sending, by the unified data management network element, a request message to a unified data repository network element, where the request message includes an identifier of the terminal, the S-NSSAI, and the DNN; and receiving, by the unified data management network element from the unified data repository network element, the identifier that is of the policy control network element and that corresponds to the identifier of the terminal, the S-NSSAI, and the DNN. According to this solution, the unified data management network element may obtain the identifier that is of the policy control network element and that corresponds to the identifier of the terminal, the S-NSSAI, and the DNN.

In a possible design, before the sending, by the network device, an identifier of the policy control network element to the first session management network element, the method further includes: determining, by the network device, that the terminal establishes the first session in a non-roaming scenario or a home routing scenario.

In a possible design, the network device is a mobility management network element, and the determining, by a network device, that a first session that is of a terminal and that is being established has the same S-NSSAI and the same DNN as an established second session of the terminal is specifically: determining, by the mobility management network element based on at least one of subscription data of the terminal, an operator policy, and a session establishment request from the terminal, that the first session that is of the terminal and that is being established has the same S-NSSAI and the same DNN as the established second session of the terminal.

In a possible design, the network device is a mobility management network element, and the method further includes: sending, by the mobility management network element, indication information to the first session management network element, where the indication information is used to indicate that the policy control network element corresponding to the identifier of the policy control network element is a policy control network element selected by a session management network element; or the indication information is used to instruct the first session management network element to select the policy control network element corresponding to the identifier of the policy control network element; or the indication information is used to indicate that the first session has corresponding binding information. In this case, the first session management network element may select, based on the indication information, the policy control network element corresponding to the identifier of the policy control network element.

In a possible design, the network device is a mobility management network element, and the method further includes: adding, by the mobility management network element, the identifier of the policy control network element to a special field, where the special field is used to indicate that the policy control network element corresponding to the identifier of the policy control network element is a policy control network element selected by a session management network element. In this case, the first session management network element may select, based on the field that carries the identifier of the policy control network element, the policy control network element corresponding to the identifier of the policy control network element.

In a possible design, the network device is a unified data management network element, and before the determining, by a network device, that a first session that is of a terminal and that is being established has the same S-NSSAI and the same DNN as an established second session of the terminal, the method further includes: receiving, by the unified data management network element, a registration request from the first session management network element, where the registration request includes the identifier of the terminal, the S-NSSAI, and the DNN; and correspondingly, the determining, by a network device, that a first session that is of a terminal and that is being established has the same S-NSSAI and the same DNN as an established second session of the terminal is specifically: determining, by the unified data management network element based on the identifier of the terminal, the S-NSSAI, and the DNN, that the first session that is of the terminal and that is being established has the same S-NSSAI and the same DNN as the established second session of the terminal. According to this solution, the network device may determine that the first session that is of the terminal and that is being established has the same S-NSSAI and the same DNN as the established second session of the terminal.

According to a fourth aspect, a policy control method is provided. The method includes: receiving, by a first session management network element from a mobility management network element, a first request message used to create a first session, where the first request message includes an identifier of a terminal, single network slice selection assistance information S-NSSAI, and a data network name DNN; sending, by the first session management network element, a second request message to a binding support network element, where the second request message includes the identifier of the terminal, the S-NSSAI, and the DNN, and is used to request a corresponding identifier of a policy control network element, the policy control network element is a policy control network element corresponding to a second session, and the second session is an established session that is of the terminal and that has the same S-NSSAI and the same DNN as the first session; and receiving, by the first session management network element, the identifier of the policy control network element from the binding support network element, and selecting the policy control network element based on the identifier of the policy control network element. According to the policy control method provided in this embodiment of this application, the mobility management network element may send, to the first session management network element, the first request message used to create the first session, and the first request message includes the identifier of the terminal, the S-NSSAI, and the DNN. Therefore, the first session management network element may obtain the corresponding identifier of the policy control network element from the binding support network element based on the identifier of the terminal, the S-NSSAI, and the DNN, and select the policy control network element based on the identifier of the policy control network element. The policy control network element may be the policy control network element corresponding to the second session. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the first request message further includes indication information, and the indication information is used to instruct the first session management network element to obtain the identifier of the policy control network element from the binding support network element; or the indication information is used to indicate that a session that is of the terminal and that has the same S-NSSAI and the same DNN as the first session is established; or the indication information is used to indicate that the first session has corresponding binding information. In other words, in this embodiment of this application, the mobility management network element may add the indication information to the first request message sent to the first session management network element, so that the first session management network element may obtain the identifier of the policy control network element from the binding support network element based on the indication information based on the indication information.

In a possible design, before the sending, by the first session management network element, a second request message to a binding support network element, the method may further include: sending, by the first session management network element, a registration request to a unified data management network element, where the registration request includes the identifier of the terminal, and single network slice selection assistance information S-NSSAI and a data network name DNN that correspond to the first session that is of the terminal and that is being established; and receiving, by the first session management network element, indication information from the unified data management network element, where the indication information is used to instruct the first session management network element to obtain the identifier of the policy control network element from the binding support network element; or the indication information is used to indicate that a session that is of the terminal and that has the same S-NSSAI and the same DNN as the first session is established; or the indication information is used to indicate that the first session has corresponding binding information; and correspondingly, the sending, by the first session management network element, a second request message to a binding support network element includes: sending, by the first session management network element, the second request message to the binding support network element based on the indication information. In other words, in this embodiment of this application, the first session management network element may obtain the indication information when registering the first session with the unified data management network element, so that the first session management network element may obtain the identifier of the policy control network element from the binding support network element based on the indication information.

According to a fifth aspect, a policy control method is provided. The method includes: receiving, by a first session management network element from a mobility management network element, a first request message used to create a first session, where the first request message includes an identifier of a terminal, single network slice selection assistance information S-NSSAI, and a data network name DNN; sending, by the first session management network element, a second request message to a binding support network element, where the second request message includes the identifier of the terminal, the S-NSSAI, and the DNN, and is used to request a corresponding identifier of a policy control network element, the policy control network element is a policy control network element corresponding to a second session, and the second session is an established session that is of the terminal and that has the same S-NSSAI and the same DNN as the first session; and if the first session management network element determines that the first session management network element cannot receive the identifier of the policy control network element from the binding support network element, selecting, by the first session management network element, the policy control network element based on at least one of a local configuration, an identifier that is of a policy control network element and that is provided by the mobility management network element, or an identifier that is of a policy control network element and that is provided by a network repository function network element. In other words, in this embodiment of this application, if the first session management network element cannot obtain the identifier of the policy control network element from the binding support network element, the first session management network element may perform another policy control network element selection method. For example, the first session management network element selects the policy control network element for the first session based on the at least one of the local configuration, the identifier that is of the policy control network element and that is provided by the mobility management network element, or the identifier that is of the policy control network element and that is provided by the network repository function network element. This is not specifically limited in this embodiment of this application.

According to a sixth aspect, a policy control method is provided. The method includes: in a process of establishing a second session of a terminal, selecting, by a second session management network element corresponding to the second session, a policy control network element; and sending, by the second session management network element, an identifier of the policy control network element to a network device, where the identifier of the policy control network element is used by a first session management network element to select the policy control network element, the first session management network element is a session management network element corresponding to a first session, and the first session is a to-be-established session that is of the terminal and that has same single network slice selection assistance information S-NSSAI and a same data network name DNN as the second session. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the network device is a mobility management network element or a unified data management network element.

In a possible design, the second session is the $1^{st}$ session that has the S-NSSAI and the DNN and that is processed by the second session management network element for the terminal.

In a possible design, the second session management network element receives indication information from the mobility management network element, and the indication information is used to instruct to preferably select the policy control network element. For example, after selecting the policy control network element, the second session management network element sends a registration request including the identifier of the policy control network element to the unified data management network element.

According to a seventh aspect, a mobility management network element is provided. The mobility management network element has a function of implementing the method according to the second aspect. The function may be implemented by hardware, or may be implemented by hardware executing corresponding software. The hardware or the software includes one or more modules corresponding to the function.

According to an eighteenth aspect, a mobility management network element is provided, and includes a processor and a memory. The memory is configured to store a computer executable instruction, and when the mobility management network element runs, the processor executes the computer executable instruction stored in the memory, so that the mobility management network element performs the policy control method according to any possible design in the second aspect.

According to a ninth aspect, a mobility management network element is provided, and includes a processor. The processor is configured to: after being coupled with a memory and reading an instruction in the memory, perform, according to the instruction, the policy control method according to any possible design in the second aspect.

According to a tenth aspect, a computer-readable storage medium is provided. The computer-readable storage medium stores an instruction, and when the instruction is run on a computer, the computer may perform the policy control method according to any possible design in the second aspect.

According to an eleventh aspect, a computer program product including an instruction is provided. When the computer program product is run on a computer, the computer may perform the policy control method according to any possible design in the second aspect.

According to a twelfth aspect, an apparatus (for example, the apparatus may be a chip system) is provided. The apparatus includes a processor, configured to support a mobility management network element in implementing the function in the second aspect, for example, in determining that a first session that is of a terminal and that is being established has the same S-NSSAI and the same DNN as an established second session of the terminal. In a possible design, the apparatus further includes a memory. The memory is configured to store a program instruction and data that are necessary for the mobility management network element. When the apparatus is a chip system, the apparatus may include a chip, or may include a chip and another discrete component.

For a technical effect brought by any design manner in the seventh aspect to the twelfth aspect, refer to technical effects brought by different design manners in the second aspect. Details are not described herein again.

According to a thirteenth aspect, a network device is provided. The network device has a function of implementing the method according to the third aspect or the following thirty-fourth aspect. The function may be implemented by hardware, or may be implemented by hardware executing corresponding software. The hardware or the software includes one or more modules corresponding to the function.

According to a fourteenth aspect, a network device is provided, and includes a processor and a memory. The memory is configured to store a computer executable instruction, and when the network device runs, the processor executes the computer executable instruction stored in the memory, so that the network device performs the policy control method according to any possible design in the third aspect or the following thirty-fourth aspect.

According to a fifteenth aspect, a network device is provided, and includes a processor. The processor is configured to: after being coupled with a memory and reading an instruction in the memory, perform, according to the instruction, the policy control method according to any possible design in the third aspect or the following thirty-fourth aspect.

According to a sixteenth aspect, a computer-readable storage medium is provided. The computer-readable storage medium stores an instruction, and when the instruction is run on a computer, the computer may perform the policy control method according to any possible design in the third aspect or the thirty-fourth aspect.

According to a seventeenth aspect, a computer program product including an instruction is provided. When the computer program product is run on a computer, the computer may perform the policy control method according to any possible design in the third aspect or the thirty-fourth aspect.

According to an eighteenth aspect, an apparatus (for example, the apparatus may be a chip system) is provided. The apparatus includes a processor, configured to support a network device in implementing the function in the third aspect or the following thirty-fourth aspect, for example, in determining that a first session that is of a terminal and that is being established has the same S-NSSAI and the same DNN as an established second session of the terminal. In a possible design, the apparatus further includes a memory. The memory is configured to store a program instruction and data that are necessary for the network device. When the apparatus is a chip system, the apparatus may include a chip, or may include a chip and another discrete component.

For a technical effect brought by any design manner in the thirteenth aspect to the eighteenth aspect, refer to technical effects brought by different design manners in the third aspect or the following thirty-fourth aspect. Details are not described herein again.

According to a nineteenth aspect, a first session management network element is provided. The first session management network element has a function of implementing the method according to the fourth aspect or the fifth aspect. The function may be implemented by hardware, or may be implemented by hardware executing corresponding software. The hardware or the software includes one or more modules corresponding to the function.

According to a twentieth aspect, a first session management network element is provided, and includes a processor and a memory. The memory is configured to store a computer executable instruction, and when the first session management network element runs, the processor executes the computer executable instruction stored in the memory, so that the first session management network element performs the policy control method according to any possible design in the fourth aspect or the fifth aspect.

According to a twenty-first aspect, a first session management network element is provided, and includes a processor. The processor is configured to: after being coupled with a memory and reading an instruction in the memory, perform, according to the instruction, the policy control method according to any possible design in the fourth aspect or the fifth aspect.

According to a twenty-second aspect, a computer-readable storage medium is provided. The computer-readable storage medium stores an instruction, and when the instruction is run on a computer, the computer may perform the policy control method according to any possible design in the fourth aspect or the fifth aspect.

According to a twenty-third aspect, a computer program product including an instruction is provided. When the computer program product is run on a computer, the computer may perform the policy control method according to any possible design in the fourth aspect or the fifth aspect.

According to a twenty-fourth aspect, an apparatus (for example, the apparatus may be a chip system) is provided. The apparatus includes a processor, configured to support a first session management network element in implementing the function in the fourth aspect or the fifth aspect, for example, in selecting the policy control network element based on an identifier of the policy control network element. In a possible design, the apparatus further includes a memory. The memory is configured to store a program instruction and data that are necessary for the first session management network element. When the apparatus is a chip system, the apparatus may include a chip, or may include a chip and another discrete component.

For a technical effect brought by any design manner in the nineteenth aspect to the twenty-fourth aspect, refer to technical effects brought by different design manners in the fourth aspect or the fifth aspect. Details are not described herein again.

According to a twenty-fifth aspect, a second session management network element is provided. The second session management network element has a function of implementing the method according to the sixth aspect. The function may be implemented by hardware, or may be implemented by hardware executing corresponding software. The hardware or the software includes one or more modules corresponding to the function.

According to a twenty-sixth aspect, a second session management network element is provided, and includes a processor and a memory. The memory is configured to store a computer executable instruction, and when the second session management network element runs, the processor executes the computer executable instruction stored in the memory, so that the second session management network element performs the policy control method according to any possible design in the sixth aspect.

According to a twenty-seventh aspect, a second session management network element is provided, and includes a processor. The processor is configured to: after being coupled with a memory and reading an instruction in the memory, perform, according to the instruction, the policy control method according to any possible design in the sixth aspect.

According to a twenty-eighth aspect, a computer-readable storage medium is provided. The computer-readable storage medium stores an instruction, and when the instruction is run on a computer, the computer may perform the policy control method according to any possible design in the sixth aspect.

According to a twenty-ninth aspect, a computer program product including an instruction is provided. When the computer program product is run on a computer, the computer may perform the policy control method according to any possible design in the sixth aspect.

According to a thirtieth aspect, an apparatus (for example, the apparatus may be a chip system) is provided. The apparatus includes a processor, configured to support a second session management network element in implementing the function in the sixth aspect, for example, in determining that a first session that is of a terminal and that is being established has the same S-NSSAI and the same DNN as an established second session of the terminal. In a possible design, the apparatus further includes a memory. The memory is configured to store a program instruction and data that are necessary for the second session management network element. When the apparatus is a chip system, the apparatus may include a chip, or may include a chip and another discrete component.

For a technical effect brought by any design manner in the twenty-fifth aspect to the thirtieth aspect, refer to technical effects brought by different design manners in the sixth aspect. Details are not described herein again.

According to a thirty-first aspect, a policy control system is provided, and includes a mobility management network element and a first session management network element. The mobility management network element is configured to send, to the first session management network element, a first request message used to create a first session, where the first request message includes an identifier of a terminal, single network slice selection assistance information S-NSSAI, and a data network name DNN; the first session management network element is configured to: receive the first request message from the mobility management network element, and send a second request message to a binding support network element, where the second request message includes the identifier of the terminal, the S-NSSAI, and the DNN; and the first session management network element is further configured to: receive an identifier of a policy control network element from the binding support network element, and select the policy control network element based on the identifier of the policy control network element.

In a possible design, the mobility management network element is further configured to determine that the first session has the same S-NSSAI and the same DNN as an established second session of the terminal, and correspondingly, the first request message further includes indication information, and the indication information is used to instruct the first session management network element to obtain the identifier of the policy control network element from the binding support network element; or the indication information is used to indicate that a session that is of the terminal and that has the same S-NSSAI and the same DNN as the first session is established; or the indication information is used to indicate that the first session has corresponding binding information.

In a possible design, the policy control system further includes a second session management network element. The second session management network element is configured to: in a process of establishing the second session, select the policy control network element, and send a registration request to the binding support network element, where the registration request includes the identifier of the terminal, the S-NSSAI, the DNN, and the identifier of the policy control network element.

For a technical effect brought by any design manner in the thirty-first aspect, refer to technical effects brought by different design manners in the first aspect. Details are not described herein again.

According to a thirty-second aspect, a policy control system is provided, and includes a network device and a first session management network element. The network device is configured to determine that a first session that is of a terminal and that is being established has same single network slice selection assistance information S-NSSAI and a same data network name DNN as an established second session of the terminal; the network device is further configured to send, to a first session management network element corresponding to the first session, an identifier of a policy control network element selected by a second session management network element corresponding to the second session; and the first session management network element is configured to: receive the identifier of the policy control network element from the network device, and select the policy control network element based on the identifier of the policy control network element.

In a possible design, the policy control system further includes the second session management network element. The second session management network element is configured to: in a process of establishing the second session, select the policy control network element, and send the identifier of the policy control network element to the network device; and the network device is configured to receive the identifier of the policy control network element from the second session management network element.

For a technical effect brought by any design manner in the thirty-second aspect, refer to technical effects brought by different design manners in the third aspect. Details are not described herein again.

According to a thirty-third aspect, a policy control method is provided. The method includes: receiving, by a first session management network element, indication information from a unified data management network element, where the indication information is used to instruct the first session management network element to obtain an identifier of a policy control network element from a binding support network element; or the indication information is used to indicate that a session that is of a terminal and that has same single network slice selection assistance information S-NSSAI and a same data network name DNN as a first session that is of the terminal and that is being established is established; or the indication information is used to indicate that the first session has corresponding binding information; sending, by the first session management network element, a request message to the binding support network element based on the indication information, where the request message includes an identifier of the terminal, the S-NSSAI, and the DNN; and receiving, by the first session management network element, the identifier of the policy control network element from the binding support network element, and selecting the policy control network element based on the identifier of the policy control network element. According to the policy control method provided in this embodiment of this application, the unified data management network element sends the indication information to the first session management network element, so that the first session management network element may obtain, from the binding support network element based on the indication information, the identifier that is of the policy control network element and that corresponds to the identifier of the terminal, the S-NSSAI, and the DNN, and select the policy control network element based on the identifier of the policy control network element. The policy control network element may be a policy control network element corresponding to a second session. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, before the receiving, by a first session management network element, indication information from a unified data management network element, the method further includes: determining, by the unified data management network element, that the first session that is of the terminal and that is being established has the same S-NSSAI and the same DNN as an established second session of the terminal; and sending, by the unified data management network element, the indication information to the first session management network element corresponding to the first session.

In a possible design, before the sending, by the unified data management network element, the indication information to the first session management network element, the method further includes: determining, by the unified data management network element, that the terminal establishes the first session in a non-roaming scenario or a home routing scenario.

According to a thirty-fourth aspect, a policy control method is provided. The method includes: receiving, by a unified data management network element, a registration request from a first session management network element, where the registration request includes an identifier of a terminal, and single network slice selection assistance information S-NSSAI and a data network name DNN that correspond to a first session that is of the terminal and that is being established; and sending, by the unified data management network element, indication information to the first session management network element, where the indication information is used to instruct the first session management network element to obtain an identifier of a policy control network element from a binding support network element; or the indication information is used to indicate that a session that is of the terminal and that has the same S-NSSAI and the same DNN as the first session is established; or the indication information is used to indicate that the first session has corresponding binding information.

In a possible design, before the sending, by the unified data management network element, the indication information to the first session management network element, the method further includes: determining, by the unified data management network element, that the first session that is of the terminal and that is being established has the same S-NSSAI and the same DNN as an established second session of the terminal.

In a possible design, before the sending, by the unified data management network element, the indication information to the first session management network element, the method further includes: determining, by the unified data management network element, that the terminal establishes the first session in a non-roaming scenario or a home routing scenario.

For a technical effect brought by the thirty-fourth aspect, refer to the thirty-third aspect. Details are not described herein again.

According to a thirty-fifth aspect, a policy control system is provided, and includes a unified data management network element and a first session management network element. The unified data management network element is configured to send indication information to the first session management network element, where the indication information is used to instruct the first session management network element to obtain an identifier of a policy control network element from a binding support network element; or the indication information is used to indicate that a session that is of a terminal and that has same single network slice selection assistance information S-NSSAI and a same data network name DNN as a first session that is of the terminal and that is being established is established; or the indication information is used to indicate that the first session has corresponding binding information; the first session management network element is configured to: receive the indication information from the unified data management network element, and send a request message to the binding support network element based on the indication information, where the request message includes an identifier of the terminal, the S-NSSAI, and the DNN; and the first session management network element is further configured to: receive the identifier of the policy control network element from the binding support network element, and select the policy control network element based on the identifier of the policy control network element.

In a possible design, the unified data management network element is further configured to determine that the first session that is of the terminal and that is being established has the same S-NSSAI and the same DNN as an established second session of the terminal.

In a possible design, the unified data management network element is further configured to determine that the terminal establishes the first session in a non-roaming scenario or a home routing scenario.

For a technical effect brought by the thirty-fifth aspect, refer to the thirty-third aspect. Details are not described herein again.

According to a thirty-sixth aspect, a policy control system is provided, and includes a first session management network element and a first policy control network element. The first session management network element is configured to receive, from a mobility management network element, a first request message used to create a first session, where the first request message includes an identifier of a terminal, single network slice selection assistance information S-NSSAI, and a data network name DNN; the first session management network element is further configured to: select the first policy control network element for the first session, and send a policy control creation request to the first policy control network element, where the policy control creation request includes the identifier of the terminal, the S-NSSAI, and the DNN; the first policy control network element is configured to: receive the policy control creation request from the first session management network element, and send the identifier of the terminal, the S-NSSAI, the DNN, and an identifier of the first policy control network element to a binding support network element; the first policy control network element is further configured to: receive a rejection indication from the binding support network element, and send the rejection indication to the first session management network element, where the rejection indication includes the identifier of the terminal, the S-NSSAI, the DNN, and an identifier of a second policy control network element; and the first session management network element is configured to: receive the rejection indication, and select the second policy control network element for the first session based on the identifier of the second policy control network element. Based on the policy control system provided in this embodiment of this application, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

According to a thirty-seventh aspect, a policy control method is provided. The method includes: receiving, by a first policy control network element, a policy control creation request from a first session management network element, where the policy control creation request includes an identifier of a terminal, single network slice selection assistance information S-NSSAI, and a data network name DNN; sending, by the first policy control network element, the identifier of the terminal, the S-NSSAI, the DNN, and an identifier of the first policy control network element to a binding support network element; and receiving, by the first policy control network element, an identifier of a second policy control network element from the binding support network element, and sending the identifier of the second policy control network element to the first session management network element, where the identifier of the second policy control network element is an identifier that is of a policy control network element, that corresponds to the identifier of the terminal, the S-NSSAI, and the DNN, and that is stored by the binding support network element. According to the policy control method provided in this embodiment of this application, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

Optionally, in this embodiment of this application, the policy control network element may be a policy control function network function instance (network function instance) or a policy control function network function service instance (network function service instance). Correspondingly, the identifier of the policy control network element may be a network function instance identifier (network function instance Id) of the policy control network element or a network function service instance identifier (network function service instance Id) of the policy control network element. This is not specifically limited herein.

In a possible design, the method further includes: determining, by the first policy control network element, that a same policy control network element needs to be selected for a combination of the identifier of the terminal, the S-NSSAI, and the DNN; and sending, by the first policy control network element, indication information to the binding support network element, where the indication information is used to instruct to select the same policy control network element for the combination of the identifier of the terminal, the S-NSSAI, and the DNN. In this case, the binding support network element may select the same policy control network element for the combination of the identifier of the terminal, the S-NSSAI, and the DNN based on the indication information.

According to a thirty-eighth aspect, a policy control method is provided. The method includes: receiving, by a binding support network element, an identifier of a terminal, single network slice selection assistance information S-NSSAI, a data network name DNN, and an identifier of a first policy control network element from the first policy control network element; determining, by the binding support network element, that an identifier that is of a second policy control network element and that corresponds to a combination of the identifier of the terminal, the S-NSSAI, and the DNN already exists; and sending, by the binding support network element, the identifier of the second policy control network element to the first policy control network element. According to the policy control method provided in this embodiment of this application, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the method further includes: receiving, by the binding support network element, the identifier of the terminal, the S-NSSAI, the DNN, and the identifier of the second policy control network element from the second policy control network element in a process of establishing a second session; and storing, by the binding support network element, a correspondence between the identifier of the second policy control network element and the combination of the identifier of the terminal, the S-NSSAI, and the DNN.

In a possible design, the method further includes: receiving, by the binding support network element, indication information from the first policy control network element, where the indication information is used to instruct to select a same policy control network element for the combination of the identifier of the terminal, the S-NSSAI, and the DNN; and determining, by the binding support network element based on the indication information, to send the identifier of the second policy control network element to the first policy control network element.

According to a thirty-ninth aspect, a policy control method is provided, and includes: sending, by a first session management network element, a policy control creation request to a first policy control network element, where the policy control creation request includes an identifier of a terminal, single network slice selection assistance information S-NSSAI, and a data network name DNN; receiving, by the first policy control network element, the policy control creation request from the first session management network element, and sending the identifier of the terminal, the S-NSSAI, the DNN, and an identifier of the first policy control network element to a binding support network element; receiving, by the first policy control network element, an identifier of a second policy control network element from the binding support network element, and sending the identifier of the second policy control network element to the first session management network element, where the identifier of the second policy control network element is an identifier that is of a policy control network element, that corresponds to the identifier of the terminal, the S-NSSAI, and the DNN, and that is stored by the binding support network element, and receiving, by the first session management network element, the identifier of the second policy control network element from the first policy control network element, and selecting the second policy control network element for the first session based on the identifier of the second policy control network element. According to the policy control method provided in this embodiment of this application, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the method further includes: receiving, by the first session management network element from a first mobility management network element, a first request message used to create the first session, where the first request message includes the identifier of the terminal, the S-NSSAI, and the DNN; and selecting, by the first session management network element, the first policy control network element for the first session.

In a possible design, the method further includes: determining, by the first policy control network element, that a same policy control network element needs to be selected for a combination of the identifier of the terminal, the S-NSSAI, and the DNN; and sending, by the first policy control network element, indication information to the binding support network element, where the indication information is used to instruct to select the same policy control network element for the combination of the identifier of the terminal, the S-NSSAI, and the DNN. In this case, the binding support network element may select the same policy control network element for the combination of the identifier of the terminal, the S-NSSAI, and the DNN based on the indication information.

In a possible design, the sending, by the first policy control network element, indication information to the binding support network element includes: sending, by the first policy control network element, the indication information to the binding support network element when determining that the terminal establishes the first session in a non-roaming scenario or a home routing scenario.

In a possible design, the method further includes: receiving, by a second session management network element from a second mobility management network element, a second request message used to create a second session, where the second request message includes the identifier of the terminal, the S-NSSAI, and the DNN; selecting, by the second session management network element, the second policy control network element for the second session, and sending a policy control creation request to the second policy control network element, where the policy control creation request includes the identifier of the terminal, the S-NSSAI, and the DNN; receiving, by the second policy control network element, the policy control creation request from the second session management network element, and sending the identifier of the terminal, the S-NSSAI, the DNN, and an identifier of the second policy control network element to the binding support network element; and receiving, by the binding support network element, the identifier of the terminal, the S-NSSAI, the DNN, and the identifier of the second policy control network element from the second policy control network element, and storing a correspondence between the identifier of the second policy control network element and the combination of the identifier of the terminal, the S-NSSAI, and the DNN.

According to a fortieth aspect, a policy control system is provided, and includes a first session management network element and a first policy control network element. The first session management network element is configured to send a policy control creation request to the first policy control network element, where the policy control creation request includes an identifier of a terminal, single network slice selection assistance information S-NSSAI, and a data network name DNN; the first policy control network element is configured to: receive the policy control creation request from the first session management network element, and send the identifier of the terminal, the S-NSSAI, the DNN, and an identifier of the first policy control network element to the binding support network element; the first policy control network element is configured to: receive an identifier of a second policy control network element from the binding support network element, and send the identifier of the second policy control network element to the first session management network element, where the identifier of the second policy control network element is an identifier that is of a policy control network element, that corresponds to the identifier of the terminal, the S-NSSAI, and the DNN, and that is stored by the binding support network element; and the first session management network element is configured to: receive the identifier of the second policy control network element from the first policy control network element, and select the second policy control network element for a first session based on the identifier of the second policy control network element. Based on the policy control system provided in this embodiment of this application, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the first session management network element is further configured to receive, from a first mobility management network element, a first request message used to create the first session, where the first request message includes the identifier of the terminal, the S-NSSAI, and the DNN; and the first session management network element is further configured to select the first policy control network element for the first session.

In a possible design, the first policy control network element is further configured to determine that a same policy control network element needs to be selected for a combination of the identifier of the terminal, the S-NSSAI, and the DNN; and the first policy control network element is further configured to send indication information to the binding support network element, where the indication information is used to instruct to select the same policy control network element for the combination of the identifier of the terminal, the S-NSSAI, and the DNN. In this case, the binding support network element may select the same policy control network element for the combination of the identifier of the terminal, the S-NSSAI, and the DNN based on the indication information.

In a possible design, that the first policy control network element is further configured to send indication information to the binding support network element includes: the first policy control network element is further configured to send the indication information to the binding support network element when determining that the terminal establishes the first session in a non-roaming scenario or a home routing scenario.

In a possible design, the policy control system further includes a second session management network element, the second policy control network element, and the binding support network element. The second session management network element is configured to receive, from a second mobility management network element, a second request message used to create a second session, where the second request message includes the identifier of the terminal, the S-NSSAI, and the DNN; the second session management network element is configured to: select the second policy control network element for the second session, and send a policy control creation request to the second policy control network element, where the policy control creation request includes the identifier of the terminal, the S-NSSAI, and the DNN; the second policy control network element is configured to: receive the policy control creation request from the second session management network element, and send the identifier of the terminal, the S-NSSAI, the DNN, and the identifier of the second policy control network element to the binding support network element; and the binding support network element is configured to: receive the identifier of the terminal, the S-NSSAI, the DNN, and the identifier of the second policy control network element from the second policy control network element, and store a correspondence between the identifier of the second policy control network element and the combination of the identifier of the terminal, the S-NSSAI, and the DNN.

According to a forty-first aspect, a policy control method is provided. The method includes: receiving, by a first policy control network element, a policy control creation request from a first session management network element, where the policy control creation request includes an identifier of a terminal, single network slice selection assistance information S-NSSAI, and a data network name DNN; sending, by the first policy control network element to a binding support network element, the identifier of the terminal, the S-NSSAI, the DNN, and an identifier of a first policy control network element set to which the first policy control network element belongs; and receiving, by the first policy control network element, an identifier of a second policy control network element set from the binding support network element, and sending the identifier of the second policy control network element set to the first session management network element, where the identifier of the second policy control network element set is an identifier that is of a policy control network element set, that corresponds to the identifier of the terminal, the S-NSSAI, and the DNN, and that is stored by the binding support network element. According to the policy control method provided in this embodiment of this application, it can be ensured that a same policy control network element set is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

Optionally, in this embodiment of this application, the policy control network element set is a network function set (network function set) of a policy control network element or a network function service set (network function service set) of the policy control network element. Correspondingly, the identifier of the policy control network element set is a network function set identifier (network function set Id) of the policy control network element or a network function service set identifier (network function service set Id) of the policy control network element. This is not specifically limited herein.

In a possible design, the method further includes: determining, by the first policy control network element, that a same policy control network element set needs to be selected for a combination of the identifier of the terminal, the S-NSSAI, and the DNN; and sending, by the first policy control network element, indication information to the binding support network element, where the indication information is used to instruct to select the same policy control network element set for the combination of the identifier of the terminal, the S-NSSAI, and the DNN. In this case, the binding support network element may select the same policy control network element set for the combination of the identifier of the terminal, the S-NSSAI, and the DNN based on the indication information.

According to a forty-second aspect, a policy control method is provided. The method includes: receiving, by a binding support network element from a first policy control network element, an identifier of a terminal, single network slice selection assistance information S-NSSAI, a data network name DNN, and an identifier of a first policy control network element set to which the first policy control network element belongs; determining, by the binding support network element, that an identifier that is of a second policy control network element set and that corresponds to a combination of the identifier of the terminal, the S-NSSAI, and the DNN already exists; and sending, by the binding support network element, the identifier of the second policy control network element set to the first policy control network element. According to the policy control method provided in this embodiment of this application, it can be ensured that a same policy control network element set is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the method further includes: in a process of establishing a second session, receiving, by the binding support network element from a second policy control network element, the identifier of the terminal, the S-NSSAI, the DNN, and the identifier of the second policy control network element set to which the second policy control network element belongs; and storing, by the binding support network element, a correspondence between the identifier of the second policy control network element set and the combination of the identifier of the terminal, the S-NSSAI, and the DNN.

In a possible design, the method further includes: receiving, by the binding support network element, indication information from the first policy control network element, where the indication information is used to instruct to select a same policy control network element set for the combination of the identifier of the terminal, the S-NSSAI, and the DNN; and determining, by the binding support network element based on the indication information, to send the identifier of the second policy control network element set to the first policy control network element.

According to a forty-third aspect, a policy control method is provided, and includes: sending, by a first session management network element, a policy control creation request to a first policy control network element, where the policy control creation request includes an identifier of a terminal, single network slice selection assistance information S-NS-SAI, and a data network name DNN; receiving, by the first policy control network element, the policy control creation request from the first session management network element, and sending, to the binding support network element, the identifier of the terminal, the S-NSSAI, the DNN, and an identifier of a first policy control network element set to which the first policy control network element belongs; receiving, by the first policy control network element, an identifier of a second policy control network element set from the binding support network element, and sending the identifier of the second policy control network element set to the first session management network element, where the identifier of the second policy control network element set is an identifier that is of a policy control network element set, that corresponds to the identifier of the terminal, the S-NSSAI, and the DNN, and that is stored by the binding support network element; and receiving, by the first session management network element, the identifier of the second policy control network element set from the first policy control network element, and selecting a second policy control network element for the first session based on the identifier of the second policy control network element set, where the second policy control network element belongs to the second policy control network element set. According to the policy control method provided in this embodiment of this application, it can be ensured that a same policy control network element set is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the method further includes: receiving, by the first session management network element from a first mobility management network element, a first request message used to create the first session, where the first request message includes the identifier of the terminal, the S-NSSAI, and the DNN; and selecting, by the first session management network element, the first policy control network element for the first session.

In a possible design, the method further includes: determining, by the first policy control network element, that a same policy control network element set needs to be selected for a combination of the identifier of the terminal, the S-NSSAI, and the DNN; and sending, by the first policy control network element, indication information to the binding support network element, where the indication information is used to instruct to select the same policy control network element set for the combination of the identifier of the terminal, the S-NSSAI, and the DNN. In this case, the binding support network element may select the same policy control network element set for the combination of the identifier of the terminal, the S-NSSAI, and the DNN based on the indication information.

In a possible design, the sending, by the first policy control network element, indication information to the binding support network element includes: sending, by the first policy control network element, the indication information to the binding support network element when determining that the terminal establishes the first session in a non-roaming scenario or a home routing scenario.

In a possible design, the method further includes: receiving, by a second session management network element from a second mobility management network element, a second request message used to create a second session, where the second request message includes the identifier of the terminal, the S-NSSAI, and the DNN; selecting, by the second session management network element, the second policy control network element for the second session, and sending a policy control creation request to the second policy control network element, where the policy control creation request includes the identifier of the terminal, the S-NSSAI, and the DNN; receiving, by the second policy control network element, the policy control creation request from the second session management network element, and sending, to the binding support network element, the identifier of the terminal, the S-NSSAI, the DNN, and the identifier of the second policy control network element set to which the second policy control network element belongs, and receiving, by the binding support network element, the identifier of the terminal, the S-NSSAI, the DNN, and the identifier of the second policy control network element set from the second policy control network element, and storing a correspondence between the identifier of the second policy control network element set and the combination of the identifier of the terminal, the S-NSSAI, and the DNN.

According to a forty-fourth aspect, a policy control system is provided, and includes a first session management network element and a first policy control network element. The first session management network element is configured to send a policy control creation request to the first policy control network element, where the policy control creation request includes an identifier of a terminal, single network slice selection assistance information S-NSSAI, and a data network name DNN; the first policy control network element is configured to: receive the policy control creation request from the first session management network element, and send, to the binding support network element, the identifier of the terminal, the S-NSSAI, the DNN, and an identifier of a first policy control network element set to which the first policy control network element belongs; the first policy control network element is configured to: receive an identifier of a second policy control network element set from the binding support network element, and send the identifier of the second policy control network element set to the first session management network element, where the identifier of the second policy control network element set is an identifier that is of a policy control network element set, that corresponds to the identifier of the terminal, the S-NSSAI, and the DNN, and that is stored by the binding support network element; and the first session management network element is configured to: receive the identifier of the second policy control network element set from the first policy control network element, and select a second policy control network element for a first session based on the identifier of the second policy control network element set, where the second policy control network element belongs to the second policy control network element set. Based on the policy control system provided in this embodiment of this application, it can be ensured that a same policy control network element set is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

In a possible design, the first session management network element is further configured to receive, from a first mobility management network element, a first request message used to create the first session, where the first request message includes the identifier of the terminal, the S-NSSAI, and the DNN; and the first session management network element is further configured to select the first policy control network element for the first session.

In a possible design, the first policy control network element is further configured to determine that a same policy control network element set needs to be selected for a combination of the identifier of the terminal, the S-NSSAI, and the DNN; and the first policy control network element is further configured to send indication information to the binding support network element, where the indication information is used to instruct to select the same policy control network element set for the combination of the identifier of the terminal, the S-NSSAI, and the DNN. In this case, the binding support network element may select the same policy control network element set for the combination of the identifier of the terminal, the S-NSSAI, and the DNN based on the indication information.

In a possible design, that the first policy control network element is further configured to send indication information to the binding support network element includes: the first policy control network element is further configured to send the indication information to the binding support network element when determining that the terminal establishes the first session in a non-roaming scenario or a home routing scenario.

In a possible design, the policy control system further includes a second session management network element, the second policy control network element, and the binding support network element. The second session management network element is configured to receive, from a second mobility management network element, a second request message used to create a second session, where the second request message includes the identifier of the terminal, the S-NSSAI, and the DNN; the second session management network element is configured to: select the second policy control network element for the second session, and send a policy control creation request to the second policy control network element, where the policy control creation request includes the identifier of the terminal, the S-NSSAI, and the DNN; the second policy control network element is configured to: receive the policy control creation request from the second session management network element, and send, to the binding support network element, the identifier of the terminal, the S-NSSAI, the DNN, and the identifier of the second policy control network element set to which the second policy control network element belongs; and the binding support network element is configured to: receive the identifier of the terminal, the S-NSSAI, the DNN, and the identifier of the second policy control network element set from the second policy control network element, and store a correspondence between the identifier of the second policy control network element set and the combination of the identifier of the terminal, the S-NSSAI, and the DNN.

According to a forty-fifth aspect, a communications apparatus is provided, and is configured to implement the foregoing methods. The communications apparatus may be the first policy control network element in the thirty-seventh aspect or the forty-first aspect, or an apparatus including the first policy control network element; or the communications apparatus may be the binding support network element in the thirty-eighth aspect or the forty-second aspect, or an apparatus including the binding support network element. The communications apparatus includes a corresponding module, unit, or means (means) for implementing the foregoing method. The module, unit, or means may be implemented by hardware or software, or implemented by hardware by executing corresponding software. The hardware or the software includes one or more modules or units corresponding to the foregoing function.

According to a forty-sixth aspect, a communications apparatus is provided, and includes a processor and a memory. The memory is configured to store a computer instruction, and when the processor executes the instruction, the communications apparatus performs the method according to any one of the foregoing aspects. The communications apparatus may be the first policy control network element in the thirty-seventh aspect or the forty-first aspect, or an apparatus including the first policy control network element; or the communications apparatus may be the binding support network element in the thirty-eighth aspect or the forty-second aspect, or an apparatus including the binding support network element.

According to a forty-seventh aspect, a communications apparatus is provided, and includes a processor. The processor is configured to: after being coupled with a memory and reading an instruction in the memory, perform, according to the instruction, the method according to any one of the foregoing aspects. The communications apparatus may be the first policy control network element in the thirty-seventh aspect or the forty-first aspect, or an apparatus including the first policy control network element; or the communications apparatus may be the binding support network element in the thirty-eighth aspect or the forty-second aspect, or an apparatus including the binding support network element.

According to a forty-eighth aspect, a computer-readable storage medium is provided. The computer-readable storage medium stores an instruction, and when the instruction is run on a computer, the computer may perform the method according to any one of the foregoing aspects.

According to a forty-ninth aspect, a computer program product including an instruction is provided. When the computer program product is run on a computer, the computer may perform the method according to any one of the foregoing aspects.

According to a fiftieth aspect, a communications apparatus (for example, the communications apparatus may be a chip or a chip system) is provided. The communications apparatus includes a processor, configured to implement the function in any one of the foregoing aspects. In a possible design, the communications apparatus further includes a memory. The memory is configured to store a necessary program instruction and necessary data. When the communications apparatus is a chip system, the communications apparatus may include a chip, or may include a chip and another discrete component.

For a technical effect brought by any design manner in the forty-fifth aspect to the fiftieth aspect, refer to technical effects brought by different design manners in the thirty-eighth aspect to the forty-fourth aspect. Details are not described herein again.

These aspects or other aspects in this application may be clearer and more intelligible in descriptions in the following embodiments.

BRIEF DESCRIPTION OF DRAWINGS

FIG. 6A and FIG. 6B are a schematic flowchart 2 of a policy control method according to an embodiment of this application:

FIG. 7A and FIG. 7B are a schematic flowchart 3 of a policy control method according to an embodiment of this application:

FIG. 14A and FIG. 14B are a schematic flowchart 6 of a policy control method according to an embodiment of this application;

DESCRIPTION OF EMBODIMENTS

The following describes technical solutions in embodiments of this application with reference to accompanying drawings in the embodiments of this application. In description of this application, "|" represents an "or" relationship between associated objects unless otherwise specified. For example, A/B may represent A or B. The term "and/or" in this application describes only an association relationship for describing associated objects and represents that three relationships may exist. For example, A and/or B may represent the following three cases: Only A exists, both A and B exist, and only B exists, where A and B may be singular or plural. In addition, in the description of this application, "a plurality of" means two or more unless otherwise specified. "At least one (one piece) of the following" or a similar expression thereof refers to any combination of these items, including any combination of a singular item (piece) or plural items (pieces). For example, at least one (piece) of a, b, or c may represent a, b, c, a combination of a and b, a combination of a and c, a combination of b and c, or a combination of a, b, and c, where a, b, and c may be in a singular or plural form. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

In addition, network architectures and service scenarios described in the embodiments of this application are intended to more clearly describe the technical solutions in the embodiments of this application, but do not limit the technical solutions provided in the embodiments of this application. A person of ordinary skill in the art may know that as the network architectures evolve and a new service scenario emerges, the technical solutions provided in the embodiments of this application are also applicable to a similar technical problem.

Figure 1:
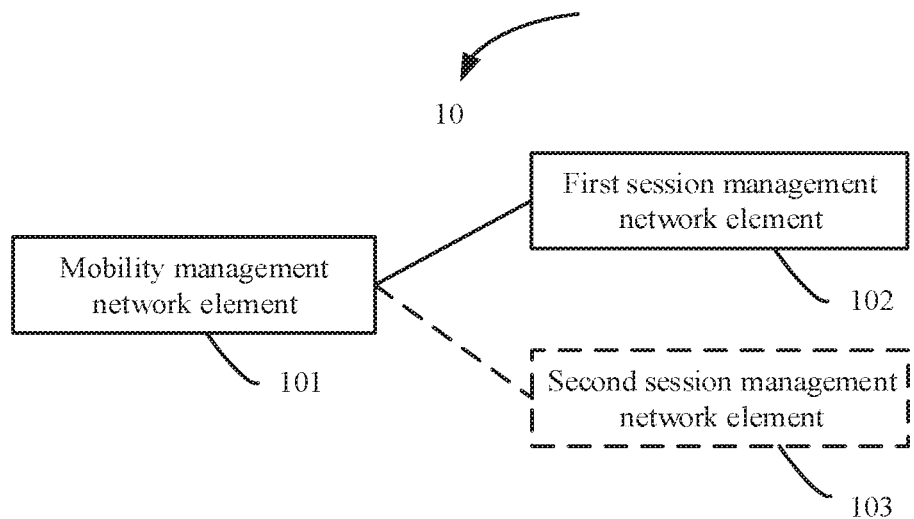
FIG. 1 is a schematic architectural diagram 1 of a policy control system according to an embodiment of this application.

FIG. 1 shows a policy control system 10 according to an embodiment of this application. The policy control system 10 includes a mobility management network element 101 and a first session management network element 102.

The mobility management network element 101 is configured to send, to the first session management network element 102, a first request message used to create a first session. The first request message includes an identifier of a terminal, S-NSSAI, and a DNN.

The first session management network element 102 is configured to: receive, from the mobility management network element 101, the first request message used to create the first session, and send a second request message to a binding support network element. The second request message includes the identifier of the terminal, the S-NSSAI, and the DNN.

The first session management network element 102 is further configured to: receive an identifier of a policy control network element from the binding support network element, and select the policy control network element based on the identifier of the policy control network element.

In this embodiment of this application, the request message is used to request a corresponding identifier of a policy control network element, and the policy control network element may be a policy control network element corresponding to a second session. This is not specifically limited in this embodiment of this application.

Optionally, the mobility management network element 101 is further configured to: before sending, to the first session management network element 102, the first request message used to create the first session, determine that the first session that is of the terminal and that is being established has the same S-NSSAI and the same DNN as the established second session of the terminal. Correspondingly, the first request message further includes indication information, and the indication information is used to instruct the first session management network element 102 to obtain the identifier of the policy control network element from the binding support network element; or the indication information is used to indicate that a session that is of the terminal and that has the same S-NSSAI and the same DNN as the first session is established.

Optionally, the session in this embodiment of this application may be, for example, a PDU session. A general description is provided herein. This is not specifically limited in this embodiment of this application.

Optionally, in this embodiment of this application, the mobility management network element 101 and the first session management network element 102 may directly communicate with each other, or may communicate with each other through forwarding performed by another device. This is not specifically limited in this embodiment of this application.

Based on the policy control system provided in this embodiment of this application, the mobility management network element may send, to the first session management network element, the first request message used to create the first session, and the first request message includes the identifier of the terminal, the S-NSSAI, and the DNN. Therefore, the first session management network element may obtain the corresponding identifier of the policy control network element from the binding support network element based on the identifier of the terminal, the S-NSSAI, and the DNN, and select the policy control network element based on the identifier of the policy control network element. The policy control network element may be the policy control network element corresponding to the second session. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

Optionally, as shown in FIG. 1, the policy control system 10 provided in this embodiment of this application may further include a second session management network element 103.

The mobility management network element 101 is further configured to send, to the second session management network element 103, a third request message used to create the second session.

The second session management network element 103 is configured to: receive, from the mobility management network element 101, the third request message used to create the second session, further select the policy control network element, and send a registration request to the binding support network element. The registration request includes the identifier of the terminal, the S-NSSAI, the DNN, and the identifier of the policy control network element.

Optionally, in this embodiment of this application, the mobility management network element 101 and the second session management network element 103 may directly communicate with each other, or may communicate with each other through forwarding performed by another device. This is not specifically limited in this embodiment of this application.

Figure 2:
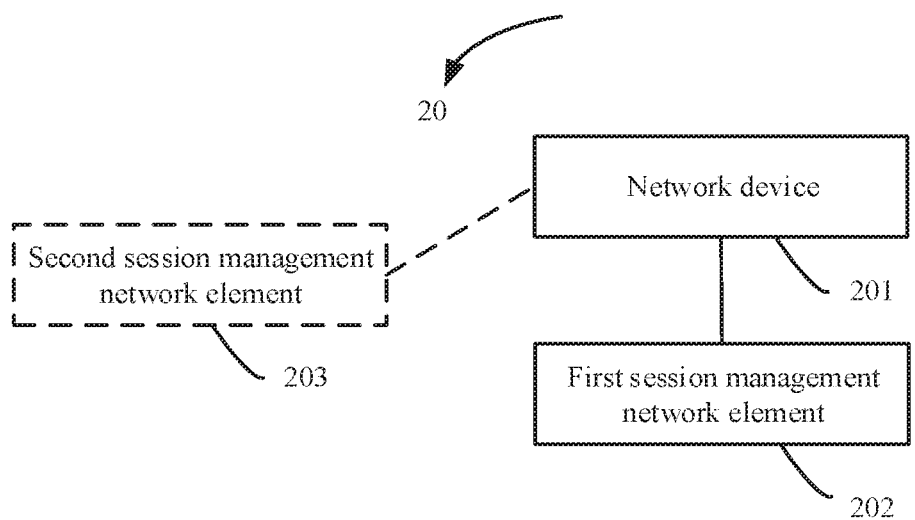
FIG. 2 is a schematic architectural diagram 2 of a policy control system according to an embodiment of this application.

Alternatively, FIG. 2 shows a policy control system 20 according to an embodiment of this application. The policy control system 20 includes a network device 201 and a first session management network element 202.

The network device 201 is configured to: determine that a first session that is of a terminal and that is being established has the same S-NSSAI and the same DNN as an established second session of the terminal, and further send, to the first session management network element 202 corresponding to the first session, an identifier of a policy control network element selected by a second session management network element corresponding to the second session.

The first session management network element 202 is configured to: receive the identifier of the policy control network element from the network device 201, and select the policy control network element based on the identifier of the policy control network element.

Optionally, the network device in this embodiment of this application may be, for example, a unified data management network element or a mobility management network element. This is not specifically limited in this embodiment of this application.

Optionally, in this embodiment of this application, the network device 201 and the first session management network element 202 may directly communicate with each other, or may communicate with each other through forwarding performed by another device. This is not specifically limited in this embodiment of this application.

Based on the policy control system provided in this embodiment of this application, after determining that the first session that is of the terminal and that is being established has the same S-NSSAI and the same DNN as the established second session of the terminal, the network device sends, to the first session management network element, the identifier of the policy control network element selected by the second session management network element corresponding to the second session, so that the second session management network element can select the corresponding policy control network element based on the identifier of the policy control network element. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from the unified data repository network element can be avoided.

Optionally, as shown in FIG. 2, the policy control system 20 provided in this embodiment of this application may further include a second session management network element 203.

The second session management network element 203 is configured to: in a process of establishing the second session, select the policy control network element, and send the identifier of the policy control network element to the network device 201.

The network device 201 is configured to receive the identifier of the policy control network element from the second session management network element.

Optionally, in this embodiment of this application, the network device 201 and the second session management network element 203 may directly communicate with each other, or may communicate with each other through forwarding performed by another device. This is not specifically limited in this embodiment of this application.

Figure 2A:
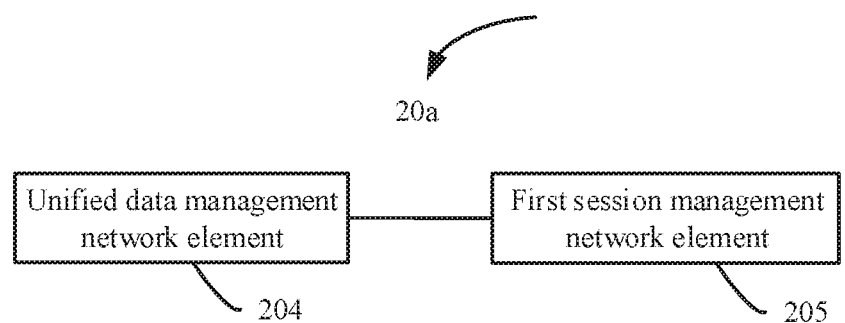
FIG. 2a is a schematic architectural diagram 3 of a policy control system according to an embodiment of this application.

Alternatively, FIG. 2*a* shows a policy control system 20*a* according to an embodiment of this application. The policy control system 20*a* includes a unified data management network element 204 and a first session management network element 205.

The unified data management network element 204 is configured to determine that a first session that is of a terminal and that is being established has the same S-NSSAI and the same DNN as an established second session of the terminal.

The unified data management network element 204 is further configured to send indication information to the first session management network element 205 corresponding to the first session. The indication information is used to instruct the first session management network element 205 to obtain an identifier of a policy control network element from a binding support network element; or the indication information is used to indicate that a session that is of the terminal and that has the same S-NSSAI and the same DNN as the first session is established; or the indication information is used to indicate that the first session has corresponding binding information.

The first session management network element 205 is configured to: receive the indication information from the unified data management network element 204, and send a request message to the binding support network element based on the indication information. The request message includes an identifier of the terminal, the S-NSSAI, and the DNN.

The first session management network element 205 is further configured to: receive the identifier of the policy control network element from the binding support network element, and select the policy control network element based on the identifier of the policy control network element.

Optionally, in this embodiment of this application, the unified data management network element 204 and the first session management network element 205 may directly communicate with each other, or may communicate with each other through forwarding performed by another device. This is not specifically limited in this embodiment of this application.

Based on the policy control system provided in this embodiment of this application, after determining that the first session that is of the terminal and that is being established has the same S-NSSAI and the same DNN as the established second session of the terminal, the unified data management network element may send the indication information to the first session management network element, so that the first session management network element may obtain, from the binding support network element based on the indication information, an identifier that is of a policy control network element and that corresponds to the identifier of the terminal, the S-NSSAI, and the DNN, and select the policy control network element based on the identifier of the policy control network element. The policy control network element may be a policy control network element corresponding to the second session. In other words, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

Figure 2B:
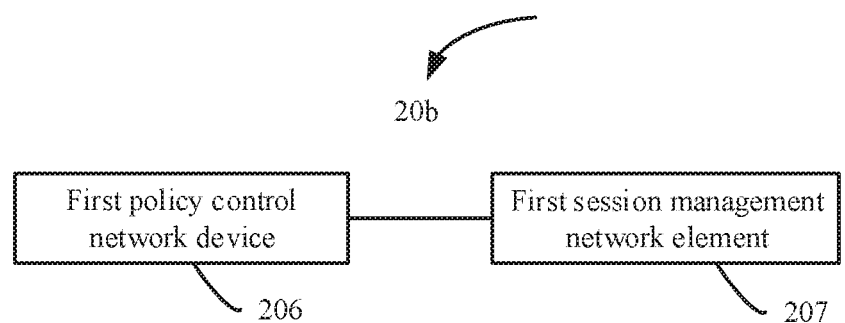
FIG. 2b is a schematic architectural diagram 4 of a policy control system according to an embodiment of this application.

Alternatively, FIG. 2*b* shows a policy control system 20*b* according to an embodiment of this application. The policy control system 20*b* includes a first policy control network device 206 and a first session management network element 207.

In a possible implementation, the first session management network element 207 is configured to receive, from a mobility management network element, a first request message used to create a first session. The first request message includes an identifier of a terminal, S-NSSAI, and a DNN.

The first session management network element 207 is further configured to: select the first policy control network element 206 for the first session, and send a policy control creation request to the first policy control network element 206. The policy control creation request includes the identifier of the terminal, the S-NSSAI, and the DNN.

The first policy control network element 206 is configured to: receive the policy control creation request from the first session management network element 207, and send the identifier of the terminal, the S-NSSAI, the DNN, and an identifier of the first policy control network element 206 to a binding support network element.

The first policy control network element 206 is further configured to: receive a rejection indication from the binding support network element, and send the rejection indication to the first session management network element 207. The rejection indication includes the identifier of the terminal, the S-NSSAI, the DNN, and an identifier of a second policy control network element.

The first session management network element 207 is configured to: receive the rejection indication, and select the second policy control network element for the first session based on the identifier of the second policy control network element.

Alternatively, in another possible implementation, the first session management network element 207 is configured to send a policy control creation request to the first policy control network element 206, where the policy control creation request includes an identifier of a terminal, S-NSSAI, and a DNN; the first policy control network element 206 is configured to: receive the policy control creation request from the first session management network element 207, and send the identifier of the terminal, the S-NSSAI, the DNN, and an identifier of the first policy control network element to a binding support network element; the first policy control network element 206 is configured to: receive an identifier of a second policy control network element from the binding support network element, and send the identifier of the second policy control network element to the first session management network element 207, where the identifier of the second policy control network element is an identifier that is of a policy control network element, that corresponds to the identifier of the terminal, the S-NSSAI, and the DNN, and that is stored by the binding support network element; and the first session management network element 207 is configured to: receive the identifier of the second policy control network element from the first policy control network element 206, and select the second policy control network element for a first session based on the identifier of the second policy control network element.

Alternatively, in still another possible implementation, the first session management network element 207 is configured to send a policy control creation request to the first policy control network element 206, where the policy control creation request includes an identifier of a terminal, S-NSSAI, and a DNN; the first policy control network element 206 is configured to: receive the policy control creation request from the first session management network element 207, and send, to a binding support network element, the identifier of the terminal, the S-NSSAI, the DNN, and an identifier of a first policy control network element set to which the first policy control network element 206 belongs; the first policy control network element 206 is configured to: receive an identifier of a second policy control network element set from the binding support network element, and send the identifier of the second policy control network element set to the first session management network element 207, where the identifier of the second policy control network element set is an identifier that is of a policy control network element set, that corresponds to the identifier of the terminal, the S-NSSAI, and the DNN, and that is stored by the binding support network element; and the first session management network element 207 is configured to: receive the identifier of the second policy control network element set from the first policy control network element 206, and select a second policy control network element for a first session based on the identifier of the second policy control network element set, where the second policy control network element belongs to the second policy control network element set.

Optionally, in this embodiment of this application, the first policy control network element 206 and the first session management network element 207 may directly communicate with each other, or may communicate with each other through forwarding performed by another device. This is not specifically limited in this embodiment of this application.

Based on the policy control system provided in this embodiment of this application, it can be ensured that a same policy control network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a unified data repository network element can be avoided.

Optionally, the policy control system shown in FIG. 1, FIG. 2, FIG. 2a, or FIG. 2b may be applied to a current 5G network architecture and another future network architecture. This is not specifically limited in the embodiments of this application.

Figure 3A:
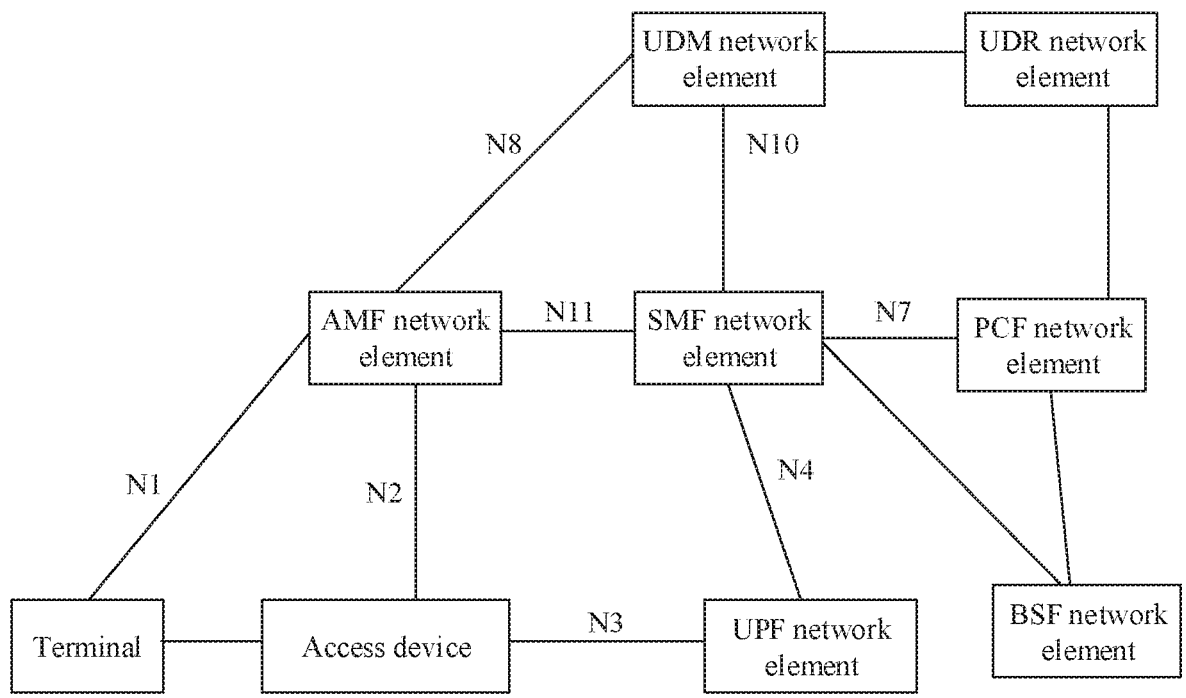
FIG. 3a is a schematic diagram in which a policy control system is applied to a non-roaming 5G network architecture according to an embodiment of this application.

For example, it is assumed that the policy control system 10 shown in FIG. 1, the policy control system 20 shown in FIG. 2, the policy control system 20a shown in FIG. 2a, or the policy control system 20b shown in FIG. 2b is applied to a current non-roaming 5G network architecture. As shown in FIG. 3a, a network element or an entity corresponding to the foregoing first session management network element or the foregoing second session management network element may be an SMF network element in the non-roaming 5G network architecture; a network element or an entity corresponding to the foregoing unified data management network element may be a unified data management (UDM) network element in the non-roaming 5G network architecture; a network element or an entity corresponding to the foregoing mobility management network element may be an AMF network element in the non-roaming 5G network architecture; a network element or an entity corresponding to the foregoing binding support network element may be a binding support function (BSF) network element in the non-roaming 5G network architecture; and a network element or an entity corresponding to the foregoing first policy control network element may be a PCF network element in the non-roaming 5G network architecture.

In addition, as shown in FIG. 3a, the non-roaming 5G network architecture may further include an access device, a user plane function (UPF) network element, a UDR network element, or the like. This is not specifically limited in the embodiments of this application.

The terminal communicates with the AMF network element through a next generation network (N) 1 interface (N1 for short), the access device communicates with the AMF network element through an N2 interface (N2 for short), the access device communicates with the UPF network element through an N3 interface (N3 for short), the AMF network element communicates with the SMF network element through an N11 interface (N11 for short), the AMF network element communicates with the UDM network element through an N8 interface (N8 for short), the SMF network element communicates with the PCF network element through an N7 interface (N7 for short), the SMF network element communicates with the UPF network element through an N4 interface (N4 for short), the SMF network element communicates with the UDM network element through an N10 interface (N10 for short), the UDM network element communicates with the UDR network element, the PCF network element communicates with the UDR network element, and the BSF network element communicates with the PCF network element and the SMF network element.

It should be noted that FIG. 3a merely shows an example that there is one SMF network element and one UPF network element. Certainly, the non-roaming 5G network architecture may include a plurality of SMF network elements and a plurality of UPF network elements. For example, the non-roaming 5G network architecture includes an SMF network element 1 and an SMF network element 2. The SMF network element 1 communicates with a UPF network element 1, and the SMF network element 2 communicates with a UPF network element 2. This is not specifically limited in the embodiments of this application. For a manner in which network elements are connected, refer to the non-roaming 5G network architecture shown in FIG. 3a. Details are not described herein again.

Figure 3B:
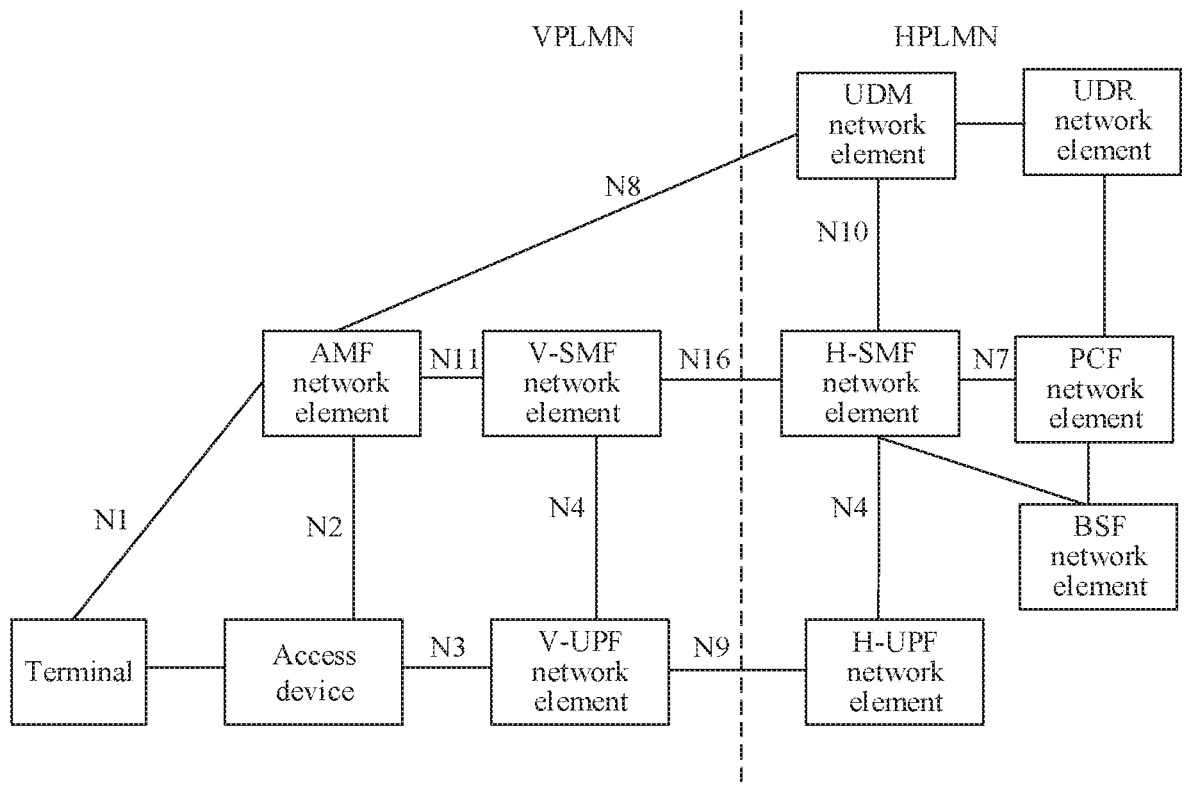
FIG. 3b is a schematic diagram in which a policy control system is applied to a home routing 5G network architecture according to an embodiment of this application.

Alternatively, for example, it is assumed that the policy control system 10 shown in FIG. 1, the policy control system 20 shown in FIG. 2, the policy control system 20a shown in FIG. 2a, or the policy control system 20b shown in FIG. 2b is applied to a current home routing 5G network architecture. As shown in FIG. 3b, a network element or an entity corresponding to the foregoing first session management network element or the foregoing second session management network element may be a home SMF (H-SMF) network element in the home routing 5G network architecture; a network element or an entity corresponding to the foregoing unified data management network element may be a UDM network element in the home routing 5G network architecture; a network element or an entity corresponding to the foregoing mobility management network element may be an AMF network element in the home routing 5G network architecture; a network element or an entity corresponding to the foregoing binding support network element may be a BSF network element in the home routing 5G network architecture; and a network element or an entity corresponding to the foregoing first policy control network element may be a PCF network element in the home routing 5G network architecture.

In addition, as shown in FIG. 3b, the home routing 5G network architecture may further include an access device, a visited SMF (V-SMF) network element, a home UPF (H-UPF) network element, a visited UPF (V-UPF) network element, a UDR network element, or the like. This is not specifically limited in the embodiments of this application. The terminal, the access device, the AMF network element, the V-SMF network element, and the V-UPF network element belong to a visited public land mobile network (VPLMN). The UDM network element, the UDR network element, the H-SMF network element, the PCF network element, the H-UPF network element, and the BSF network element belong to a home public land mobile network (HPLMN).

As shown in FIG. 3b, the terminal communicates with the AMF network element through N1, the access device communicates with the AMF network element through N2, the access device communicates with the V-UPF network element through N3, the V-UPF network element communicates with the H-UPF network element through an N9 interface (N9 for short), the AMF network element communicates with the V-SMF network element through N11, the AMF network element communicates with the UDM network element through N8, the V-SMF network element communicates with the H-SMF network element through an N16 interface (N16 for short), the H-SMF network element communicates with the PCF network element through N7, the H-SMF network element communicates with the H-UPF network element through N4, the V-SMF network element communicates with the V-UPF network element through N4, the H-SMF network element communicates with the UDM network element through N10, the PCF network element communicates with the UDR network element, and the BSF network element communicates with the PCF network element and the H-SMF network element.

It should be noted that FIG. 3b merely shows an example that there is one V-SMF network element, one H-SMF network element, one H-UPF network element, and one V-UPF network element. Certainly, the home routing 5G network architecture may include a plurality of V-SMF network elements, a plurality of H-SMF network elements, a plurality of V-UPF network elements, and a plurality of H-UPF network elements. For example, the home routing 5G network architecture includes a V-SMF network element 1, an H-SMF network element 1 communicating with the V-SMF network element 1, a V-SMF network element 2, and an H-SMF network element 2 communicating with the V-SMF network element 2. The V-SMF network element 1 communicates with a V-UPF network element 1, the V-SMF network element 2 communicates with a V-UPF network element 2, the H-SMF network element 1 communicates with an H-UPF network element 1, and the H-SMF network element 2 communicates with an H-UPF network element 2. This is not specifically limited in the embodiments of this application. For a manner in which network elements are connected, refer to the home routing 5G network architecture shown in FIG. 3b. Details are not described herein again.

It should be noted that names of the network elements or names of interfaces between the network elements in FIG. 3a or FIG. 3b are merely examples. In a specific implementation, a name of a network element or a name of an interface may be another name. This is not specifically limited in the embodiments of this application.

In addition, it should be noted that, a control plane network element such as the AMF network element, the SMF network element, the H-SMF network element, the V-SMF network element, the UDM network element, the UDR network element, or the PCF network element in the non-roaming 5G network architecture shown in FIG. 3a or in the home routing 5G network architecture shown in FIG. 3b may alternatively perform interaction by using a service-based interface. For example, a service-based interface externally provided by the AMF network element may be Namf; a service-based interface externally provided by the SMF network element may be Nsmf; a service-based interface externally provided by the H-SMF network element may be Nhsmf; a service-based interface externally provided by the V-SMF network element may be Nvsmf, a service-based interface externally provided by the UDM network element may be Nudm; a service-based interface externally provided by the UDR network element may be Nudr; a service-based interface externally provided by the PCF network element may be Npcf; and a service-based interface externally provided by the BSF network element may be Nbsf. For related descriptions, refer to a diagram of a 5G system architecture (5G system architecture) in the 23501 standard. Details are not described herein.

Optionally, the terminal (terminal) in the embodiments of this application may include various handheld devices, vehicle-mounted devices, wearable devices, and computing devices that have a wireless communication function, or other processing devices connected to a wireless modem. The terminal may further include a subscriber unit (subscriber unit), a cellular phone (cellular phone), a smartphone (smartphone), a wireless data card, a personal digital assistant (PDA) computer, a tablet computer, a wireless modem (modem), a handheld (handheld) device, a laptop computer (laptop computer), a cordless phone (cordless phone) or a wireless local loop (WLL) station, a machine type communication (MTC) terminal, user equipment (UE), a mobile station (MS), a terminal device (terminal device), relay user equipment, or the like. The relay user equipment may be, for example, a 5G residential gateway (residential gateway, RG). For ease of description, in this application, the devices mentioned above are collectively referred to as terminals.

Optionally, the access device included in the embodiments of this application is a device that accesses a core network. For example, the access device may be a base station, a broadband network gateway (BNG), an aggregation switch, or a non-3rd generation partnership project (3GPP) access device. The base station may include base stations in various forms such as a macro base station, a micro base station (also referred to as a small cell), a relay station, and an access point.

Optionally, in the embodiments of this application, the mobility management network element or the first session management network element in FIG. 1, or the network device or the first session management network element in FIG. 2, or the unified data management network element or the first session management network element in FIG. 2a, or the first policy control network element or the first session management network element in FIG. 2b may be implemented by one device, or may be jointly implemented by a plurality of devices, or may be a function module in one device. This is not specifically limited in the embodiments of this application. It may be understood that the foregoing functions may be network elements in a hardware device, or may be software functions running on dedicated hardware, or may be virtualization functions instantiated on a platform (for example, a cloud platform).

Figure 4:
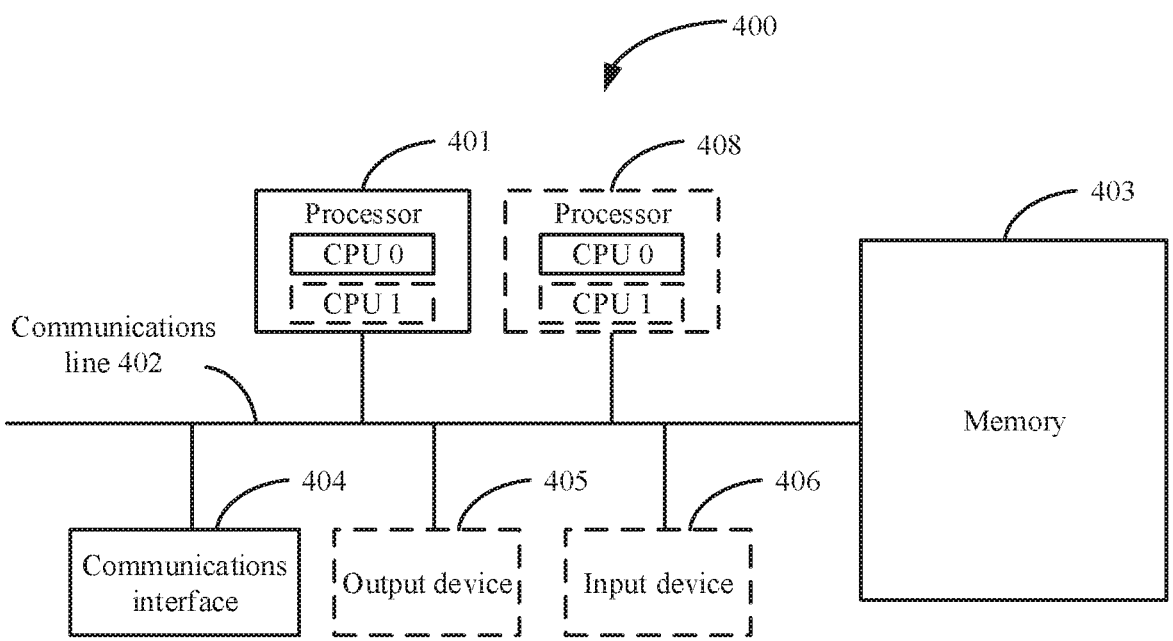
FIG. 4 is a schematic diagram of a hardware structure of a communications device according to an embodiment of this application.

For example, in the embodiments of this application, the mobility management network element or the first session management network element in FIG. 1, or the network device or the first session management network element in FIG. 2, or the unified data management network element or the first session management network element in FIG. 2a, or the first policy control network element or the first session management network element in FIG. 2b may be implemented by a communications device in FIG. 4. FIG. 4 is a schematic diagram of a hardware structure of a communications device according to an embodiment of this application. The communications device 400 includes a processor 401, a communications line 402, a memory 403, and at least one communications interface (In FIG. 4, that the communications device 400 includes a communications interface 404 is only used as an example for description).

The processor 401 may be a general-purpose central processing unit (CPU), a microprocessor, an application-specific integrated circuit (ASIC), or one or more integrated circuits configured to control execution of a program in solutions of this application.

The communications line 402 may include a path for transmitting information between the foregoing components.

The communications interface 404 uses any apparatus such as a transceiver to communicate with another device or a communications network, such as the Ethernet, a radio access network (RAN), or a wireless local area network (WLAN).

The memory 403 may be a read-only memory (ROM), another type of static storage device that can store static information and a static instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the communications line 402. The memory may alternatively be integrated with the processor.

The memory 403 is configured to store a computer executable instruction for performing the solutions in this application, and the processor 401 controls execution. The processor 401 is configured to execute the computer executable instruction stored in the memory 403, to implement a policy control method provided in the following embodiments of this application.

Optionally, the computer executable instruction in this embodiment of this application may also be referred to as application program code. This is not specifically limited in this embodiment of the application.

In a specific implementation, in an embodiment, the processor 401 may include one or more CPUs, for example, a CPU 0 and a CPU 1 in FIG. 4.

In a specific implementation, in an embodiment, the communications device 400 may include a plurality of processors, for example, the processor 401 and a processor 408 in FIG. 4. Each of the processors may be a single-core processor (single-CPU), or may be a multi-core processor (multi-CPU). The processor herein may be one or more devices, circuits, and/or processing cores configured to process data (for example, a computer program instruction).

In a specific implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector (Projector). The input device 406 communicates with the processor 401, and may receive user input in a plurality of manners. For example, the input device 406 may be a mouse, a keyboard, a touchscreen device, or a sensing device.

The communications device 400 may be a general-purpose device or a dedicated device. In a specific implementation, the communications device 400 may be a desktop computer, a portable computer, a network server, a palmtop computer (PDA), a mobile phone, a tablet computer, a wireless terminal device, an embedded device, or a device with a structure similar to that in FIG. 4. A type of the communications device 400 is not limited in this embodiment of this application.

The policy control method provided in the embodiments of this application is described below in detail with reference to FIG. 1 to FIG. 4.

It should be noted that in the following embodiments of this application, names of messages between network elements, names of parameters in the messages, or the like are merely examples, and may be other names in a specific implementation. This is not specifically limited in the embodiments of this application.

Figure 5A:
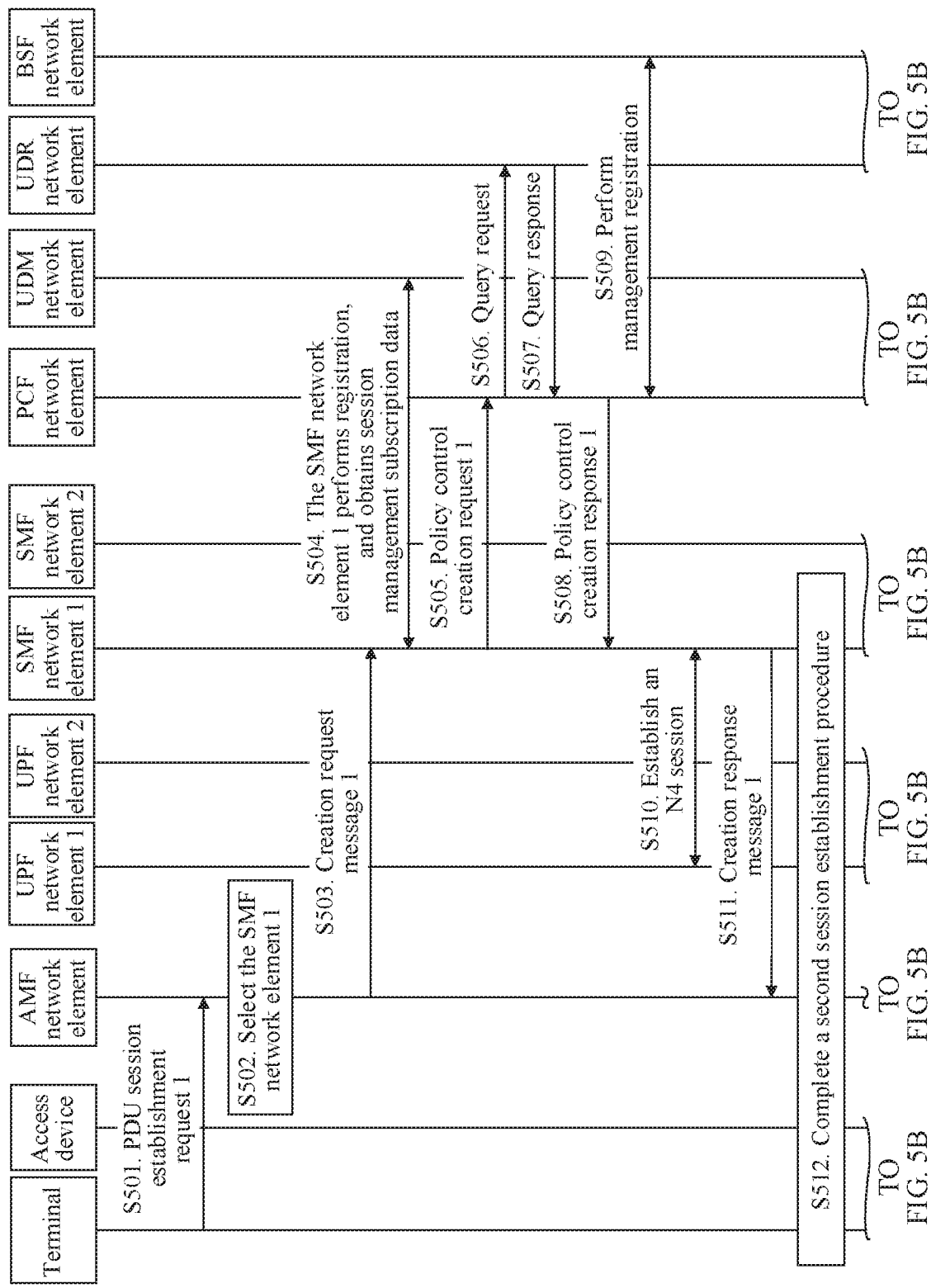
FIG. 5A and FIG. 5B are a schematic flowchart 1 of a policy control method according to an embodiment of this application.
Figure 5B:
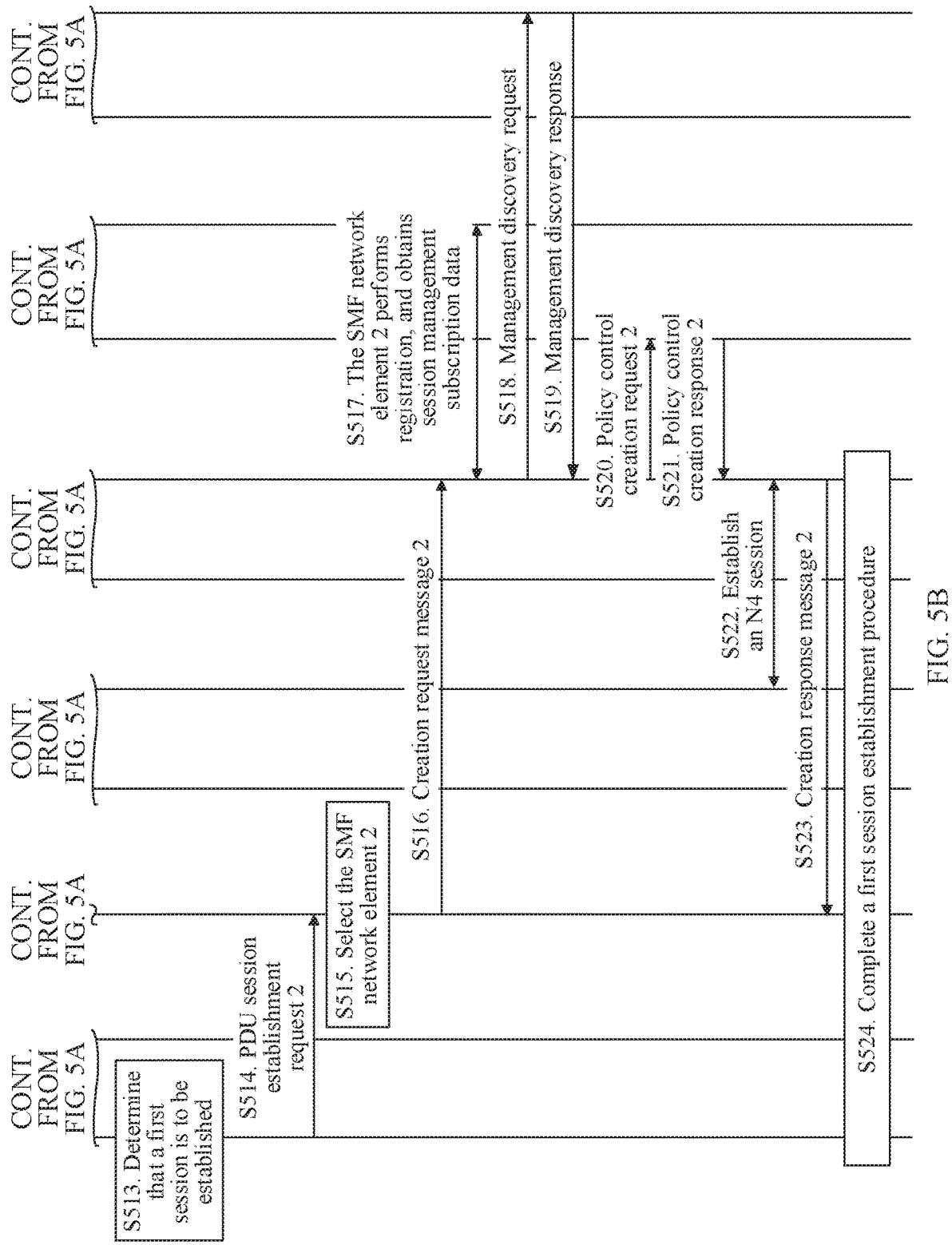

First, for example, the policy control system shown in FIG. 1 or the policy control system shown in FIG. 2a is applied to the non-roaming 5G network architecture shown in FIG. 3a, the first session management network element is an SMF network element 2, and the second session management network element is an SMF network element 1. FIG. 5A and FIG. 5B show a policy control method according to an embodiment of this application. The policy control method includes the following steps.

S501. A terminal sends a PDU session establishment request (PDU session establishment request) 1 to an AMF network element, so that the AMF network element receives the PDU session establishment request 1 from the terminal.

The PDU session establishment request 1 includes a PDU session identifier 2, and is used to request to establish a second session.

Optionally, the PDU session establishment request 1 in this embodiment of this application may further include at least one of S-NSSAI or a DNN. This is not specifically limited in this embodiment of this application.

Optionally, in this embodiment of this application, the AMF network element may determine, based on at least one of subscription data of the terminal, an operator policy, or the PDU session establishment request 1 from the terminal, S-NSSAI and a DNN that correspond to the second session.

For example, if the PDU session establishment request 1 includes the S-NSSAI and the DNN, the AMF network element may determine, based on the PDU session establishment request 1, the S-NSSAI and the DNN that correspond to the second session.

Alternatively, for example, if the PDU session establishment request 1 includes the S-NSSAI, the AMF network element may obtain, from the subscription data of the terminal or the operator policy, the DNN corresponding to the second session. Alternatively, for example, if the PDU session establishment request 1 includes the DNN, the AMF network element may obtain, from the subscription data of the terminal or the operator policy, the S-NSSAI corresponding to the second session. In other words, the AMF network element may determine, based on the PDU session establishment request 1 in combination with the subscription data of the terminal or the operator policy, the S-NSSAI and the DNN that correspond to the second session.

Alternatively, for example, if the PDU session establishment request 1 does not include the S-NSSAI or the DNN, the AMF network element may obtain, from at least one of the subscription data of the terminal or the operator policy, the DNN and the S-NSSAI that correspond to the second session. In other words, the AMF network element may determine, based on the at least one of the subscription data of the terminal or the operator policy, the S-NSSAI and the DNN that correspond to the second session.

A manner in which the AMF network element determines the S-NSSAI and the DNN that correspond to the second session is not limited in this embodiment of this application.

S502. The AMF network element selects the SMF network element 1 for the second session.

Optionally, the AMF network element may further select a PCF network element for the second session. This is not specifically limited in this embodiment of this application.

For a manner in which the AMF network element selects the SMF network element 1 and the PCF network element for the second session, refer to the prior art. Details are not described herein.

S503. The AMF network element sends, to the SMF network element 1, a creation request message 1 used to create the second session, so that the SMF network element 1 receives the creation request message 1 from the AMF network element.

The creation request message 1 includes an identifier of the terminal, the S-NSSAI, the DNN, and the PDU session identifier 2.

Optionally, if the AMF network element may further select the PCF network element for the second session, the creation request message 1 may further include an identifier of the PCF network element selected by the AMF network element for the second session, and the identifier is represented as PCF Ida. This is not specifically limited in this embodiment of this application.

For example, in this embodiment of this application, the identifier of the terminal may be, for example, a subscription permanent identifier (SUPI). A general description is provided herein. This is not specifically limited in this embodiment of this application.

Optionally, the creation request message 1 in this embodiment of this application may be a PDU session creation session management (SM) context request (PDU session create SM context request) message 1. This is not specifically limited in this embodiment of this application.

S504. The SMF network element 1 registers the second session with a UDM network element, and the SMF network element 1 obtains, from the UDM network element, session management subscription data (session management subscription data) corresponding to a combination of the identifier of the terminal, the DNN, and the S-NSSAI.

In addition, optionally, in this embodiment of this application, the SMF network element 1 may further subscribe to a subscription data change notification from the UDM network element. This is not specifically limited in this embodiment of this application.

For related implementation of step S504, refer to the prior art. Details are not described herein.

S505. After selecting a PCF network element for the second session, the SMF network element 1 sends a policy control creation request 1 to the PCF network element, so that the PCF network element receives the policy control creation request 1 from the SMF network element 1.

The policy control creation request 1 may include the identifier of the terminal, the PDU session identifier 2, the DNN, the S-NSSAI, and an internet protocol (IP) address 2 assigned by the SMF network element 1 to the second session.

Optionally, in this embodiment of this application, the SMF network element 1 may select the PCF network element for the second session based on a local policy and the identifier (which is PCF Ida herein) that is of the PCF network element and that is sent by the AMF network element, or in a manner such as performing interaction with a network repository function (NRF) network element. For details, refer to an existing implementation. The details are not described herein.

S506. The PCF network element sends a query request (query request) 1 to a UDR network element, so that the UDR network element receives the query request 1 from the PCF network element.

The query request 1 includes the identifier of the terminal, the S-NSSAI, and the DNN, and is used to query session policy-related subscription information, for example, PDU session policy control data (PDU session policy control data), and a remaining maximum allowed data amount (remaining allowed usage data). The PDU session policy control data may include, for example, a subscribed guaranteed bit rate (GBR), and the subscribed GBR indicates a maximum guaranteed bandwidth that is allowed to be authorized by the PCF network element to the terminal. The remaining maximum allowed data amount indicates remaining usage that is allowed to be authorized by the PCF network element to the terminal.

Optionally, in this embodiment of this application, the PCF network element may further subscribe to a data change notification from the UDR network element. After receiving a subscription request, the UDR network element returns an acknowledgement message to the PCF network element. This is not specifically limited in this embodiment of this application. A data change herein is a change in the session policy-related subscription information. A general description is provided herein. This is not specifically limited in this embodiment of this application.

S507. The UDR network element sends a query response (query response) 1 to the PCF network element, so that the PCF network element receives the query response 1 from the UDR network element.

The query response 1 includes the session policy-related subscription information.

S508. The PCF network element makes a policy decision based on the obtained session policy-related subscription information, and after formulating a PCC rule and another PDU session-related policy, the PCF network element sends a policy control creation response (policy control created response) 1 to the SMF network element 1, so that the SMF network element 1 receives the policy control creation response 1 from the PCF network element.

The policy control creation response includes a session policy formulated by the PCF network element.

S509. The PCF network element performs management registration with a BSF network element.

Specifically, the PCF network element may send a management registration request (management register request) to the BSF network element. The management registration request includes the identifier of the terminal, the DNN, the S-NSSAI, an identifier of the PCF network element selected by the SMF network element 1 for the second session, and the IP address 2 assigned by the SMF network element 1 to the second session. Further, after storing a correspondence among the identifier of the terminal, the DNN, the S-NSSAI, the identifier of the PCF network element, and the IP address 2, the BSF network element sends a management registration response (management register response) to the PCF network element.

S510. The SMF network element 1 formulates, based on the received session policy, a related policy (for example, a PDR, and an associated QER, URR, or FAR) to be executed on a user plane. In addition, the SMF network element 1 selects a UPF network element 1 for the second session, interacts with the UPF network element 1 to establish an N4 session, and sends the formulated policy to be executed on the user plane to the UPF network element 1. For related implementation, refer to the prior art. Details are not described herein.

S511. The SMF network element 1 sends a creation response message 1 to the AMF network element, so that the AMF network element receives the creation response message 1 from the SMF network element 1.

The creation response message 1 includes the IP address 2 assigned by the SMF network element 1 to the second session and other information. For details, refer to the prior art. The details are not described herein.

Optionally, the creation response message 1 in this embodiment of this application may be, for example, a PDU session creation SM context response (PDU session create SM context response) message 1. This is not specifically limited in this embodiment of this application.

S512. The AMF network element interacts with an access device, the terminal, or the like, to complete a subsequent establishment procedure of the second session. For related implementation, refer to the prior art. Details are not described herein.

S513. The terminal determines that a first session that has the same S-NSSAI and the same DNN as the established second session of the terminal needs to be established.

In this embodiment of this application, the terminal may determine, after being triggered by a network or the terminal, that the first session that has the same S-NSSAI and the same DNN as the established second session of the terminal needs to be established. This is not specifically limited in this embodiment of this application.

S514. The terminal sends a PDU session establishment request 2 to the AMF network element, so that the AMF network element receives the PDU session establishment request 2 from the terminal.

The PDU session establishment request 2 includes a PDU session identifier 1, and is used to request to establish the first session.

Optionally, the PDU session establishment request 2 in this embodiment of this application may further include the at least one of the S-NSSAI or the DNN. This is not specifically limited in this embodiment of this application.

For a manner in which the AMF network element determines the S-NSSAI and the DNN that correspond to the first session, refer to the manner in which the AMF network element determines the S-NSSAI and the DNN that correspond to the first session in step S501. Details are not described herein again.

S515. The AMF network element selects the SMF network element 2 for the first session.

Optionally, the AMF network element may further select a PCF network element for the first session. This is not specifically limited in this embodiment of this application.

For a manner in which the AMF network element selects the SMF network element 1 and the PCF network element for the first session, refer to the prior art. Details are not described herein.

It should be noted that in this embodiment of this application, the AMF network element may select different SMF network elements for different sessions of the terminal because load balancing of the SMF network element is considered, the SMF network element needs to be disabled, or the like. This is not specifically limited in this embodiment of this application.

S516. The AMF network element sends, to the SMF network element 2, a creation request message 2 used to create the first session, so that the SMF network element 2 receives the creation request message 2 from the AMF network element.

The creation request message 2 includes the identifier of the terminal, the S-NSSAI, the DNN, and the PDU session identifier 1.

Optionally, if the AMF network element may further select the PCF network element for the first session, the creation request message 2 may further include an identifier of the PCF network element selected by the AMF network element for the first session, and the identifier is represented as PCF Ida. This is not specifically limited in this embodiment of this application.

Optionally, in this embodiment of this application, if the AMF network element determines that the first session that is of the terminal and that is being established has the same S-NSSAI and the same DNN as the established second session of the terminal, the creation request message 2 may further include indication information. The indication information is used to instruct the SMF network element 2 to obtain the identifier of the PCF network element from the BSF network element; or the indication information is used to indicate that a session that is of the terminal and that has the same S-NSSAI and the same DNN as the first session is established; or the indication information is used to indicate that the first session has corresponding PCF binding information. The PCF binding information is a correspondence between the identifier of the PCF network element and a combination of the identifier of the terminal, the S-NSSAI, and the DNN. In this case, after receiving the indication information, the SMF network element 2 may request, from the BSF network element, the identifier that is of the PCF network element and that corresponds to the identifier of the terminal, the S-NSSAI, and the DNN. This is not specifically limited in this embodiment of this application.

Optionally, in this embodiment of this application, after determining that the terminal establishes the first session in a non-roaming scenario, the AMF network element may add the indication information to the creation request message 2 sent to the SMF network element 2. This is not specifically limited in this embodiment of this application. For example, that the AMF network element determines that the terminal establishes the first session in the non-roaming scenario may be as follows: The AMF network element determines that the terminal that establishes the first session is located in a home network. A description is provided herein. Details are not described below again.

Optionally, in this embodiment of this application, that the AMF network element determines that the first session that is of the terminal and that is being established has the same S-NSSAI and the same DNN as the established second session of the terminal may specifically include: The AMF network element determines, based on at least one of the subscription data of the terminal, the operator policy, and the PDU session establishment request 2 from the terminal, that the first session that is of the terminal and that is being established has the same S-NSSAI and the same DNN as the established second session of the terminal.

For example, the AMF network element may determine, based on the at least one of the subscription data of the terminal, the operator policy, or the PDU session establishment request 2 from the terminal, the S-NSSAI and the DNN that correspond to the first session. Further, the AMF network element determines, based on the S-NSSAI and the DNN that correspond to the first session, and the S-NSSAI and the DNN that correspond to the second session, that the first session that is of the terminal and that is being established has the same S-NSSAI and the same DNN as the established second session of the terminal.

For a manner in which the AMF network element determines, based on the at least one of the subscription data of the terminal, the operator policy, or the PDU session establishment request 2 from the terminal, the S-NSSAI and the DNN that correspond to the first session, refer to the foregoing embodiment. Details are not described herein again.

Optionally, the creation request message 2 in this embodiment of this application may be, for example, a PDU session creation session management SM context request message 2. This is not specifically limited in this embodiment of this application.

Optionally, in this embodiment of this application, that the AMF network element determines that the first session that is of the terminal and that is being established has the same S-NSSAI and the same DNN as the established second session of the terminal may alternatively be replaced with a case in which the AMF network element determines that the first session has the corresponding PCF binding information. The PCF binding information is the correspondence between the identifier of the PCF network element and the combination of the identifier of the terminal, the S-NSSAI, and the DNN. This is not specifically limited in this embodiment of this application.

S517. The SMF network element 2 registers the first session with the UDM network element, and the SMF network element 2 obtains, from the UDM network element, session management subscription data corresponding to the combination of the identifier of the terminal, the DNN, and the S-NSSAI.

In addition, optionally, in this embodiment of this application, the SMF network element 2 may further subscribe to the subscription data change notification from the UDM network element. This is not specifically limited in this embodiment of this application.

Optionally, in this embodiment of this application, if the UDM network element determines that the first session that is of the terminal and that is being established has the same S-NSSAI and the same DNN as the established second session of the terminal, the UDM network element further sends indication information to the SMF network element 2. The indication information is used to instruct the SMF network element 2 to obtain the identifier of the PCF network element from the BSF network element; or the indication information is used to indicate that a session that is of the terminal and that has the same S-NSSAI and the same DNN as the first session is established; or the indication information is used to indicate that the first session has the corresponding PCF binding information. The PCF binding information is the correspondence between the identifier of the PCF network element and the combination of the identifier of the terminal, the S-NSSAI, and the DNN. In this case, after receiving the indication information, the SMF network element 2 may request, from the BSF network element, the identifier that is of the PCF network element and that corresponds to the identifier of the terminal, the S-NSSAI, and the DNN.

Optionally, in this embodiment of this application, if the UDM network element determines that the first session that is of the terminal and that is being established has the same S-NSSAI and the same DNN as the established second session of the terminal, the UDM network element may send the indication information to the SMF network element 2 after determining that the terminal establishes the first session in the non-roaming scenario. This is not specifically limited in this embodiment of this application. For example, that the UDM network element determines that the terminal establishes the first session in the non-roaming scenario may be as follows: The UDM network element determines that the terminal that establishes the first session is located in the home network. A description is provided herein. Details are not described below again.

Optionally, in this embodiment of this application, that the UDM network element determines that the first session that is of the terminal and that is being established has the same S-NSSAI and the same DNN as the established second session of the terminal may alternatively be replaced with a case in which the UDM network element determines that the first session has the corresponding PCF binding information. The PCF binding information is the correspondence between the identifier of the PCF network element and the combination of the identifier of the terminal, the S-NSSAI, and the DNN. This is not specifically limited in this embodiment of this application.

For related implementation of step S517, refer to the prior art. Details are not described herein.

S518. The SMF network element 2 sends a management discovery request (management discovery request) to the BSF network element based on a configuration, so that the BSF network element receives the management discovery request from the SMF network element 2.

The management discovery request includes the identifier of the terminal, the S-NSSAI, and the DNN, and is used to request the identifier that is of the PCF network element and that corresponds to the identifier of the terminal, the S-NSSAI, and the DNN.

S519. The BSF network element sends a management discovery response (management discovery response) to the SMF network element 2, so that the SMF network element 2 receives the management discovery response from the BSF network element.

The management discovery response includes the identifier that is of the PCF network element and that corresponds to the identifier of the terminal, the S-NSSAI, and the DNN.

Optionally, in this embodiment of this application, the BSF network element may determine, based on the identifier of the terminal, the S-NSSAI, and the DNN that are carried in the management discovery request, and in combination with the prestored correspondence between the PCF network element and the combination of the identifier of the terminal, the S-NSSAI, and the DNN, the identifier that is of the PCF network element and that corresponds to the identifier of the terminal, the S-NSSAI, and the DNN. This is not specifically limited in this embodiment of this application.

Optionally, in this embodiment of this application, the SMF network element 2 may always interact with the BSF network element based on the configuration in the foregoing manner, to attempt to obtain the identifier that is of the PCF network element and that corresponds to the identifier of the terminal, the S-NSSAI, and the DNN. If no sessions of the terminal have a same DNN and same S-NSSAI, the BSF network element does not return an identifier of any PCF network element. In this case, the SMF network element 2 may select the PCF network element in another manner. For example, the SMF network element 2 selects the PCF network element based on a local configuration, the identifier that is of the PCF network element and that is provided by the AMF network element, or an identifier that is of the PCF network element and that is provided by the NRF network element. This is not specifically limited in this embodiment of this application.

Optionally, in this embodiment of this application, if the creation request message 2 in step S516 includes the indication information, or the UDM network element sends the indication information to the SMF 2 in step S517, the SMF network element 2 may send the management discovery request to the BSF network element based on the indication information, and therefore, obtain the corresponding identifier of the PCF network element. This is not specifically limited in this embodiment of this application.

S520. The SMF network element 2 sends a policy control creation request 2 to the corresponding PCF network element based on the identifier of the PCF network element, so that the PCF network element receives the policy control creation request 2 from the SMF network element 2.

The policy control creation request 2 may include the identifier of the terminal, the PDU session identifier 1, the DNN, the S-NSSAI, and an IP address 1 assigned by the SMF network element 2 to the first session.

S521. The PCF network element sends a policy control creation response 2 to the SMF network element 2, so that the SMF network element 2 receives the policy control creation response 2 from the PCF network element.

The policy control creation response includes a session policy formulated by the PCF network element.

S522. The SMF network element 2 formulates, based on the received session policy, a related policy (for example, a PDR, and an associated QER, URR, or FAR) to be executed on the user plane. In addition, the SMF network element 2 selects a UPF network element 2 for the first session, interacts with the UPF network element 2 to establish an N4 session, and sends the formulated policy to be executed on the user plane to the UPF network element 2. For related implementation, refer to the prior art. Details are not described herein.

S523. The SMF network element 2 sends a creation response message 2 to the AMF network element, so that the AMF network element receives the creation response message 2 from the SMF network element 2.

The creation response message 2 includes the IP address 1 assigned by the SMF network element 2 to the first session and other information. For details, refer to the prior art. The details are not described herein.

Optionally, the creation response message 2 in this embodiment of this application may be, for example, a PDU session creation SM context response message 2. This is not specifically limited in this embodiment of this application.

S524. The AMF network element interacts with the access device, the terminal, or the like, to complete a subsequent establishment procedure of the first session. For related implementation, refer to the prior art. Details are not described herein.

According to the policy control method provided in this embodiment of this application, it can be ensured that a same PCF network element is selected for a plurality of sessions of a same terminal that have same S-NSSAI and a same DNN. Therefore, a conflict between policies formulated for the plurality of PDU sessions of the same terminal that have the same S-NSSAI and the same DNN and the subscription information obtained from the UDR network element can be avoided. For an analysis of a related technical effect, refer to the foregoing policy control system part. Details are not described herein again.

Actions of the AMF network element or actions of the SMF network element 2 in steps S501 to S524 may be performed by the processor 401 in the communications device 400 shown in FIG. 4 by invoking the application program code stored in the memory 403. This is not limited in this embodiment.

Optionally, for example, the policy control system shown in FIG. 1 is applied to the home routing 5G network architecture shown in FIG. 3b, the first session management network element is an H-SMF network element 2, and the second session management network element is an H-SMF network element 1. An embodiment of this application may further provide a policy control method similar to the embodiment shown in FIG. 5A and FIG. 5B. For example, a difference lies in the following: The SMF network element 1 in the embodiment shown in FIG. 5A and FIG. 5B is replaced with the H-SMF network element 1 in this embodiment of this application, the SMF network element 2 shown in FIG. 5A and FIG. 5B is replaced with the H-SMF network element 2 in this embodiment of this application, the UPF network element 1 in the embodiment shown in FIG. 5A and FIG. 5B is replaced with an H-UPF network element 1 in this embodiment of this application, and the UPF network element 2 in the embodiment shown in FIG. 5A and FIG. 5B is replaced with an H-UPF network element 2 in this embodiment of this application. Correspondingly, when selecting the H-SMF network element 1, the AMF network element needs to select a V-SMF network element 1 in a visited place. Information exchanged between the AMF network element and the H-SMF network element 1 needs to be forwarded by the V-SMF network element 1. When selecting the H-SMF network element 2, the AMF network element needs to select a V-SMF network element 2 in the visited place (the V-SMF network element 1 and the V-SMF network element 2 may be the same or different, and this is not specifically limited in this embodiment of this application). Information exchanged between the AMF network element and the H-SMF network element 2 needs to be forwarded by the V-SMF network element 2. For example, the AMF network element sends, to the H-SMF network element 1 by using the V-SMF network element 1, a creation request message 1 used to create a second session, so that the H-SMF network element 1 receives the creation request message 1 from the AMF network element. The AMF network element sends, to the H-SMF network element 2 by using the V-SMF network element 2, a creation request message 2 used to create a first session, so that the H-SMF network element 2 receives the creation request message 2 from the AMF network element. In addition, the H-SMF network element 1 and the H-SMF network element 2 interact with a UDM network element, to register the second session and the first session respectively. Optionally, after determining that a terminal establishes the first session in a home routing scenario, the AMF network element may add indication information to the creation request message 2 sent to the H-SMF network element 2 by using the V-SMF network element 2. The indication information is used to instruct the H-SMF network element 2 to obtain an identifier of a PCF network element from a BSF network element; or the indication information is used to indicate that a session that is of the terminal and that has the same S-NSSAI and the same DNN as the first session is established; or the indication information is used to indicate that the first session has corresponding binding information. For example, that the AMF network element determines that the terminal establishes the first session in the home routing scenario may be: determining, based on the at least one of subscription data of the terminal, an operator policy, and a PDU session establishment request 2 from the terminal, that the terminal establishes the first session in the home routing scenario. For other related descriptions, refer to the embodiment shown in FIG. 5A and FIG. 5B. Details are not described herein again.

Optionally, after determining that a terminal establishes the first session in a home routing scenario, the UDM network element may add indication information to an answer message that is of a registration request and that is sent to the H-SMF network element 2. The indication information is used to instruct the H-SMF network element 2 to obtain an identifier of a PCF network element from a BSF network element; or the indication information is used to indicate that a session that is of the terminal and that has the same S-NSSAI and the same DNN as the first session is established; or the indication information is used to indicate that the first session has corresponding binding information. For example, that the UDM network element determines that the terminal establishes the first session in the home routing scenario may be as follows: The UDM network element determines that the H-SMF network element 2 that requests to perform registration is an SMF network element located in a home network. For other related descriptions, refer to the embodiment shown in FIG. 5A and FIG. 5B. Details are not described herein again.

Figure 6A:
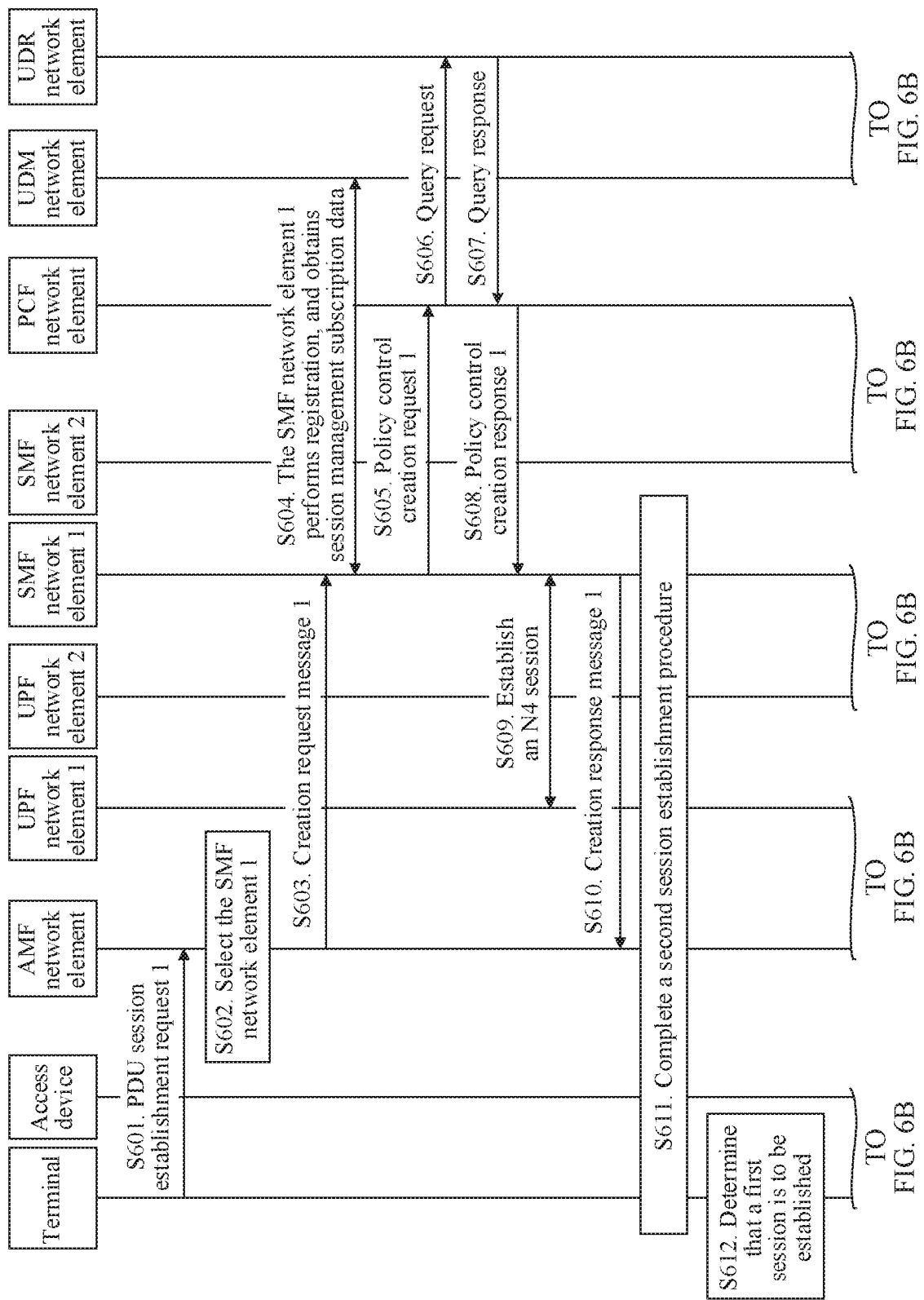

Optionally, for example, the policy control system shown in FIG. 2 is applied to the 5G network shown in FIG. 3a, the first session management network element is an SMF network element 2, the second session management network element is an SMF network element 1, and the network device is an AMF network element. FIG. 6A and FIG. 6B show a policy control method according to an embodiment of this application. The policy control method includes the following steps.

Steps S601 to S608 are the same as steps S501 to S508 in the embodiment shown in FIG. 5A and FIG. 5B. For related descriptions, refer to the embodiment shown in FIG. 5A and FIG. 5B. Details are not described herein again.

Step S609 is the same as step S510 in the embodiment shown in FIG. 5A and FIG. 5B. For related descriptions, refer to the embodiment shown in FIG. 5A and FIG. 5B. Details are not described herein again.

Step S610 is similar to step S511 in the embodiment shown in FIG. 5A and FIG. 5B. For example, a difference lies in the following: In this embodiment of this application, a creation response message 1 needs to carry an identifier of the PCF network element selected by the SMF network element 1 for the second session. In this case, after receiving the creation response message 1, the AMF network element may store a correspondence between the identifier of the PCF network element and a combination of an identifier of a terminal, S-NSSAI, and a DNN. For other related descriptions, refer to the embodiment shown in FIG. 5A and FIG. 5B. Details are not described herein again.

Steps S611 to S614 are the same as steps S512 to S515 in the embodiment shown in FIG. 5A and FIG. 5B. For related descriptions, refer to the embodiment shown in FIG. 5A and FIG. 5B. Details are not described herein again.

S615. Optionally, the AMF network element determines that the terminal establishes the first session in the non-roaming scenario. For related descriptions, refer to step S516 in the embodiment shown in FIG. 5A and FIG. 5B. Details are not described herein again.

S616. If the AMF network element determines that the first session that is of the terminal and that is being established has the same S-NSSAI and the same DNN as the established second session of the terminal, the AMF network element sends, to the SMF network element 2, a creation request message 2 used to create the first session, so that the SMF network element 2 receives the creation request message 2 from the AMF network element.

The creation request message 2 includes the identifier of the terminal, the S-NSSAI, the DNN, the identifier of the PCF network element selected by the SMF network element 1 for the second session, and a PDU session identifier 1.

For a manner in which the AMF network element determines that the first session that is of the terminal and that is being established has the same S-NSSAI and the same DNN as the established second session of the terminal, refer to the embodiment shown in FIG. 5A and FIG. 5B. Details are not described herein again.

Optionally, in this embodiment of this application, the AMF network element may determine, based on the obtained identifier of the terminal, the S-NSSAI, and the DNN, and in combination with the prestored correspondence between the PCF network element and a combination of an identifier of a terminal, S-NSSAI, and a DNN, the identifier that is of the PCF network element and that corresponds to the identifier of the terminal, the S-NSSAI, and the DNN, namely, the identifier of the PCF network element selected by the SMF network element 1 for the second session. This is not specifically limited in this embodiment of this application.

Optionally, if the AMF network element may further select a PCF network element for the first session, the creation request message 2 may further include an identifier of the PCF network element selected by the AMF network element for the first session, and the identifier is represented as PCF Ida. This is not specifically limited in this embodiment of this application.

To distinguish, from an identifier of a PCF network element selected by an AMF in the prior art, the identifier of the PCF network element selected by the SMF network element 1 for the second session, in a possible implementation, a special field in a message carries the identifier of the PCF network element selected by the SMF network element 1 for the second session, to indicate that the PCF network element corresponding to the identifier of the PCF network element is a PCF network element selected by an SMF network element. This is not specifically limited in this embodiment of this application. The special field may be an existing field in the message, or may be a newly added field. This is not limited herein.

Alternatively, to distinguish, from an identifier of a PCF network element selected by an AMF in the prior art, the identifier of the PCF network element selected by the SMF network element 1 for the second session, in a possible implementation, indication information may be added to the creation request message 2. The indication information is used to indicate that the PCF network element corresponding to the identifier of the PCF network element is the PCF network element selected by the SMF network element 1; or the indication information is used to instruct the SMF network element 2 to select the PCF network element corresponding to the identifier of the PCF network element. This is not specifically limited in this embodiment of this application.

Step S617 is the same as step S517 in the embodiment shown in FIG. 5A and FIG. 5B. For related descriptions, refer to the embodiment shown in FIG. 5A and FIG. 5B. Details are not described herein again.

Steps S618 to S622 are the same as steps S520 to S524 in the embodiment shown in FIG. 5A and FIG. 5B. For related descriptions, refer to the embodiment shown in FIG. 5A and FIG. 5B. Details are not described herein again.

According to the policy control method provided in this embodiment of this application, it can be ensured that a same PCF network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a UDR network element can be avoided. For an analysis of a related technical effect, refer to the foregoing policy control system part. Details are not described herein again.

Actions of the AMF network element or actions of the SMF network element 2 in steps S601 to S622 may be performed by the processor 401 in the communications device 400 shown in FIG. 4 by invoking the application program code stored in the memory 403. This is not limited in this embodiment.

Optionally, for example, the policy control system shown in FIG. 2 is applied to the home routing 5G network architecture shown in FIG. 3b, the first session management network element is an H-SMF network element 2, the second session management network element is an H-SMF network element 1, and the network device is an AMF network element. An embodiment of this application may further provide a policy control method similar to the embodiment shown in FIG. 6A and FIG. 6B. For example, a difference lies in the following: The SMF network element 1 in the embodiment shown in FIG. 6A and FIG. 6B is replaced with the H-SMF network element 1 in this embodiment of this application, the SMF network element 2 shown in FIG. 6A and FIG. 6B is replaced with the H-SMF network element 2 in this embodiment of this application, the UPF network element 1 in the embodiment shown in FIG. 6A and FIG. 6B is replaced with an H-UPF network element 1 in this embodiment of this application, and the UPF network element 2 in the embodiment shown in FIG. 6A and FIG. 6B is replaced with an H-UPF network element 2 in this embodiment of this application. Correspondingly, when selecting the H-SMF network element 1, the AMF network element needs to select a V-SMF network element 1 in a visited place. Information exchanged between the AMF network element and the H-SMF network element 1 needs to be forwarded by the V-SMF network element 1. When selecting the H-SMF network element 2, the AMF network element needs to select a V-SMF network element 2 in the visited place (the V-SMF network element 1 and the V-SMF network element 2 may be the same or different, and this is not specifically limited in this embodiment of this application). Information exchanged between the AMF network element and the H-SMF network element 2 needs to be forwarded by the V-SMF network element 2. For example, the AMF network element sends, to the H-SMF network element 1 by using the V-SMF network element 1, a creation request message 1 used to create a second session, so that the H-SMF network element 1 receives the creation request message 1 from the AMF network element. The AMF network element sends, to the H-SMF network element 2 by using the V-SMF network element 2, a creation request message 2 used to create a first session, so that the H-SMF network element 2 receives the creation request message 2 from the AMF network element. Optionally, after determining that a terminal establishes the first session in a home routing scenario, the AMF network element may perform a step similar to step S616. For example, that the AMF network element determines that the terminal requests to establish the first session in the home routing scenario may be: determining, based on at least one of subscription data of the terminal, an operator policy, and a PDU session establishment request 2 from the terminal, that the terminal establishes the first session in the home routing scenario. For other related descriptions, refer to the embodiment shown in FIG. 6A and FIG. 6B. Details are not described herein again.

Figure 7A:
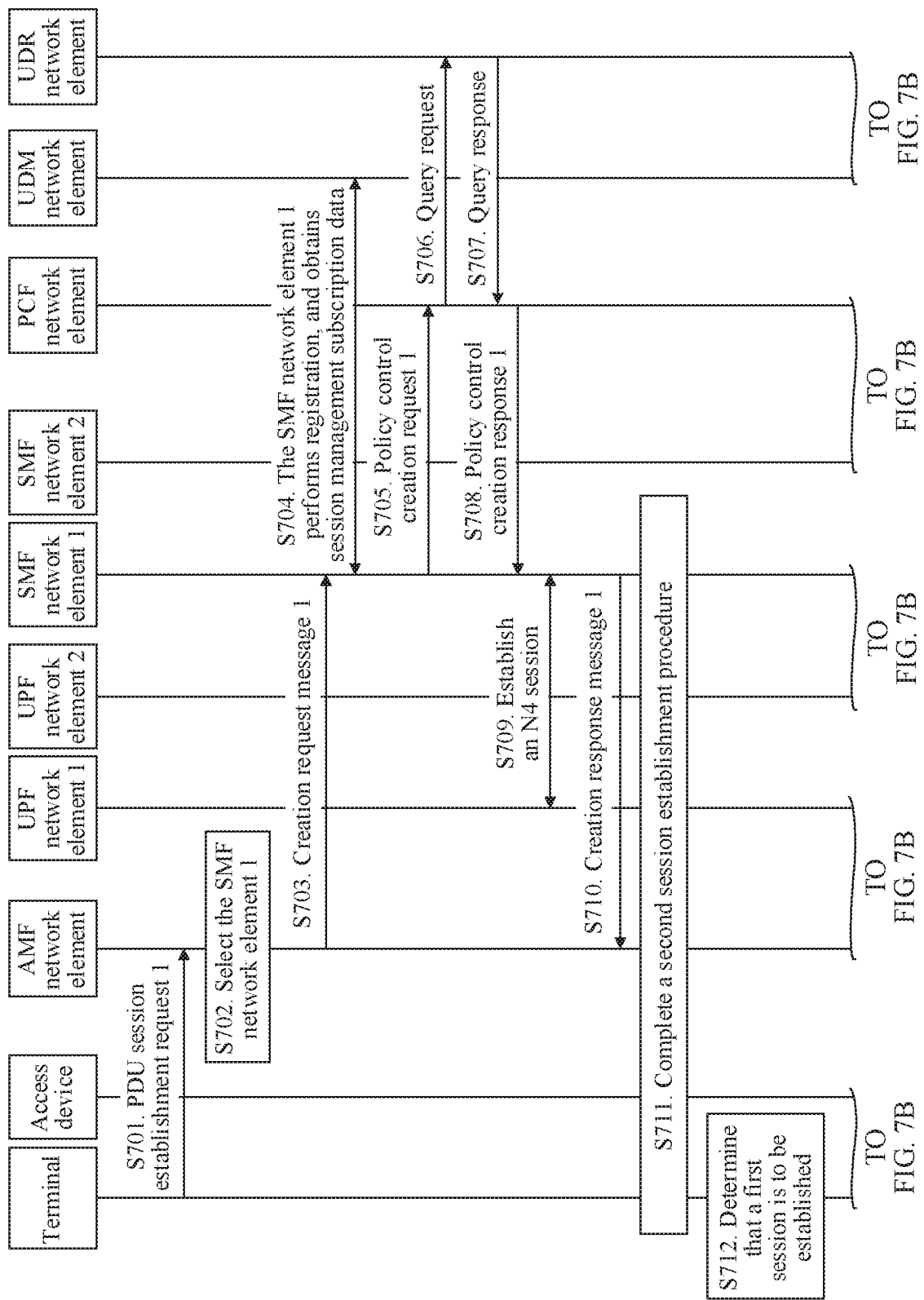

Optionally, for example, the policy control system shown in FIG. 2 is applied to the 5G network shown in FIG. 3a, the first session management network element is an SMF network element 2, the second session management network element is an SMF network element 1, and the network device is a UDM network element. FIG. 7A and FIG. 7B show a policy control method according to an embodiment of this application. The policy control method includes the following steps.

Steps S701 to S703 are the same as steps S501 to S503 in the embodiment shown in FIG. 5A and FIG. 5B. For related descriptions, refer to the embodiment shown in FIG. 5A and FIG. 5B. Details are not described herein again.

Optionally, in this embodiment of this application, the AMF network element may add indication information in step S703. The indication information is used to instruct the SMF network element 1 to preferably select a PCF network element. This is not specifically limited in this embodiment of this application.

Step S704 is similar to step S504 in the embodiment shown in FIG. 5A and FIG. 5B. For example, a difference lies in the following: In this embodiment of this application, the SMF 1 selects the PCF network element based on a configuration, and when the SMF network element 1 performs registration with the UDM network element, an identifier of a PCF network element selected by the SMF network element 1 for the second session needs to be carried. In this case, the UDM network element may store a correspondence between the identifier of the PCF network element and a combination of an identifier of the terminal, S-NSSAI, and a DNN. For other related descriptions, refer to the embodiment shown in FIG. 5A and FIG. 5B. Details are not described herein again.

Optionally, in this embodiment of this application, if the indication information is included in step S703, the SMF network element 1 may preferably select the PCF network element based on the indication information, and then perform step S704. This is not specifically limited in this embodiment of this application.

Optionally, in this embodiment of this application, if the SMF network element 1 does not preferably select the PCF network element, a request message for performing, by the SMF network element 1, registration with the UDM network element does not carry the identifier of the PCF network element. Instead, after selecting the PCF network element, the SMF network element sends, to the UDM network element, the request message that carries the identifier of the PCF network element selected by the SMF network element 1 for the second session. This is not specifically limited in this embodiment of this application.

Steps S705 to S708 are the same as steps S505 to S508 in the embodiment shown in FIG. 5A and FIG. 5B. For related descriptions, refer to the embodiment shown in FIG. 5A and FIG. 5B. Details are not described herein again.

Steps S709 to S714 are the same as steps S510 to S515 in the embodiment shown in FIG. 5A and FIG. 5B. For related descriptions, refer to the embodiment shown in FIG. 5A and FIG. 5B. Details are not described herein again.

S715. The AMF network element sends, to the SMF network element 2, a creation request message 2 used to create the first session, so that the SMF network element 2 receives the creation request message 2 from the AMF network element.

The creation request message 2 includes the identifier of the terminal, the S-NSSAI, the DNN, and a PDU session identifier 1.

Optionally, if the AMF network element may further select a PCF network element for the first session, the creation request message 2 may further include an identifier of the PCF network element selected by the AMF network element for the first session, and the identifier is represented as PCF Ida. This is not specifically limited in this embodiment of this application.

Step S716 is similar to step S517 in the embodiment shown in FIG. 5A and FIG. 5B. For example, a difference lies in the following: In this embodiment of this application, when the SMF network element 2 performs registration with the UDM network element, if the UDM network element determines that the first session that is of the terminal and that is being established has the same S-NSSAI and the same DNN as the established second session of the terminal, the UDM network element may determine, based on the identifier of the terminal, the S-NSSAI, and the DNN that are carried in a registration request and in combination with the prestored correspondence between the PCF network element and a combination of an identifier of the terminal, S-NSSAI, and a DNN, the identifier that is of the PCF network element and that corresponds to the identifier of the terminal, the S-NSSAI, and the DNN, and further send the identifier of the PCF network element to the SMF network element 2. This is not specifically limited in this embodiment of this application.

Optionally, in this embodiment of this application, the UDM network element may determine, based on the identifier of the terminal, the S-NSSAI, and the DNN that are carried in the registration request sent when the SMF network element 2 performs registration with the UDM network element, that the first session that is of the terminal and that is being established has the same S-NSSAI and the same DNN as the established second session of the terminal. This is not specifically limited in this embodiment of this application.

Optionally, in this embodiment of this application, after determining that the terminal establishes the first session in a non-roaming scenario, the UDM network element may send, to the SMF network element 2, the identifier that is of the PCF network element and that corresponds to the identifier of the terminal, the S-NSSAI, and the DNN. This is not specifically limited in this embodiment of this application. For example, that the UDM network element determines that the terminal establishes the first session in the non-roaming scenario may be as follows: The UDM network element determines that the SMF network element 2 that requests to perform registration is an SMF network element located in a home network. A description is provided herein. Details are not described below again.

Optionally, in this embodiment of this application, that the UDM network element determines that the first session that is of the terminal and that is being established has the same S-NSSAI and the same DNN as the established second session of the terminal may alternatively be replaced with a case in which the UDM network element determines that the first session has corresponding PCF binding information. The PCF binding information is the correspondence between the identifier of the PCF network element and a combination of an identifier of the terminal, S-NSSAI, and a DNN. This is not specifically limited in this embodiment of this application.

Steps S717 to S721 are the same as steps S520 to S524 in the embodiment shown in FIG. 5A and FIG. 5B. For related descriptions, refer to the embodiment shown in FIG. 5A and FIG. 5B. Details are not described herein again.

According to the policy control method provided in this embodiment of this application, it can be ensured that a same PCF network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a UDR network element can be avoided. For an analysis of a related technical effect, refer to the foregoing policy control system part. Details are not described herein again.

Actions of the UDM network element or actions of the SMF network element 2 in steps S701 to S721 may be performed by the processor 401 in the communications device 400 shown in FIG. 4 by invoking the application program code stored in the memory 403. This is not limited in this embodiment.

Optionally, for example, the policy control system shown in FIG. 2 is applied to the home routing 5G network architecture shown in FIG. 3b, the first session management network element is an H-SMF network element 2, the second session management network element is an H-SMF network element 1, and the network device is a UDM network element. An embodiment of this application may further provide a policy control method similar to the embodiment shown in FIG. 7A and FIG. 7B. For example, a difference lies in the following: The SMF network element 1 in the embodiment shown in FIG. 7A and FIG. 7B is replaced with the H-SMF network element 1 in this embodiment of this application, the SMF network element 2 shown in FIG. 7A and FIG. 7B is replaced with the H-SMF network element 2 in this embodiment of this application, the UPF network element 1 in the embodiment shown in FIG. 7A and FIG. 7B is replaced with an H-UPF network element 1 in this embodiment of this application, and the UPF network element 2 in the embodiment shown in FIG. 7A and FIG. 7B is replaced with an H-UPF network element 2 in this embodiment of this application. Correspondingly, when selecting the H-SMF network element 1, the AMF network element needs to select a V-SMF network element 1 in a visited place. Information exchanged between the AMF network element and the H-SMF network element 1 needs to be forwarded by the V-SMF network element 1. When selecting the H-SMF network element 2, the AMF network element needs to select a V-SMF network element 2 in the visited place (the V-SMF network element 1 and the V-SMF network element 2 may be the same or different, and this is not specifically limited in this embodiment of this application). Information exchanged between the AMF network element and the H-SMF network element 2 needs to be forwarded by the V-SMF network element 2. For example, the AMF network element sends, to the H-SMF network element 1 by using the V-SMF network element 1, a creation request message 1 used to create a second session, so that the H-SMF network element 1 receives the creation request message 1 from the AMF network element. The AMF network element sends, to the H-SMF network element 2 by using the V-SMF network element 2, a creation request message 2 used to create a first session, so that the H-SMF network element 2 receives the creation request message 2 from the AMF network element. Optionally, after determining that a terminal establishes a first session in a home routing scenario, the UDM network element may send, to the H-SMF network element 2, an identifier that is of a PCF network element and that corresponds to an identifier of a terminal, S-NSSAI, and a DNN. This is not specifically limited in this embodiment of this application. For example, that the UDM network element determines that the terminal establishes the first session in the home routing scenario may be as follows: The UDM network element determines that an H-SMF network element 2 that requests to perform registration is an SMF network element located in a home network. For other related descriptions, refer to the embodiment shown in FIG. 7A and FIG. 7B. Details are not described herein again.

It should be noted that descriptions, in FIG. 7A and FIG. 7B, of a difference between a case in which the policy control system shown in FIG. 2 is applied to the 5G network shown in FIG. 3a and a case in which the policy control system shown in FIG. 2 is applied to the home routing 5G network architecture shown in FIG. 3b is also applicable to the following FIG. 12A and FIG. 12B to FIG. 14A and FIG. 14B. A description is provided herein. Details are not described below again.

Figure 12A:
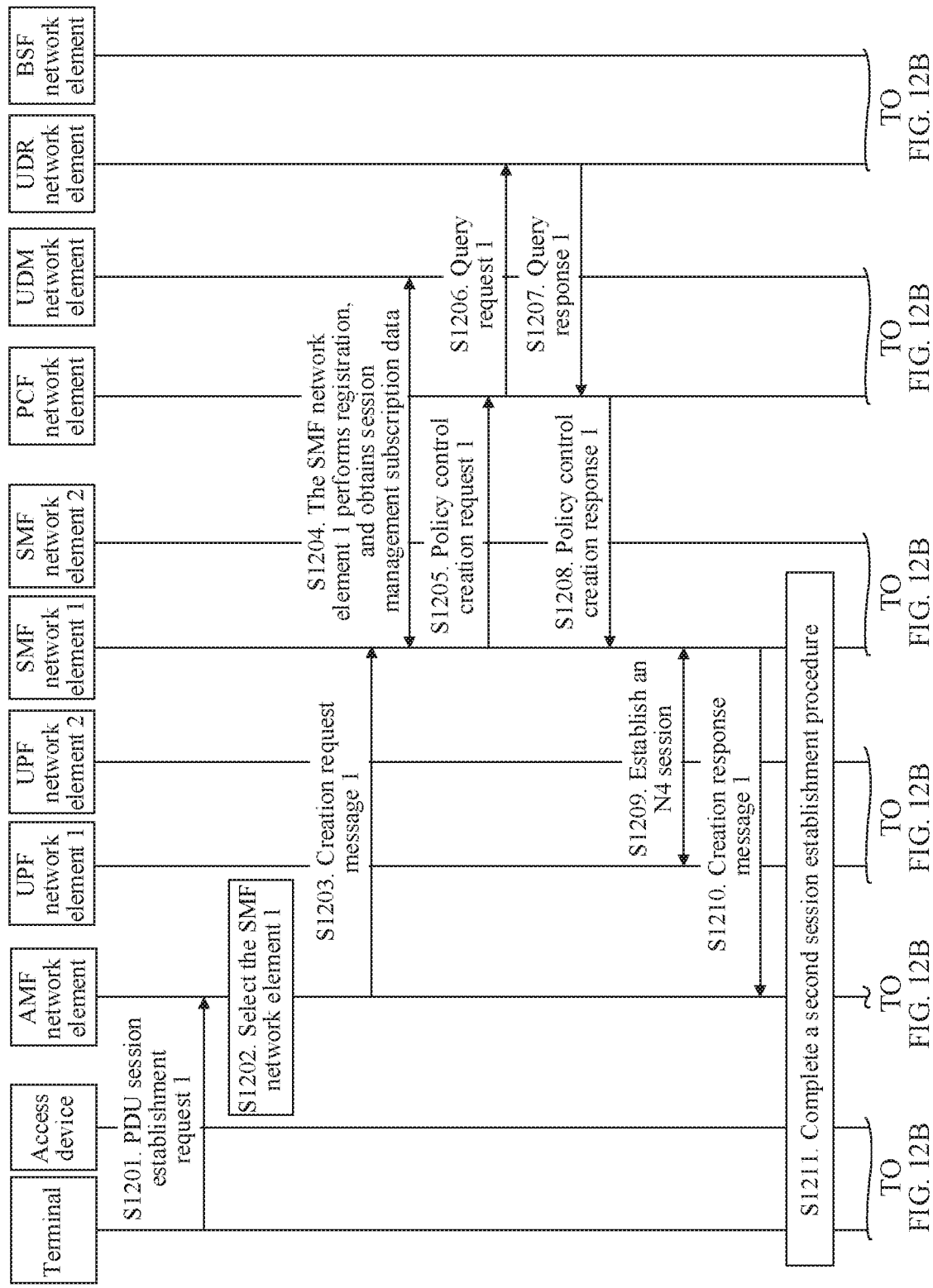
FIG. 12A and FIG. 12B are a schematic flowchart 4 of a policy control method according to an embodiment of this application.
Figure 12B:
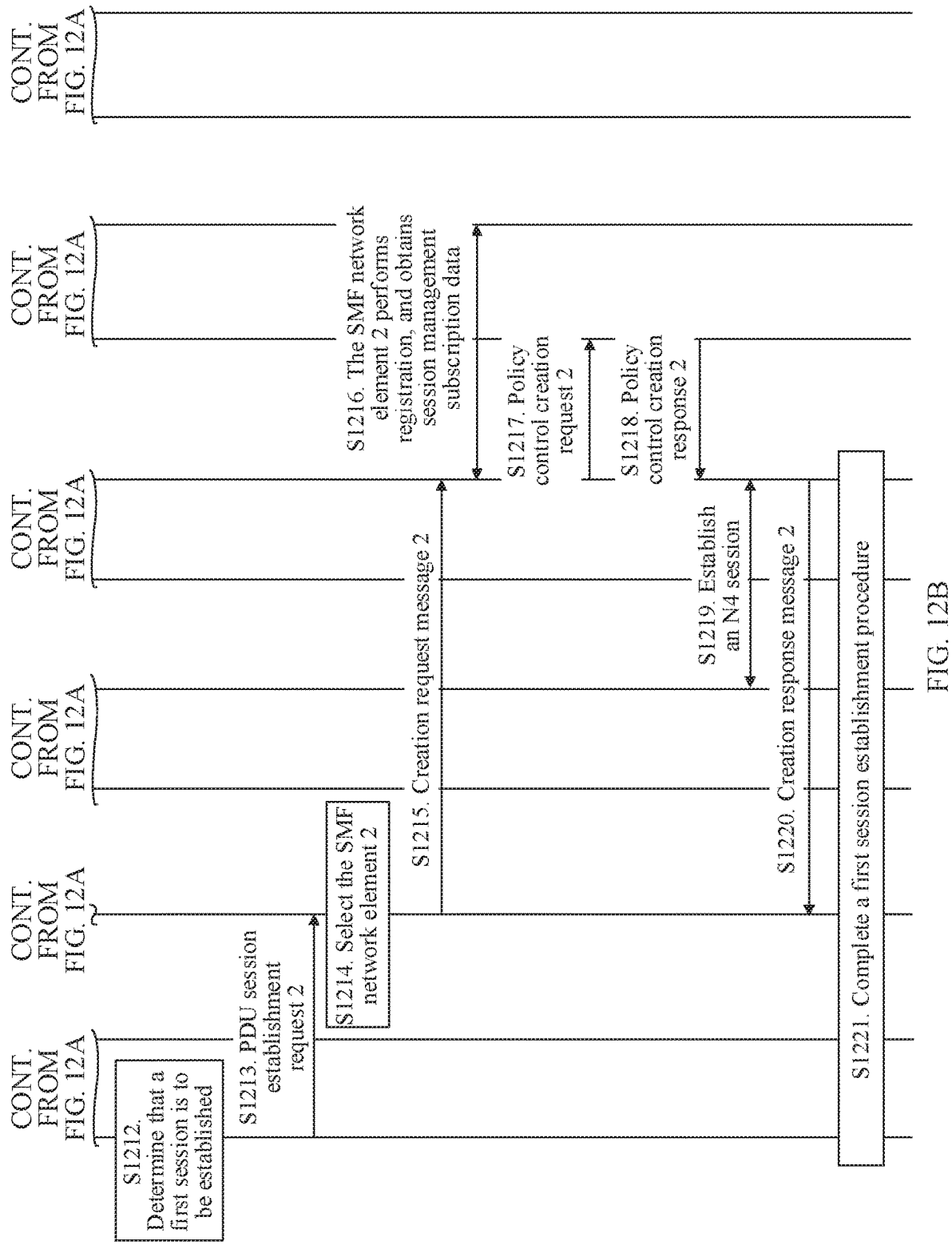

Optionally, for example, the policy control system shown in FIG. 2 is applied to the 5G network shown in FIG. 3a, the first session management network element is an SMF network element 2, the second session management network element is an SMF network element 1, and the network device is a UDM network element. FIG. 12A and FIG. 12B show a policy control method according to an embodiment of this application. The policy control method includes the following steps.

Steps S1201 to S1203 are the same as steps S501 to S503 in the embodiment shown in FIG. 5A and FIG. 5B. For related descriptions, refer to the embodiment shown in FIG. 5A and FIG. 5B. Details are not described herein again.

S1204. The SMF network element 1 registers the second session with the UDM network element, and the SMF network element 1 obtains, from the UDM network element, session management subscription data corresponding to a combination of an identifier of the terminal, a DNN, and S-NSSAI.

Optionally, in this embodiment of this application, if the UDM network element has no corresponding session management subscription data, the UDM network element further queries a UDR network element, and the UDR network element returns, to the UDM network element, the session management subscription data corresponding to the combination of the identifier of the terminal, the DNN, and the S-NSSAI. Therefore, the UDM network element further returns, to the SMF network element 1, the session management subscription data corresponding to the combination of the identifier of the terminal, the DNN, and the S-NSSAI.

Optionally, in this embodiment of this application, the SMF network element 1 may further subscribe to a subscription data change notification from the UDM network element. Optionally, the UDM network element may further subscribe to a subscription data change notification from the UDR network element.

Optionally, in this embodiment of this application, the SMF network element 1 may further subscribe to a PCF binding information change notification from the UDM network element. Optionally, the UDM network element may further subscribe to a PCF binding information change notification from the UDR network element. The PCF binding information is a correspondence between a corresponding identifier of a PCF network element and a combination of an identifier of a terminal, a DNN, and S-NSSAI.

Step S1205 is the same as step S505 in the embodiment shown in FIG. 5A and FIG. 5B. For related descriptions, refer to the embodiment shown in FIG. 5A and FIG. 5B. Details are not described herein again.

S1206. The PCF network element sends a query request 1 to the UDR network element, so that the UDR network element receives the query request 1 from the PCF network element.

The query request 1 carries the identifier of the terminal, the S-NSSAI, and the DNN, and is used to query session policy-related subscription information. For related descriptions of the session policy-related subscription information, refer to step S506 in the embodiment shown in FIG. 5A and FIG. 5B. Details are not described herein again.

In addition, the query request 1 carries an identifier of the PCF network element selected by the SMF network element 1 for the second session.

Optionally, in this embodiment of this application, the PCF network element may further subscribe to a data change notification from the UDR network element. After receiving a subscription request, the UDR network element returns an acknowledgement message.

S1207. The UDR network element sends a query response 1 to the PCF network element, so that the PCF network element receives the query response 1 from the UDR network element.

The query response 1 carries session policy-related subscription information corresponding to the combination of the identifier of the terminal, the DNN, and the S-NSSAI.

In addition, in this embodiment of this application, after obtaining the identifier of the PCF network element selected by the SMF network element 1 for the second session, the UDR network element stores the correspondence between the identifier of the PCF network element and a combination of an identifier of a terminal, a DNN, and S-NSSAI, in other words, stores the PCF binding information.

Step S1208 is the same as step S508 in the embodiment shown in FIG. 5A and FIG. 5B. For related descriptions, refer to the embodiment shown in FIG. 5A and FIG. 5B. Details are not described herein again.

Steps S1209 to S1214 are the same as steps S510 to S515 in the embodiment shown in FIG. 5A and FIG. 5B. For related descriptions, refer to the embodiment shown in FIG. 5A and FIG. 5B. Details are not described herein again.

S1215. The AMF network element sends, to the SMF network element 2, a creation request message 2 used to create the first session, so that the SMF network element 2 receives the creation request message 2 from the AMF network element.

The creation request message 2 includes the identifier of the terminal, the S-NSSAI, the DNN, and a PDU session identifier 1.

Optionally, if the AMF network element may further select a PCF network element for the first session, the creation request message 2 may further include an identifier of the PCF network element selected by the AMF network element for the first session, and the identifier is represented as PCF Ida. This is not specifically limited in this embodiment of this application.

S1216. The SMF network element 2 registers the first session with the UDM network element, and the SMF network element 2 obtains, from the UDM network element, the session management subscription data corresponding to the combination of the identifier of the terminal, the DNN, and the S-NSSAI.

In addition, in this embodiment of this application, if the UDM network element determines that the first session is established in a non-roaming scenario, the UDM network element may further return the PCF binding information to the SMF network element 2. The PCF binding information is the correspondence between the identifier of the PCF network element selected by the SMF network element 1 and the combination of the identifier of the terminal, the DNN, and the S-NSSAI.

In a possible implementation, the UDM network element may obtain the PCF binding information in the following manner: If the UDM network element determines that another SMF network element (namely, the SMF network element 1) has registered a PDU session with the identifier of the terminal, the DNN, and the S-NSSAI, the UDM network element sends a query request 2 to the UDR network element. The query request 2 includes the identifier of the terminal, the DNN, and the S-NSSAI, to request to obtain the PCF binding information. Further, the UDR network element sends the PCF binding information to the UDM network element, and the UDM network element receives the PCF binding information.

Alternatively, in another possible implementation, the UDM network element may obtain the PCF binding information in the following manner: If the UDM network element subscribes to the PCF binding information change notification in step S1204, after the UDR network element stores the correspondence between an identifier of a PCF network element and a combination of an identifier of a terminal, a DNN, and S-NSSAI in step S1207, the UDR network element sends the PCF binding information change notification to the UDM network element, and the PCF binding information change notification carries the PCF binding information. Further, the UDM network element receives the PCF binding information.

Steps S1217 to S1221 are the same as steps S520 to S524 in the embodiment shown in FIG. 5A and FIG. 5B. For related descriptions, refer to the embodiment shown in FIG. 5A and FIG. 5B. Details are not described herein again.

According to the policy control method provided in this embodiment of this application, it can be ensured that a same PCF network element is selected for a plurality of sessions of a same terminal that have same S-NSSAI and a same DNN. Therefore, a conflict between policies formulated for the plurality of PDU sessions of the same terminal that have the same S-NSSAI and the same DNN and the subscription information obtained from the UDR network element can be avoided. For an analysis of a related technical effect, refer to the foregoing policy control system part. Details are not described herein again.

Actions of the UDM network element or actions of the SMF network element 2 in steps S1201 to S1221 may be performed by the processor 401 in the communications device 400 shown in FIG. 4 by invoking the application program code stored in the memory 403. This is not limited in this embodiment.

Figure 13A:
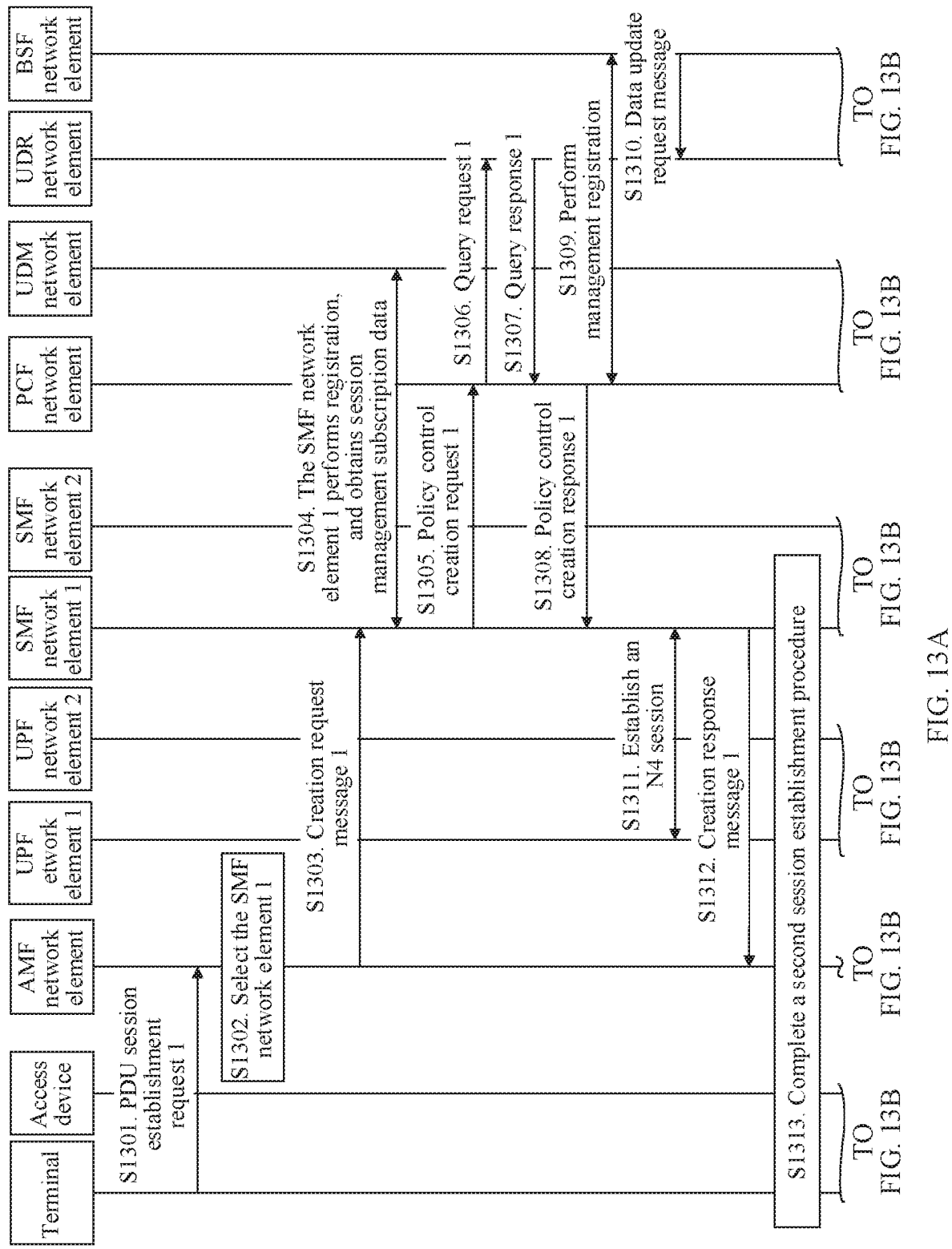
FIG. 13A and FIG. 13B are a schematic flowchart 5 of a policy control method according to an embodiment of this application.
Figure 13B:
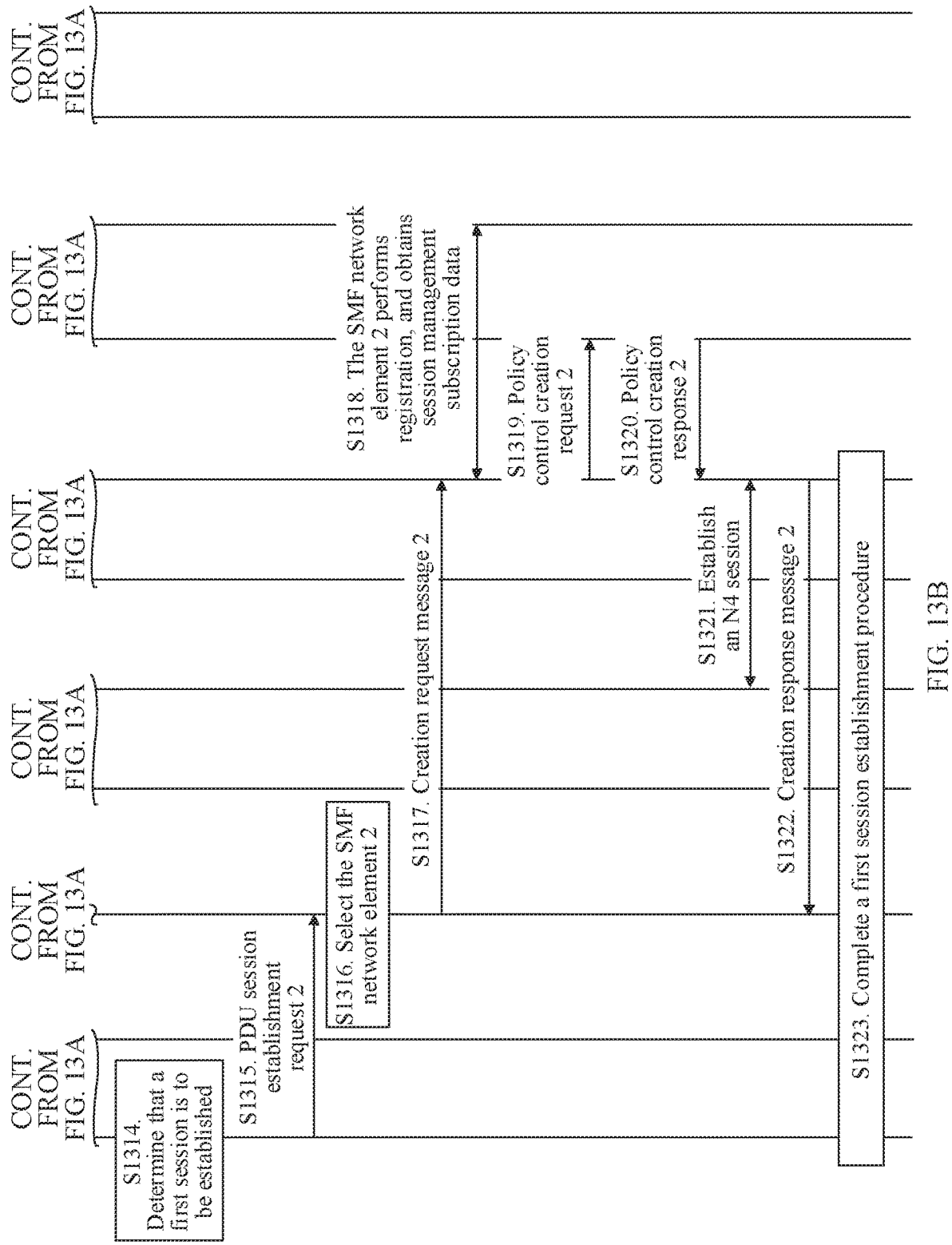

Optionally, for example, the policy control system shown in FIG. 2 is applied to the 5G network shown in FIG. 3a, the first session management network element is an SMF network element 2, the second session management network element is an SMF network element 1, and the network device is a UDM network element. FIG. 13A and FIG. 13B show a policy control method according to an embodiment of this application. The policy control method includes the following steps.

Steps S1301 to S1303 are the same as steps S501 to S503 in the embodiment shown in FIG. 5A and FIG. 5B. For related descriptions, refer to the embodiment shown in FIG. 5A and FIG. 5B. Details are not described herein again.

Figure 8:
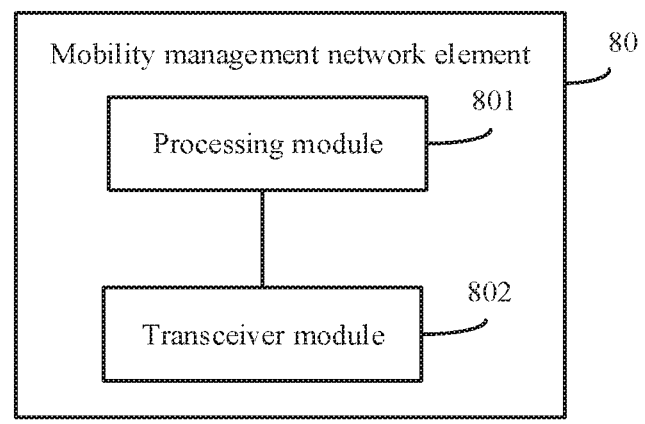
FIG. 8 is a schematic structural diagram of a mobility management network element according to an embodiment of this application.

Steps S1304 and S1305 are the same as steps S804 and S805 in the embodiment shown in FIG. 8. For related descriptions, refer to the embodiment shown in FIG. 5A and FIG. 5B. Details are not described herein again.

Steps S1306 to S1309 are the same as steps S506 to S509 in the embodiment shown in FIG. 5A and FIG. 5B. For related descriptions, refer to the embodiment shown in FIG. 5A and FIG. 5B. Details are not described herein again.

S1310. The BSF network element sends a data update request message to the UDR network element, so that the UDR network element receives the data update request message from the BSF network element.

The data update request message includes the PCF binding information. The PCF binding information is a correspondence between an identifier of a PCF network element and a combination of the identifier of the terminal, the DNN, and the S-NSSAI. After obtaining the PCF binding information, the UDR network element stores the PCF binding information.

Steps S1311 to S1316 are the same as steps S510 to S515 in the embodiment shown in FIG. 5A and FIG. 5B. For related descriptions, refer to the embodiment shown in FIG. 5A and FIG. 5B. Details are not described herein again.

S1317. The AMF network element sends, to the SMF network element 2, a creation request message 2 used to create the first session, so that the SMF network element 2 receives the creation request message 2 from the AMF network element.

The creation request message 2 includes the identifier of the terminal, the S-NSSAI, the DNN, and a PDU session identifier 1.

Optionally, if the AMF network element may further select a PCF network element for the first session, the creation request message 2 may further include an identifier of the PCF network element selected by the AMF network element for the first session, and the identifier is represented as PCF Ida. This is not specifically limited in this embodiment of this application.

Step S1318 is similar to step S1216 in the embodiment shown in FIG. 12A and FIG. 12B. For example, a difference lies in the following: In this embodiment of this application, in step S1310, the UDR network element sends the PCF binding information to the UDM network element. For other related descriptions, refer to the embodiment shown in FIG. 12A and FIG. 12B. Details are not described herein again.

Steps S1319 to S1323 are the same as steps S520 to S524 in the embodiment shown in FIG. 5A and FIG. 5B. For related descriptions, refer to the embodiment shown in FIG. 5A and FIG. 5B. Details are not described herein again.

According to the policy control method provided in this embodiment of this application, it can be ensured that a same PCF network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from the UDR network element can be avoided. For an analysis of a related technical effect, refer to the foregoing policy control system part. Details are not described herein again.

Actions of the UDM network element or actions of the SMF network element 2 in steps S1301 to S1323 may be performed by the processor 401 in the communications device 400 shown in FIG. 4 by invoking the application program code stored in the memory 403. This is not limited in this embodiment.

Figure 14B:
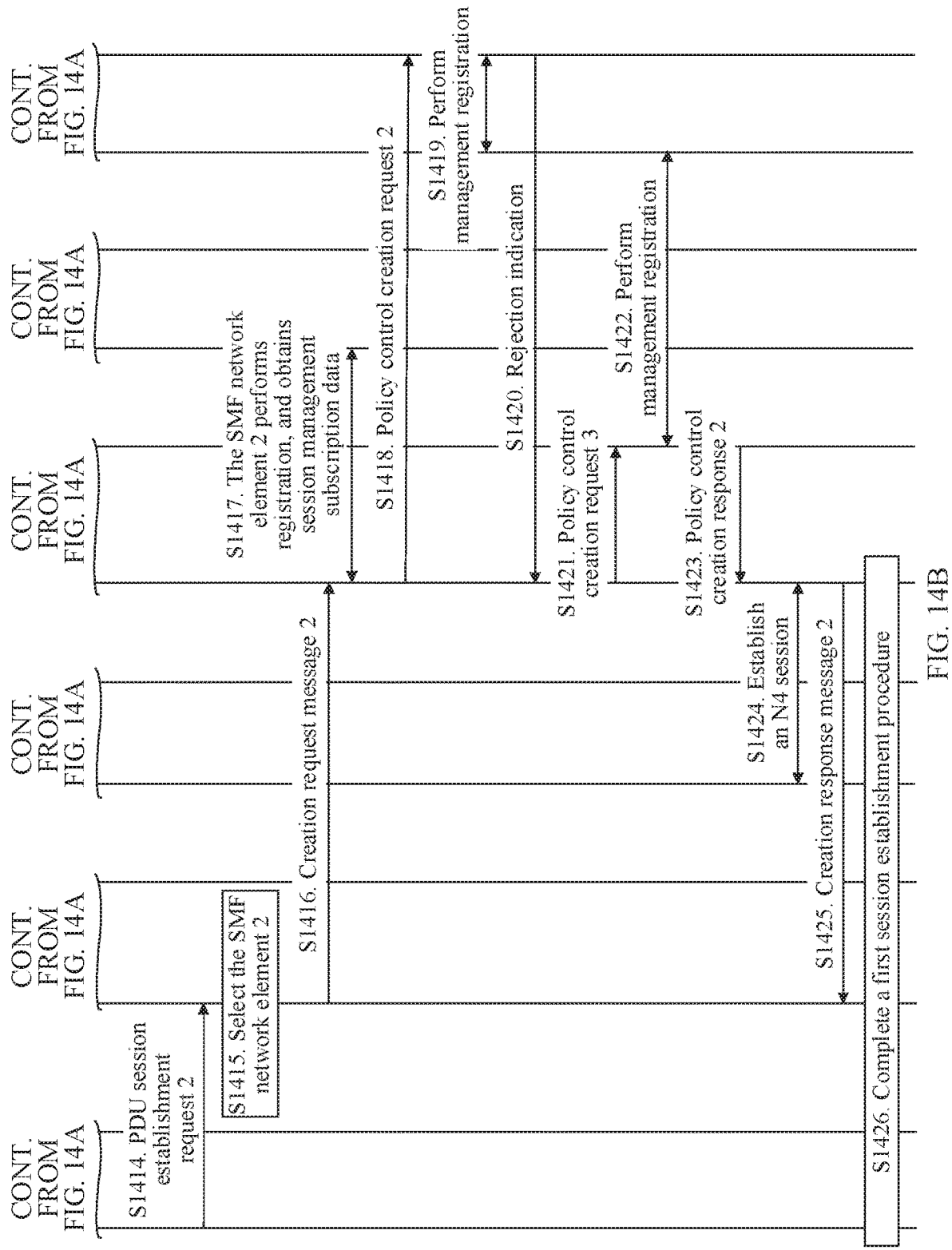

Optionally, for example, the policy control system shown in FIG. 2b is applied to the 5G network shown in FIG. 3a, the first session management network element is an SMF network element 2, the second session management network element is an SMF network element 1, and the network device is a UDM network element. FIG. 14 A and FIG. 14B show a policy control method according to an embodiment of this application. The policy control method includes the following steps.

Steps S1401 to S1417 are the same as steps S501 to S517 in the embodiment shown in FIG. 5A and FIG. 5B. For related descriptions, refer to the embodiment shown in FIG. 5A and FIG. 5B. Details are not described herein again.

S1418. After selecting a PCFx network element for the first session, the SMF network element 2 sends a policy control creation request 2 to the PCFx network element, so that the PCFx network element receives the policy control creation request 2 from the SMF network element 2.

The policy control creation request 2 may include the identifier of the terminal, a PDU session identifier 2, the DNN, the S-NSSAI, and an IP address 1 assigned by the SMF network element 2 to the first session.

Optionally, in this embodiment of this application, the SMF network element 2 may select the PCFx network element for the first session based on a local policy and an identifier (which is PCF Ida herein) that is of a PCF network element and that is sent by the AMF network element, or in a manner such as performing interaction with an NRF network element. For details, refer to an existing implementation. The details are not described herein.

S1419. The PCFx network element performs management registration with the BSF network element.

Specifically, the PCFx network element may send a management registration request to the BSF network element. The management registration request includes the identifier of the terminal, the DNN, the S-NSSAI, an identifier of the PCFx network element selected by the SMF network element 2 for the first session, and the IP address 1 assigned by the SMF network element 2 to the first session. Further, after the BSF network element receives the management registration request, if the BSF network element determines that there is an identifier that is of a PCF network element (namely, the PCF network element selected by the SMF network element 1 for the second session) and that corresponds to the identifier of the terminal, the DNN, and the S-NSSAI, the BSF network element returns a rejection indication to the PCFx, and adds, to the rejection indication, the identifier that is of the PCF network element and that corresponds to the identifier of the terminal, the DNN, and the S-NSSAI.

S1420. The PCFx network element sends the rejection indication to the SMF network element 2, so that the SMF network element 2 receives the rejection indication from the PCFx network element.

S1421. The SMF 2 sends a policy control creation request 3 to the PCF network element corresponding to the identifier of the PCF network element, so that the PCF network element receives the policy control creation request 3 from the SMF network element 1.

S1422. The PCF network element performs management registration with the BSF network element.

Specifically, the PCF network element may send a management registration request to the BSF network element. The management registration request includes the identifier of the terminal, the DNN, the S-NSSAI, the identifier of the PCF network element selected by the SMF network element 1 for the second session, and the IP address 1 assigned by the SMF network element 2 to the first session. Further, after storing a correspondence among the identifier of the terminal, the DNN, the S-NSSAI, the identifier of the PCF network element, and the IP address 1, the BSF network element sends a management registration response to the PCF network element.

Steps S1423 to S1426 are the same as steps S521 to S524 in the embodiment shown in FIG. 5A and FIG. 5B. For related descriptions, refer to the embodiment shown in FIG. 5A and FIG. 5B. Details are not described herein again.

According to the policy control method provided in this embodiment of this application, it can be ensured that a same PCF network element is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from the UDR network element can be avoided. For an analysis of a related technical effect, refer to the foregoing policy control system part. Details are not described herein again.

Optionally, for example, the policy control system shown in FIG. 2b is applied to the 5G network shown in FIG. 3a, the first session management network element is an SMF network element 2, the second session management network element is an SMF network element 1, and the network device is a UDM network element. FIG. 14A and FIG. 14B show a policy control method according to an embodiment of this application. The policy control method includes the following steps.

Steps S1401 to S1408 are the same as steps S501 to S508 in the embodiment shown in FIG. 5A and FIG. 5B. For related descriptions, refer to the embodiment shown in FIG. 5A and FIG. 5B. Details are not described herein again.

S1409. The PCF network element performs management registration with a BSF network element.

Specifically, the PCF network element may send a management registration request (management register request) to the BSF network element. The management registration request includes the identifier of the terminal, the DNN, the S-NSSAI, an identifier of the PCF network element selected by the SMF network element 1 for the second session, and an IP address 2 assigned by the SMF network element 1 to the second session. Further, after storing a correspondence among the identifier of the terminal, the DNN, the S-NSSAI, the identifier of the PCF network element, and the IP address 2, the BSF network element sends a management registration response (management register response) to the PCF network element. In this embodiment of this application, the PCF network element may be a PCF network function instance (network function instance) or a PCF network function service instance (network function service instance). Correspondingly, the identifier of the PCF network element may be a network function instance identifier (network function instance Id) of the PCF network element or a network function service instance identifier (network function service Iinstance Id) of the PCF network element. This is not specifically limited herein.

Optionally, in this embodiment of this application, if a PCF network element set is supported in a network, the SMF 1 network element may alternatively add, to the management registration request, the identifier of the terminal, the DNN, the S-NSSAI, the identifier of the PCF network element selected by the SMF network element 1 for the second session (optional), an identifier 1 of a PCF network element set to which the PCF network element selected by the SMF network element 1 for the second session belongs, and the IP address 2 assigned by the SMF network element 1 to the second session. Further, after storing a correspondence among the identifier of the terminal, the DNN, the S-NSSAI, the identifier of the PCF network element (optional), the identifier 1 of the PCF network element set, and the IP address 2, the BSF network element sends the management registration response to the PCF network element. One PCF network element set usually includes a plurality of PCF network elements, and the plurality of PCF network elements share one unstructured data storage function (unstructured data storage function, UDSF) network element. The UDSF network element can ensure that subscription data assigned to different PCF network elements does not conflict with each other. In this embodiment of this application, the PCF network element set is a network function set (network function set) of a policy control function or a network function service set (network function service set) of the policy control function. Correspondingly, the identifier of the PCF network element set may be a network function set identifier (network function set Id) of the PCF network element or a network function service set identifier (network function service set Id) of the PCF network element. This is not specifically limited herein.

Optionally, in this embodiment of this application, before the PCF network element sends the management registration request to the BSF network element, the PCF network element may further determine, based on an operator policy, a configuration, and/or user subscription (for example, it is indicated, in the user subscription, that usage amount monitoring needs to be applied to the user, and the user subscription is obtained in step 1407), that a same PCF network element needs to be selected for a combination of the identifier of the terminal, the DNN, and the S-NSSAI. A management registration request message sent by the PCF network element to the BSF network element further carries an indication for selecting a same PCF network element. However, because the BSF network element has no binding relationship corresponding to the combination of the identifier of the terminal, the DNN, and the S-NSSAI, the BSF network element returns a success response to the PCF network element.

Optionally, in this embodiment of this application, when determining that the terminal establishes the second session in a non-roaming scenario or a home routing scenario, the PCF network element adds, to the management registration request message, an indication for selecting a same PCF network element.

Optionally, in this embodiment of this application, if a PCF network element set is supported in a network, the PCF network element may further determine, based on the operator policy, the configuration, and/or the user subscription (for example, it is indicated, in the user subscription, that usage amount monitoring needs to be applied to the user, and the user subscription is obtained in step 1407), that a same PCF network element set needs to be selected for the combination of the identifier of the terminal, the DNN, and the S-NSSAI. The management registration request message sent by the PCF network element to the BSF network element further carries an indication for selecting a same PCF network element set. However, because the BSF network element has no binding relationship corresponding to the combination of the identifier of the terminal, the DNN, and the S-NSSAI, the BSF network element returns the success response to the PCF network element.

Optionally, in this embodiment of this application, when determining that the terminal establishes the second session in the non-roaming scenario or the home routing scenario, the PCF network element adds, to the management registration request message, an indication for selecting a same PCF network element set.

Steps S1410 to S1417 are the same as steps S510 to S517 in the embodiment shown in FIG. 5A and FIG. 5B. For related descriptions, refer to the embodiment shown in FIG. 5A and FIG. 5B. Details are not described herein again.

Optionally, in this embodiment of this application, the AMF network element in step S1414 may be the same as or different from the AMF network element in step 1401. That the AMF network elements are the same is only an example used for description in this embodiment of this application. A description is provided herein. Details are not described below again.

S1418. After selecting a PCFx network element for the first session, the SMF network element 2 sends a policy control creation request 2 to the PCFx network element, so that the PCFx network element receives the policy control creation request 2 from the SMF network element 2.

The policy control creation request 2 may include the identifier of the terminal, a PDU session identifier 2, the DNN, the S-NSSAI, and an IP address 1 assigned by the SMF network element 2 to the first session.

Optionally, in this embodiment of this application, the SMF network element 2 may select the PCFx network element for the first session based on a local policy and an identifier (which is PCF Ida herein) that is of a PCF network element and that is sent by the AMF network element, or in a manner such as interacting with an NRF network element. For details, refer to an existing implementation. The details are not described herein.

S1419. The PCFx network element performs management registration with the BSF network element.

Specifically, the PCFx network element may send a management registration request to the BSF network element. The management registration request includes the identifier of the terminal, the DNN, the S-NSSAI, an identifier of the PCFx network element selected by the SMF network element 2 for the first session, and the IP address 1 assigned by the SMF network element 2 to the first session. Further, after the BSF network element receives the management registration request, if the BSF network element determines that there is an identifier that is of a PCF network element (namely, the PCF network element selected by the SMF network element 1 for the second session) and that corresponds to the identifier of the terminal, the DNN, and the S-NSSAI, the BSF network element returns a rejection indication to the PCFx network element, and adds, to the rejection indication, the identifier that is of the PCF network element and that corresponds to the identifier of the terminal, the DNN, and the S-NSSAI.

Optionally, in this embodiment of this application, if a PCF network element set is supported in the network, the SMF network element 2 may alternatively add, to the management registration request, the identifier of the terminal, the DNN, the S-NSSAI, the identifier of the PCFx network element selected by the SMF network element 2 for the first session (optional), an identifier 2 of a PCF network element set to which the PCFx network element selected by the SMF network element 2 for the first session belongs, and the IP address 1 assigned by the SMF network element 2 to the first session. Further, after the BSF network element receives the management registration request, if the BSF network element determines that there is an identifier (namely, the identifier 1 of the PCF network element set selected by the SMF network element 1 for the second session) that is of a PCF network element set and that corresponds to the identifier of the terminal, the DNN, and the S-NSSAI, the BSF network element returns a rejection indication to the PCFx network element, and adds, to the rejection indication, the identifier 1 that is of the PCF network element set and that corresponds to the identifier of the terminal, the DNN, and the S-NSSAI.

Optionally, in this embodiment of this application, before the PCFx network element sends the management registration request to the BSF network element, the PCFx network element may further determine, based on the operator policy, the configuration, and/or the user subscription (for example, it is indicated, in the user subscription, that usage amount monitoring needs to be applied to the user, and the user subscription is obtained through interaction between the PCFx and the UDR), that a same PCF network element needs to be selected for the combination of the identifier of the terminal, the DNN, and the S-NSSAI. A management registration request message sent by the PCFx network element to the BSF network element further carries an indication for selecting a same PCF network element. The BSF network element receives the indication for selecting a same PCF network element, and the BSF network element has the binding relationship (the binding relationship registered in step 1409) corresponding to the combination of the identifier of the terminal, the DNN, and the S-NSSAI. Therefore, the BSF network element returns a rejection indication to the PCFx network element, and adds, to the rejection indication, the identifier that is of the PCF network element and that corresponds to the identifier of the terminal, the DNN, and the S-NSSAI.

Optionally, in this embodiment of this application, when determining that the terminal establishes the first session in the non-roaming scenario or the home routing scenario, the PCFx network element adds, to the management registration request message, the indication for selecting a same PCF network element.

Optionally, in this embodiment of this application, if the PCF network element set is supported in the network, before the PCFx network element sends the management registration request to the BSF network element, the PCFx network element may further determine, based on the operator policy, the configuration, and/or the user subscription (for example, it is indicated, in the user subscription, that usage amount monitoring needs to be applied to the user, and the user subscription is obtained through interaction between the PCFx and the UDR), that a same PCF network element set needs to be selected for the combination of the identifier of the terminal, the DNN, and the S-NSSAI. The management registration request message sent by the PCFx network element to the BSF network element further carries an indication for selecting a same PCF network element set. The BSF network element receives the indication for selecting a same PCF network element set, and the BSF network element has the binding relationship (the binding relationship registered in step 1409) corresponding to the combination of the identifier of the terminal, the DNN, and the S-NSSAI. Therefore, the BSF network element returns the rejection indication to the PCFx network element, and adds, to the rejection indication, the identifier 1 that is of the PCF network element set and that corresponds to the identifier of the terminal, the DNN, and the S-NSSAI.

Optionally, in this embodiment of this application, when determining that the terminal establishes the first session in the non-roaming scenario or the home routing scenario, the PCFx network element adds, to the management registration request message, the indication for selecting a same PCF network element set.

Optionally, in this embodiment of this application, the rejection indication may carry the identifier of the PCF network element for indication, or carry a rejected hypertext transfer protocol (HTTP) status code and the identifier of the PCF network element for indication. A description is provided herein. Details are not described below again.

Optionally, in this embodiment of this application, if the PCF network element set is supported in the network, the rejection indication may carry the identifier of the PCF network element set for indication, or carry a rejected hypertext transfer protocol (HTTP) status code and the identifier of the PCF network element set for indication. A description is provided herein. Details are not described below again.

S1420. The PCFx network element sends the rejection indication to the SMF network element 2, so that the SMF network element 2 receives the rejection indication from the PCFx network element.

S1421. The SMF 2 sends a policy control creation request 3 to the PCF network element corresponding to the identifier of the PCF network element, so that the PCF network element receives the policy control creation request 3 from the SMF network element 2.

Optionally, in this embodiment of this application, if the PCF network element set is supported in the network, after selecting one PCF network element corresponding to the identifier 1 of the PCF network element set, the SMF network element 2 sends the policy control creation request 3 to the PCF network element, so that the PCF network element receives the policy control creation request 3 from the SMF network element 2.

Optionally, the SMF network element 2 interacts with the PCFx network element, to terminate a policy association established in step S1418.

S1422. The PCF network element performs management registration with the BSF network element.

Specifically, the PCF network element may send a management registration request to the BSF network element. The management registration request includes the identifier of the terminal, the DNN, the S-NSSAI, the identifier of the PCF network element selected by the SMF network element 1 for the second session, and the IP address 1 assigned by the SMF network element 2 to the first session. Further, after storing a correspondence among the identifier of the terminal, the DNN, the S-NSSAI, the identifier of the PCF network element, and the IP address 1, the BSF network element sends a management registration response to the PCF network element.

Optionally, if the PCF network element set is supported in the network, the PCF network element may send the management registration request to the BSF network element. The management registration request includes the identifier of the terminal, the DNN, the S-NSSAI, the identifier of the PCF network element selected by the SMF network element 2 for the first session (optional), an identifier of a set to which the PCF network element belongs, and the IP address 1 assigned by the SMF network element 2 to the first session. Further, after storing the correspondence among the identifier of the terminal, the DNN, the S-NSSAI, the identifier of the PCF network element (optional), the identifier of the PCF network element set, and the IP address 1, the BSF network element sends the management registration response to the PCF network element.

Steps S1423 to S1426 are the same as steps S521 to S524 in the embodiment shown in FIG. 5A and FIG. 5B. For related descriptions, refer to the embodiment shown in FIG. 5A and FIG. 5B. Details are not described herein again.

According to the policy control method provided in this embodiment of this application, it can be ensured that a same PCF network element or a same PCF network element set is selected for a plurality of sessions of a same terminal that have same S-NSSAI and a same DNN. Therefore, a conflict between policies formulated for the plurality of PDU sessions of the same terminal that have the same S-NSSAI and the same DNN and subscription information obtained from a UDR network element can be avoided. For an analysis of a related technical effect, refer to the foregoing policy control system part. Details are not described herein again.

Actions of the BSF network element or actions of the SMF network element 2 in steps S1401 to S1426 may be performed by the processor 401 in the communications device 400 shown in FIG. 4 by invoking the application program code stored in the memory 403. This is not limited in this embodiment.

The solutions provided in the embodiments of this application are mainly described from a perspective of interaction between network elements. It may be understood that, to implement the foregoing functions, the mobility management network element, the network device, the first session management network element, the second session management network element, the first policy control network element, or the binding support network element includes corresponding hardware structures and/or software modules for performing the functions. A person skilled in the art should easily be aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the mobility management network element, the network device, the first session management network element, the second session management network element, the first policy control network element, or the binding support network element may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the division into module in this embodiment of this application is an example, and is merely logical function division. In an actual implementation, another division manner may be used.

For example, when the function modules are obtained through division performed in an integrated manner, FIG. 8 is a schematic structural diagram of a mobility management network element 80. The mobility management network element 80 includes a processing module 801 and a transceiver module 802. The processing module 801 is configured to determine that a first session that is of a terminal and that is being established has the same S-NSSAI and the same DNN as an established second session of the terminal. The transceiver module 802 is configured to send, to a first session management network element, a first request message used to create the first session. The first request message includes an identifier of the terminal, the S-NSSAI, the DNN, and indication information, and the indication information is used to instruct the first session management network element to obtain an identifier of a policy control network element from a binding support network element; or the indication information is used to indicate that a session that is of the terminal and that has the same S-NSSAI and the same DNN as the first session is established; or the indication information is used to indicate that the first session has corresponding binding information.

Optionally, the processing module 801 is specifically configured to: determine, based on at least one of subscription data of the terminal, an operator policy, and a session establishment request from the terminal, that the first session that is of the terminal and that is being established has the same S-NSSAI and the same DNN as the established second session of the terminal.

Optionally, the processing module 801 is further configured to determine that the terminal establishes the first session in a non-roaming scenario or a home routing scenario.

All related content of the steps in the foregoing method embodiments may be cited in function descriptions of corresponding function modules. Details are not described herein again.

In this embodiment, the mobility management network element 80 is presented in a form of function modules obtained through division performed in an integrated manner. The "module" herein may be a specific ASIC, a circuit, a processor and a memory that execute one or more software programs or firmware programs, an integrated logic circuit, and/or another component that can provide the foregoing functions. In a simple embodiment, a person skilled in the art may figure out that the mobility management network element 80 may be in a form shown in FIG. 4.

For example, the processor 401 in FIG. 4 may invoke the computer executable instruction stored in the memory 403, so that the mobility management network element 80 performs the policy control methods in the foregoing method embodiments.

Specifically, functions/implementation processes of the transceiver module 802 and the processing module 801 in FIG. 8 may be implemented by the processor 401 in FIG. 4 by invoking the computer executable instruction stored in the memory 403. Alternatively, functions/implementation processes of the processing module 801 in FIG. 8 may be implemented by the processor 401 in FIG. 4 by invoking the computer executable instruction stored in the memory 403, and functions/implementation processes of the transceiver module 802 in FIG. 8 may be implemented by the communications interface 404 in FIG. 4.

The mobility management network element 80 provided in this embodiment may perform the foregoing policy control method. Therefore, for technical effects that can be achieved by the mobility management network element 80, refer to the foregoing method embodiments. Details are not described herein again.

Optionally, an embodiment of this application further provides an apparatus (for example, the apparatus may be a chip system). The apparatus includes a processor, configured to support a mobility management network element in implementing the foregoing policy control methods, for example, in determining that a first session that is of a terminal and that is being established has the same S-NSSAI and the same DNN as an established second session of the terminal. In a possible design, the apparatus further includes a memory. The memory is configured to store a program instruction and data that are necessary for the mobility management network element. Certainly, the memory may not be in the apparatus. When the apparatus is a chip system, the apparatus may include a chip, or may include a chip and another discrete component. This is not specifically limited in this embodiment of this application.

Figure 9:
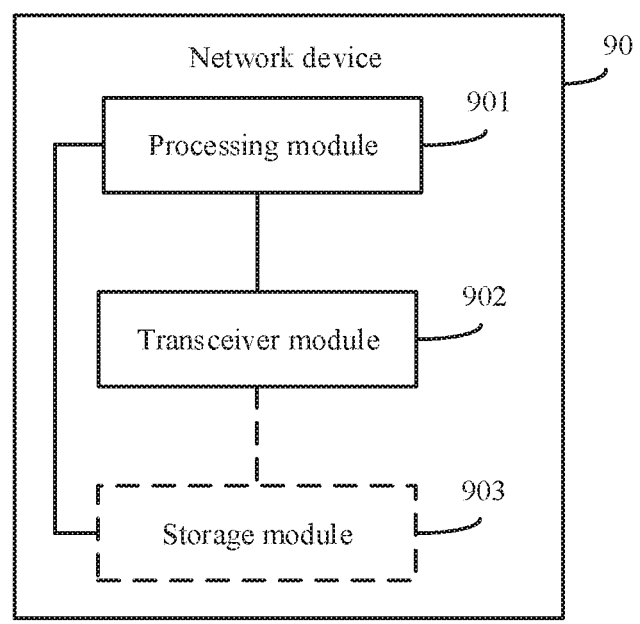
FIG. 9 is a schematic structural diagram of a network device according to an embodiment of this application.

Alternatively, for example, when the function modules are obtained through division performed in an integrated manner, FIG. 9 is a schematic structural diagram of a network device 90. The network device 90 includes a processing module 901 and a transceiver module 902. The processing module 901 is configured to determine that a first session that is of a terminal and that is being established has same S-NSSAI and a same DNN as an established second session of the terminal. The transceiver module 902 is configured to send, to a first session management network element corresponding to the first session, an identifier of a policy control network element selected by a second session management network element corresponding to the second session. The identifier of the policy control network element is used by the first session management network element to select the policy control network element.

Optionally, the transceiver module 902 is further configured to receive the identifier of the policy control network element from the second session management network element in a process of establishing the second session.

Optionally, the network device 90 may be a unified data management network element. The transceiver module 902 is further configured to send a subscription request for a binding information change notification to a unified data repository network element in the process of establishing the second session. The transceiver module 902 is further configured to receive the binding information change notification from the unified data repository network element. The binding information change notification includes an identifier that is of a policy control network element and that corresponds to an identifier of the terminal, the S-NSSAI, and the DNN.

Optionally, as shown in FIG. 9, the network device 90 further includes a storage module 903. The storage module 903 is configured to store a correspondence between the identifier of the policy control network element and a combination of the identifier of the terminal, the S-NSSAI, the DNN.

Optionally, the processing module 901 is further configured to determine the identifier of the policy control network element based on the identifier of the terminal, the S-NSSAI, the DNN, and the correspondence.

Optionally, the network device 90 may be a unified data management network element. The transceiver module 902 is further configured to send a request message to the unified data repository network element. The request message includes an identifier of the terminal, an S-NSSAI, and a DNN. The transceiver module 902 is further configured to receive an identifier that is of a policy control network element, that corresponds to the identifier of the terminal, the S-NSSAI, and the DNN, and that is from the unified data repository network element.

Optionally, the processing module 901 is further configured to determine that the terminal establishes the first session in a non-roaming scenario or a home routing scenario.

Optionally, the network device 90 is a mobility management network element. That the processing module 901 is configured to determine that a first session that is of a terminal and that is being established has the same S-NSSAI and the same DNN as an established second session of the terminal is specifically: determining, based on at least one of subscription data of the terminal, an operator policy, and a session establishment request from the terminal, that the first session that is of the terminal and that is being established has the same S-NSSAI and the same DNN as the established second session of the terminal.

Optionally, the network device 90 is a mobility management network element. The transceiver module 902 is further configured to send indication information to the first session management network element. The indication information is used to indicate that the policy control network element corresponding to the identifier of the policy control network element is a policy control network element selected by a session management network element; or the indication information is used to instruct the first session management network element to select the policy control network element corresponding to the identifier of the policy control network element; or the indication information is used to indicate that the first session has corresponding binding information.

Optionally, the network device 90 is a mobility management network element. The transceiver module 902 is further configured to add the identifier of the policy control network element to a special field. The special field is used to indicate that the policy control network element corresponding to the identifier of the policy control network element is a policy control network element selected by a session management network element.

Optionally, the network device 90 is a unified data management network element. The transceiver module 902 is further configured to receive a registration request from the first session management network element. The registration request includes an identifier of the terminal, S-NSSAI, and a DNN. Correspondingly, that the processing module 901 is configured to determine that a first session that is of a terminal and that is being established has the same S-NSSAI and the same DNN as an established second session of the terminal is specifically: determining, based on the identifier of the terminal, the S-NSSAI, and the DNN, that the first session that is of the terminal and that is being established has the same S-NSSAI and the same DNN as the established second session of the terminal.

All related content of the steps in the foregoing method embodiments may be cited in function descriptions of corresponding function modules. Details are not described herein again.

In this embodiment, the network device 90 is presented in a form of function modules obtained through division performed in an integrated manner. The "module" herein may be a specific ASIC, a circuit, a processor and a memory that execute one or more software programs or firmware programs, an integrated logic circuit, and/or another component that can provide the foregoing functions. In a simple embodiment, a person skilled in the art may figure out that the network device 90 may be in a form shown in FIG. 4.

For example, the processor 401 in FIG. 4 may invoke the computer executable instruction stored in the memory 403, so that the network device 90 performs the policy control methods in the foregoing method embodiments.

Specifically, functions/implementation processes of the transceiver module 902, the processing module 901, and storage module 903 in FIG. 9 may be implemented by the processor 401 in FIG. 4 by invoking the computer executable instruction stored in the memory 403. Alternatively, functions/implementation processes of the processing module 901 in FIG. 9 may be implemented by the processor 401 in FIG. 4 by invoking the computer executable instruction stored in the memory 403, functions/implementation processes of the transceiver module 902 in FIG. 9 may be implemented by the communications interface 404 in FIG. 4, and functions/implementation processes of the storage module 903 in FIG. 9 may be implemented by the memory 403 in FIG. 4.

The network device 90 provided in this embodiment may perform the foregoing policy control methods. Therefore, for technical effects that can be achieved by the network device 90, refer to the foregoing method embodiments. Details are not described herein again.

Optionally, an embodiment of this application further provides an apparatus (for example, the apparatus may be a chip system). The apparatus includes a processor, configured to support a network device in implementing the foregoing policy control methods, for example, in determining that a first session that is of a terminal and that is being established has the same S-NSSAI and the same DNN as an established second session of the terminal. In a possible design, the apparatus further includes a memory. The memory is configured to store a program instruction and data that are necessary for the network device. Certainly, the memory may not be in the apparatus. When the apparatus is a chip system, the apparatus may include a chip, or may include a chip and another discrete component. This is not specifically limited in this embodiment of this application.

Figure 10:
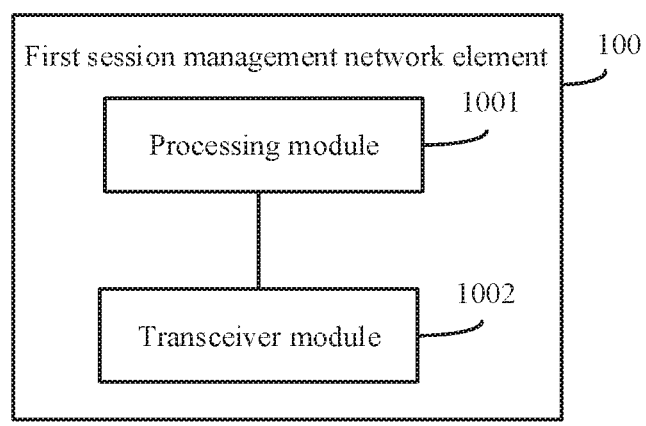
FIG. 10 is a schematic structural diagram of a first session management network element according to an embodiment of this application.

For example, when the function modules are obtained through division performed in an integrated manner, FIG. 10 is a schematic structural diagram of a first session management network element 100. The first session management network element 100 includes a processing module 1001 and a transceiver module 1002.

In a possible implementation, the transceiver module 1002 is configured to receive, from a mobility management network element, a first request message used to create a first session. The first request message includes an identifier of a terminal, S-NSSAI, and a DNN. The transceiver module 1002 is further configured to send a second request message to a binding support network element. The second request message includes the identifier of the terminal, the S-NSSAI, and the DNN, and is used to request a corresponding identifier of a policy control network element, the policy control network element is a policy control network element corresponding to a second session, and the second session is an established session that is of the terminal and that has the same S-NSSAI and the same DNN as the first session. The transceiver module 1002 is further configured to receive the identifier of the policy control network element from the binding support network element. The processing module 1001 is configured to select the policy control network element based on the identifier of the policy control network element.

Optionally, the first request message further includes indication information, and the indication information is used to instruct the first session management network element to obtain the identifier of the policy control network element from the binding support network element; or the indication information is used to indicate that a session that is of the terminal and that has the same S-NSSAI and the same DNN as the first session is established; or the indication information is used to indicate that the first session has corresponding binding information.

Optionally, the transceiver module 1002 is further configured to send a registration request to a unified data management network element. The registration request includes the identifier of the terminal, and the S-NSSAI and the DNN that correspond to the first session that is of the terminal and that are being established. The transceiver module 1002 is further configured to receive indication information from the unified data management network element. The indication information is used to instruct the first session management network element to obtain the identifier of the policy control network element from the binding support network element; or the indication information is used to indicate that a session that is of the terminal and that has the same S-NSSAI and the same DNN as the first session is established; or the indication information is used to indicate that the first session has corresponding binding information. That the transceiver module 1002 is configured to send a second request message to a binding support network element includes: sending the second request message to the binding support network element based on the indication information.

In another possible implementation, the transceiver module 1002 is configured to receive, from a mobility management network element, a first request message used to create a first session. The first request message includes an identifier of a terminal, S-NSSAI, and a DNN. The transceiver module is further configured to send a second request message to a binding support network element. The second request message includes the identifier of the terminal, the S-NSSAI, and the DNN, and is used to request a corresponding identifier of a policy control network element, the policy control network element is a policy control network element corresponding to a second session, and the second session is an established session that is of the terminal and that has the same S-NSSAI and the same DNN as the first session. The processing module 1001 is configured to: if determining that an identifier that is of a policy control network element and that is from the binding support network element cannot be received, select the first session selection policy control network element based on at least one of a local configuration, an identifier that is of a policy control network element and that is provided by a mobility management network element, or an identifier that is of a policy control network element and that is provided by a network repository function network element.

All related content of the steps in the foregoing method embodiments may be cited in function descriptions of corresponding function modules. Details are not described herein again.

In this embodiment, the first session management network element 100 is presented in a form of function modules obtained through division performed in an integrated manner. The "module" herein may be a specific ASIC, a circuit, a processor and a memory that execute one or more software programs or firmware programs, an integrated logic circuit, and/or another component that can provide the foregoing functions. In a simple embodiment, a person skilled in the art may figure out that the first session management network element 100 may be in a form shown in FIG. 4.

For example, the processor 401 in FIG. 4 may invoke the computer executable instruction stored in the memory 403, so that the first session management network element 100 performs the policy control methods in the foregoing method embodiments.

Specifically, functions/implementation processes of the transceiver module 1002 and the processing module 1001 in FIG. 10 may be implemented by the processor 401 in FIG. 4 by invoking the computer executable instruction stored in the memory 403. Alternatively, functions/implementation processes of the processing module 1001 in FIG. 10 may be implemented by the processor 401 in FIG. 4 by invoking the computer executable instruction stored in the memory 403, and functions/implementation processes of the transceiver module 1002 in FIG. 10 may be implemented by the communications interface 404 in FIG. 4.

The first session management network element 100 provided in this embodiment may perform the foregoing policy control methods. Therefore, for technical effects that can be achieved by the first session management network element 100, refer to the foregoing method embodiments. Details are not described herein again.

Optionally, an embodiment of this application further provides an apparatus (for example, the apparatus may be a chip system). The apparatus includes a processor, configured to support a first session management network element in implementing the foregoing policy control methods, for example, in selecting a policy control network element based on an identifier of the policy control network element. In a possible design, the apparatus further includes a memory. The memory is configured to store a program instruction and data that are necessary for the first management network element. Certainly, the memory may not be in the apparatus. When the apparatus is a chip system, the apparatus may include a chip, or may include a chip and another discrete component. This is not specifically limited in this embodiment of this application.

Figure 11:
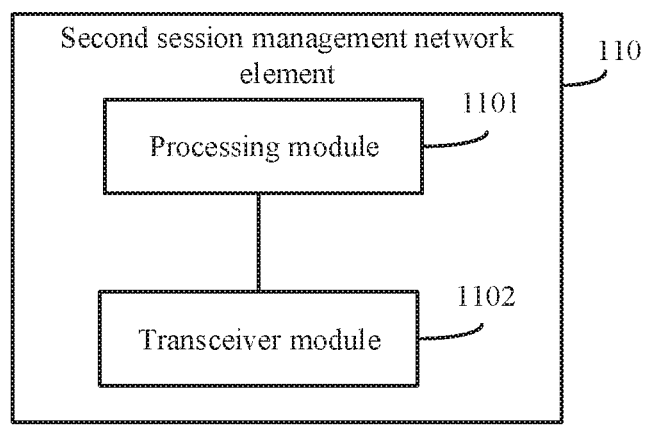
FIG. 11 is a schematic structural diagram of a second session management network element according to an embodiment of this application.

Alternatively, for example, when function modules are obtained through division performed in an integrated manner, FIG. 11 is a schematic structural diagram of a second session management network element 110. The second session management network element 110 includes a processing module 1101 and a transceiver module 1102.

The processing module 1101 is configured to select a policy control network element in a process of establishing a second session of a terminal. The transceiver module 1102 is configured to send an identifier of the policy control network element to a network device. The identifier of the policy control network element is used by a first session management network element to select the policy control network element, the first session management network element is a session management network element corresponding to a first session, and the first session is a to-be-established session that is of the terminal and that has the same S-NSSAI and the same DNN as the second session.

Optionally, the network device is a mobility management network element or a unified data management network element.

Optionally, the second session is the $1^{st}$ session that has the S-NSSAI and the DNN and that is processed by the second session management network element for the terminal.

Optionally, the transceiver module 1102 is further configured to receive indication information from the mobility management network element, and the indication information is used to instruct to preferably select the policy control network element. For example, after selecting the policy control network element, the second session management network element sends a registration request including the identifier of the policy control network element to the unified data management network element.

All related content of the steps in the foregoing method embodiments may be cited in function descriptions of corresponding function modules. Details are not described herein again.

In this embodiment, the second session management network element 110 is presented in a form of function modules obtained through division performed in an integrated manner. The "module" herein may be a specific ASIC, a circuit, a processor and a memory that execute one or more software programs or firmware programs, an integrated logic circuit, and/or another component that can provide the foregoing functions. In a simple embodiment, a person skilled in the art may figure out that the second session management network element 110 may be in a form shown in FIG. 4.

For example, the processor 401 in FIG. 4 may invoke the computer executable instruction stored in the memory 403, so that the second session management network element 110 performs the policy control methods in the foregoing method embodiments.

Specifically, functions/implementation processes of the transceiver module 1102 and the processing module 1101 in FIG. 11 may be implemented by the processor 401 in FIG. 4 by invoking the computer executable instruction stored in the memory 403. Alternatively, functions/implementation processes of the processing module 1101 in FIG. 11 may be implemented by the processor 401 in FIG. 4 by invoking the computer executable instruction stored in the memory 403, and functions/implementation processes of the transceiver module 1102 in FIG. 11 may be implemented by the communications interface 404 in FIG. 4.

The second session management network element 110 provided in this embodiment may perform the foregoing policy control methods. Therefore, for technical effects that can be achieved by the second session management network element 110, refer to the foregoing method embodiments. Details are not described herein again.

Optionally, an embodiment of this application further provides an apparatus (for example, the apparatus may be a chip system). The apparatus includes a processor, configured to support a second session management network element in implementing the foregoing policy control methods, for example, in selecting a policy control network element in a process of establishing a second session of a terminal. In a possible design, the apparatus further includes a memory. The memory is configured to store a program instruction and data that are necessary for the second management network element. Certainly, the memory may not be in the apparatus. When the apparatus is a chip system, the apparatus may include a chip, or may include a chip and another discrete component. This is not specifically limited in this embodiment of this application.

Figure 15:
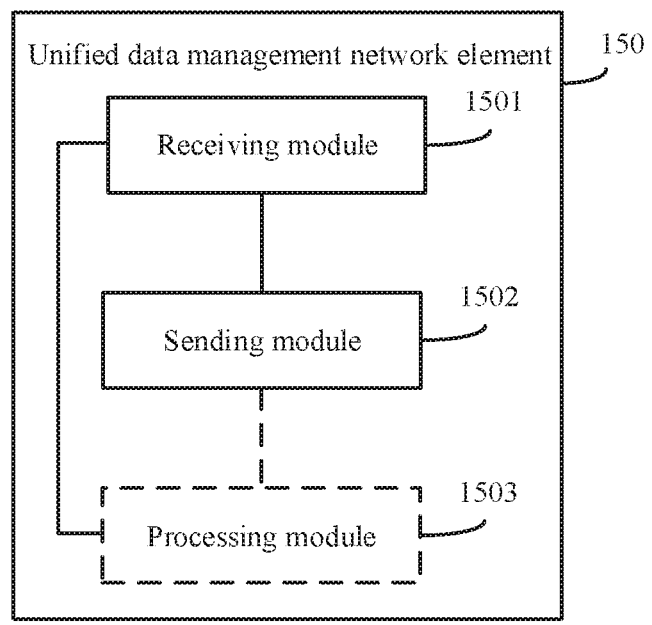
FIG. 15 is a schematic structural diagram of a unified data management network element according to an embodiment of this application.

Alternatively, for example, when function modules are obtained through division performed in an integrated manner, FIG. 15 is a schematic structural diagram of a unified data management network element 150. The unified data management network element 150 includes a receiving module 1501 and a sending module 1502. The receiving module 1501 is configured to receive a registration request from a first session management network element. The registration request includes an identifier of a terminal, and an S-NSSAI and a DNN that correspond to a first session that is of the terminal and that is being established. The sending module 1502 is configured to send indication information to the first session management network element. The indication information is used to instruct the first session management network element to obtain an identifier of a policy control network element from a binding support network element; or the indication information is used to indicate that a session that is of the terminal and that has the same S-NSSAI and the same DNN as the first session is established; or the indication information is used to indicate that the first session has corresponding binding information.

Optionally, as shown in FIG. 15, the unified data management network element 150 may further include a processing module 1503. The processing module 1503 is configured to determine that the first session that is of the terminal and that is being established has the same S-NSSAI and the same DNN as an established second session of the terminal.

Optionally, the processing module 1501 is further configured to determine that the terminal establishes the first session in a non-roaming scenario or a home routing scenario.

All related content of the steps in the foregoing method embodiments may be cited in function descriptions of corresponding function modules. Details are not described herein again.

In this embodiment, the unified data management network element 150 is presented in a form of function modules obtained through division performed in an integrated manner. The "module" herein may be a specific ASIC, a circuit, a processor and a memory that execute one or more software programs or firmware programs, an integrated logic circuit, and/or another component that can provide the foregoing functions. In a simple embodiment, a person skilled in the art may figure out that the unified data management network element 150 may be in a form shown in FIG. 4.

For example, the processor 401 in FIG. 4 may invoke the computer executable instruction stored in the memory 403, so that the unified data management network element 150 performs the policy control methods in the foregoing method embodiments.

Specifically, functions/implementation processes of the receiving module 1501, the sending module 1502, and the processing module 1503 in FIG. 15 may be implemented by the processor 401 in FIG. 4 by invoking the computer executable instruction stored in the memory 403. Alternatively, functions/implementation processes of the processing module 1503 in FIG. 15 may be implemented by the processor 401 in FIG. 4 by invoking the computer executable instruction stored in the memory 403, and functions/implementation processes of the receiving module 1501 and the sending module 1502 in FIG. 15 may be implemented by the communications interface 404 in FIG. 4.

The unified data management network element 150 provided in this embodiment may perform the foregoing policy control methods. Therefore, for technical effects that can be achieved by the unified data management network element 150, refer to the foregoing method embodiments. Details are not described herein again.

Optionally, an embodiment of this application further provides an apparatus (for example, the apparatus may be a chip system). The apparatus includes a processor, configured to support a unified data network element in implementing the foregoing policy control methods, for example, in determining that a first session that is of a terminal and that is being established has the same S-NSSAI and the same DNN as an established second session of the terminal. In a possible design, the apparatus further includes a memory. The memory is configured to store a program instruction and data that are necessary for the unified data management network element. Certainly, the memory may not be in the apparatus. When the apparatus is a chip system, the apparatus may include a chip, or may include a chip and another discrete component. This is not specifically limited in this embodiment of this application.

Figure 16:
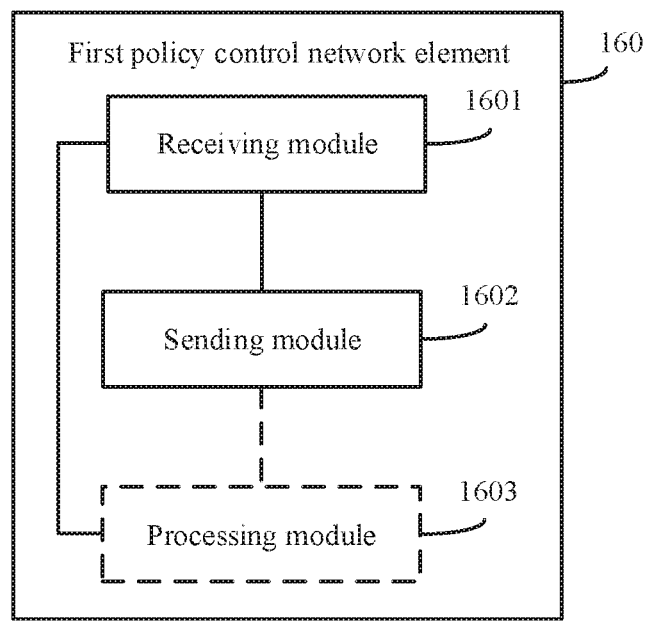
FIG. 16 is a schematic structural diagram of a first policy control network element according to an embodiment of this application.

Alternatively, for example, when function modules are obtained through division performed in an integrated manner, FIG. 16 is a schematic structural diagram of a first policy control network element 160. The first policy control network element 160 includes a receiving module 1601 and a sending module 1602.

In a possible implementation, the receiving module 1601 is configured to receive a policy control creation request from a first session management network element, and the policy control creation request includes an identifier of a terminal, S-NSSAI, and a DNN. The sending module 1602 is configured to send the identifier of the terminal, the S-NSSAI, the DNN, and an identifier of the first policy control network element 160 to a binding support network element. The receiving module 1601 is further configured to receive an identifier of a second policy control network element from the binding support network element. The sending module 1602 is further configured to send the identifier of the second policy control network element to the first session management network element, and the identifier of the second policy control network element is an identifier that is of a policy control network element, that corresponds to the identifier of the terminal, the S-NSSAI, and the DNN, and that is stored by the binding support network element.

Optionally, as shown in FIG. 16, the first policy control network element 160 further includes a processing module 1603. The processing module 1603 is configured to determine that a same policy control network element needs to be selected for a combination of the identifier of the terminal, the S-NSSAI, and the DNN. The sending module 1602 is further configured to send indication information to the binding support network element, and the indication information is used to instruct to select the same policy control network element for the combination of the identifier of the terminal, the S-NSSAI, and the DNN.

In another possible implementation, the receiving module 1601 is configured to receive a policy control creation request from a first session management network element, and the policy control creation request includes an identifier of a terminal, S-NSSAI, and a DNN. The sending module 1602 is configured to send, to a binding support network element, the identifier of the terminal, the S-NSSAI, the DNN, and an identifier of a first policy control network element set to which the first policy control network element belongs. The receiving module 1601 is further configured to receive an identifier of a second policy control network element set from the binding support network element. The sending module 1602 is further configured to send the identifier of the second policy control network element set to the first session management network element, and the identifier of the second policy control network element set is an identifier that is of a policy control network element set, that corresponds to the identifier of the terminal, the S-NSSAI, and the DNN, and that is stored by the binding support network element.

Optionally, as shown in FIG. 16, the first policy control network element 160 further includes a processing module 1603. The processing module 1603 is configured to determine that a same policy control network element set needs to be selected for a combination of the identifier of the terminal, the S-NSSAI, and the DNN. The sending module 1602 is configured to send indication information to the binding support network element, and the indication information is used to instruct to select the same policy control network element set for the combination of the identifier of the terminal, the S-NSSAI, and the DNN.

All related content of the steps in the foregoing method embodiments may be cited in function descriptions of corresponding function modules. Details are not described herein again.

In this embodiment, the first policy control network element 160 is presented in a form of function modules obtained through division performed in an integrated manner. The "module" herein may be a specific ASIC, a circuit, a processor and a memory that execute one or more software programs or firmware programs, an integrated logic circuit, and/or another component that can provide the foregoing functions. In a simple embodiment, a person skilled in the art may figure out that the first policy control network element 160 may be in a form shown in FIG. 4.

For example, the processor 401 in FIG. 4 may invoke the computer executable instruction stored in the memory 403, so that the first policy control network element 160 performs the policy control methods in the foregoing method embodiments.

Specifically, functions/implementation processes of the receiving module 1601, the sending module 1602, and the processing module 1603 in FIG. 16 may be implemented by the processor 401 in FIG. 4 by invoking the computer executable instruction stored in the memory 403. Alternatively, functions/implementation processes of the processing module 1603 in FIG. 16 may be implemented by the processor 401 in FIG. 4 by invoking the computer executable instruction stored in the memory 403, and functions/implementation processes of the receiving module 1601 and the sending module 1602 in FIG. 16 may be implemented by the communications interface 404 in FIG. 4.

The first policy control network element 160 provided in this embodiment may perform the foregoing policy control methods. Therefore, for technical effects that can be achieved by the first policy control network element 160, refer to the foregoing method embodiments. Details are not described herein again.

Optionally, an embodiment of this application further provides an apparatus (for example, the apparatus may be a chip system). The apparatus includes a processor, configured to support a first policy control network element in implementing the foregoing policy control methods, for example, in determining that a same policy control network element needs to be selected for a combination of an identifier of a terminal, S-NSSAI, and a DNN. In a possible design, the apparatus further includes a memory. The memory is configured to store a program instruction and data that are necessary for the first policy control network element. Certainly, the memory may not be in the apparatus. When the apparatus is a chip system, the apparatus may include a chip, or may include a chip and another discrete component. This is not specifically limited in this embodiment of this application.

Figure 17:
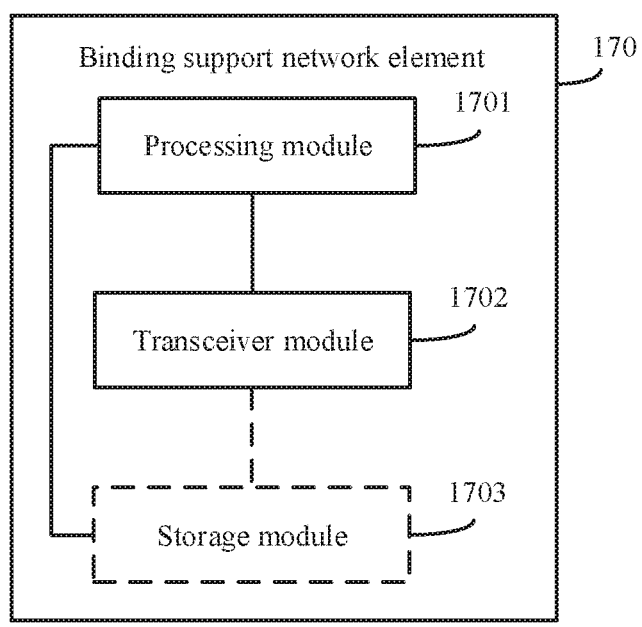
FIG. 17 is a schematic structural diagram of a binding support network element according to an embodiment of this application.

Alternatively, for example, when function modules are obtained through division performed in an integrated manner, FIG. 17 is a schematic structural diagram of a binding support network element 170. The binding support network element 170 includes a processing module 1701 and a transceiver module 1702.

In a possible implementation, the transceiver module 1702 is configured to receive an identifier of a terminal, S-NSSAI, a DNN, and an identifier of a first policy control network element from a first policy control network element. The processing module 1701 is configured to determine that an identifier that is of a second policy control network element and that corresponds to a combination of the identifier of the terminal, the S-NSSAI, and the DNN already exists. The transceiver module 1702 is further configured to send the identifier of the second policy control network element to the first policy control network element.

Optionally, as shown in FIG. 17, the binding support network element 170 further includes a storage module 1703. The transceiver module 1702 is further configured to receive the identifier of the terminal, the S-NSSAI, the DNN, and the identifier of the second policy control network element from the second policy control network element in a process of establishing a second session. The storage module 1703 is configured to store a correspondence between the identifier of the second policy control network element and the combination of the identifier of the terminal, the S-NSSAI, and the DNN.

Optionally, the transceiver module 1702 is further configured to receive indication information from the first policy control network element, and the indication information is used to instruct to select a same policy control network element for the combination of the identifier of the terminal, the S-NSSAI, and the DNN. The processing module 1701 is further configured to determine, based on the indication information, to send the identifier of the second policy control network element to the first policy control network element.

In another possible implementation, the transceiver module 1702 is configured to receive, from a first policy control network element, an identifier of a terminal. S-NSSAI, a DNN, and an identifier of a first policy control network element set to which a first policy control network element belongs. The processing module 1701 is configured to determine that an identifier that is of a second policy control network element set and that corresponds to a combination of the identifier of the terminal, the S-NSSAI, and the DNN already exists. The transceiver module 1702 is further configured to send the identifier of the second policy control network element set to the first policy control network element.

Optionally, as shown in FIG. 17, the binding support network element 170 further includes a storage module 1703. The transceiver module 1702 is further configured to receive, from a second policy control network element in a process of establishing a second session, the identifier of the terminal, the S-NSSAI, the DNN, and the identifier of the second policy control network element set to which the second policy control network element belongs. The storage module 1703 is configured to store a correspondence between the identifier of the second policy control network element set and the combination of the identifier of the terminal, the S-NSSAI, and the DNN.

Optionally, the transceiver module 1702 is further configured to receive indication information from the first policy control network element, and the indication information is used to instruct to select a same policy control network element set for the combination of the identifier of the terminal, the S-NSSAI, and the DNN. The processing module 1701 is further configured to determine, based on the indication information, to send the identifier of the second policy control network element set to the first policy control network element.

All related content of the steps in the foregoing method embodiments may be cited in function descriptions of corresponding function modules. Details are not described herein again.

In this embodiment, the binding support network element 170 is presented in a form of function modules obtained through division performed in an integrated manner. The "module" herein may be a specific ASIC, a circuit, a processor and a memory that execute one or more software programs or firmware programs, an integrated logic circuit, and/or another component that can provide the foregoing functions. In a simple embodiment, a person skilled in the art may figure out that the binding support network element 170 may be in a form shown in FIG. 4.

For example, the processor 401 in FIG. 4 may invoke the computer executable instruction stored in the memory 403, so that the binding support network element 170 performs the policy control methods in the foregoing method embodiments.

Specifically, functions/implementation processes of the transceiver module 1702, the processing module 1701, and storage module 1703 in FIG. 17 may be implemented by the processor 401 in FIG. 4 by invoking the computer executable instruction stored in the memory 403. Alternatively, functions/implementation processes of the processing module 1701 in FIG. 17 may be implemented by the processor 401 in FIG. 4 by invoking the computer executable instruction stored in the memory 403, functions/implementation processes of the transceiver module 1702 in FIG. 17 may be implemented by the communications interface 404 in FIG. 4, and functions/implementation processes of the storage module 1703 in FIG. 17 may be implemented by the memory 403 in FIG. 4.

The binding support network element 170 provided in this embodiment may perform the foregoing policy control method. Therefore, for technical effects that can be achieved by the binding support network element 170, refer to the foregoing method embodiments. Details are not described herein again.

Optionally, an embodiment of this application further provides an apparatus (for example, the apparatus may be a chip system). The apparatus includes a processor, configured to support a binding support network element in implementing the foregoing policy control methods, for example, in determining that an identifier that is of a second policy control network element and that corresponds to a combination of an identifier of a terminal. S-NSSAI, and a DNN already exists. In a possible design, the apparatus further includes a memory. The memory is configured to store a program instruction and data that are necessary for the binding support network element. Certainly, the memory may not be in the apparatus. When the apparatus is a chip system, the apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center through a wired (for example, a coaxial cable, an optical fiber, or a digital subscriber line (DSL)) manner or a wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) "does not exclude another component or another step, and" a "or" one" does not exclude a case of a plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, it is apparent that various modifications and combinations may be made to them without departing from the spirit and scope of this application. Correspondingly, the specification and accompanying drawings are merely examples for description of this application defined by the appended claims, and are considered as any or all of modifications, variations, combinations, or equivalents that cover the scope of this application. It is clearly that, a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A policy control system, comprising a first session management network element and a first policy control network element, wherein:
    the first session management network element is configured to send a policy control creation request to the first policy control network element, wherein the policy control creation request comprises an identifier of a terminal, single network slice selection assistance information (S-NSSAI), and a data network name (DNN);
    the first policy control network element is configured to: receive the policy control creation request from the first session management network element, and send the identifier of the terminal, the S-NSSAI, the DNN to a binding support network element;
    the first policy control network element is further configured to: receive an identifier of a second policy control network element from the binding support network element, and send the identifier of the second policy control network element to the first session management network element, wherein the identifier of the second policy control network element is an identifier that is of a policy control network element, that corresponds to the identifier of the terminal, the S-NSSAI, and the DNN, and that is stored by the binding support network element; and
    the first session management network element is further configured to: receive the identifier of the second policy control network element from the first policy control network element, and select the second policy control network element for a first session based on the identifier of the second policy control network element.

2. The policy control system according to claim 1, wherein
    the first session management network element is further configured to receive, from a first mobility management network element, a first request message used to create the first session, wherein the first request message comprises the identifier of the terminal, the S-NSSAI, and the DNN; and
    the first session management network element is further configured to select the first policy control network element for the first session.

3. The policy control system according to claim 1, wherein
    the first policy control network element is further configured to determine that a same policy control network element needs to be selected for a combination of the identifier of the terminal, the S-NSSAI, and the DNN; and
    the first policy control network element is further configured to send indication information to the binding support network element, wherein the indication information is used to instruct the binding support network element to select the same policy control network element for the combination of the identifier of the terminal, the S-NSSAI, and the DNN.

4. The policy control system according to claim 3, wherein the binding support network element is further configured to: receive the indication information from the first policy control network element; and determine, based on the indication information, to send the identifier of the second policy control network element to the first policy control network element.

5. The policy control system according to claim 3, wherein that the first policy control network element is further configured to send indication information to the binding support network element comprises:
    the first policy control network element is further configured to send the indication information to the binding support network element when determining that the terminal establishes the first session in a non-roaming scenario or a home routing scenario.

6. The policy control system according to claim 1, wherein the binding support network element is further configured to: determine that an identifier that is of a second policy control network element and that corresponds to a combination of the identifier of the terminal, the S-NSSAI, and the DNN already exists; and send the identifier of the second policy control network element to the first policy control network element.

7. The policy control system according to claim 1, wherein the policy control system further comprises a second session management network element, the second policy control network element, and the binding support network element;
    the second session management network element is configured to receive, from a second mobility management network element, a second request message used to create a second session, wherein the second request message comprises the identifier of the terminal, the S-NSSAI, and the DNN;
    the second session management network element is configured to: select the second policy control network element for the second session, and send a policy control creation request to the second policy control network element, wherein the policy control creation request comprises the identifier of the terminal, the S-NSSAI, and the DNN;

the second policy control network element is configured to: receive the policy control creation request from the second session management network element, and send the identifier of the terminal, the S-NSSAI, the DNN, and the identifier of the second policy control network element to the binding support network element; and the binding support network element is configured to: receive the identifier of the terminal, the S-NSSAI, the DNN, and the identifier of the second policy control network element from the second policy control network element, and store a correspondence between the identifier of the second policy control network element and the combination of the identifier of the terminal, the S-NSSAI, and the DNN.

8. A policy control method, wherein the method comprises:

sending, by a first session management network element, a policy control creation request to a first policy control network element, wherein the policy control creation request comprises an identifier of a terminal, single network slice selection assistance information (S-NSSAI), and a data network name (DNN);

receiving, by the first policy control network element, the policy control creation request from the first session management network element;

sending, by the first policy control network element, the identifier of the terminal, the S-NSSAI, the DNN to a binding support network element; and receiving, by the first policy control network element, an identifier of a second policy control network element from the binding support network element, and sending the identifier of the second policy control network element to the first session management network element, wherein the identifier of the second policy control network element is an identifier that is of a policy control network element, that corresponds to the identifier of the terminal, the S-NSSAI, and the DNN, and that is stored by the binding support network element; and receiving, by the first session management network element, the identifier of the second policy control network element.

9. The policy control method according to claim 8, wherein the method further comprises:

receiving, by the first session management network element, from a first mobility management network element, a first request message used to create a first session, wherein the first request message comprises the identifier of the terminal, the S-NSSAI, and the DNN; and selecting, by the first session management network element, the first policy control network element for the first session.

10. The policy control method according to claim 8, wherein the method further comprises:

determining, by the first policy control network element, that a same policy control network element needs to be selected for a combination of the identifier of the terminal, the S-NSSAI, and the DNN; and sending, by the first policy control network element, indication information to the binding support network element, wherein the indication information instructs the binding support network element to select the same policy control network element for the combination of the identifier of the terminal, the S-NSSAI, and the DNN; and receiving, by the binding support network element, the indication information.

11. The policy control method according to claim 10, wherein the method further comprises:

determining, by the binding support network element based on the indication information, to send the identifier of the second policy control network element to the first policy control network element.

12. The policy control method according to claim 10, wherein the method further comprises:

sending, by the first policy control network element, the indication information to the binding support network element when determining that the terminal establishes a first session in a non-roaming scenario or a home routing scenario.

13. The policy control method according to claim 8, wherein the method further comprises:

determining, by the binding support network element, that an identifier that is of a second policy control network element and that corresponds to a combination of the identifier of the terminal, the S-NSSAI, and the DNN already exists; and sending, by the binding support network element, the identifier of the second policy control network element to the first policy control network element.

14. The policy control method according to claim 8, wherein the method further comprises:

sending, by a second mobility management network element, a second request message used to create a second session to a second session management network element, wherein the second request message comprises the identifier of the terminal, the S-NSSAI, and the DNN;

receiving, by the second session management network element from the second mobility management network element, the second request message;

selecting, by the second session management network element, the second policy control network element for the second session; and sending, by the second session management network element, a policy control creation request to the second policy control network element, wherein the policy control creation request comprises the identifier of the terminal, the S-NSSAI, and the DNN;

receiving, by the second policy control network element, the policy control creation request from the second session management network element, and sending the identifier of the terminal, the S-NSSAI, the DNN, and the identifier of the second policy control network element to the binding support network element; and receiving, by the binding support network element, the identifier of the terminal, the S-NSSAI, the DNN, and the identifier of the second policy control network element from the second policy control network element; and storing, by the binding support network element, a correspondence between the identifier of the second policy control network element and the combination of the identifier of the terminal, the S-NSSAI, and the DNN.

15. A first policy control network element, wherein the first policy control network element comprising:

at least one processor, and a memory storing computer-executable instructions;

wherein the computer-executable instructions, when executed by the at least one processor, cause the first policy control network element to:

receive a policy control creation request from a first session management network element, wherein the policy control creation request comprises an identifier of a terminal, single network slice selection assistance information (S-NSSAI) and a data network name (DNN);

send the identifier of the terminal, the S-NSSAI, the DNN to a binding support network element;

receive an identifier of a second policy control network element from the binding support network element; and send the identifier of the second policy control network element to the first session management network element, wherein the identifier of the second policy control network element is an identifier that is of a policy control network element, that corresponds to the identifier of the terminal, the S-NSSAI, and the DNN, and that is stored by the binding support network element.

16. The first policy control network element according to claim 15, wherein computer-executable instructions instruct the first policy control network element to:

determine that a same policy control network element needs to be selected for a combination of the identifier of the terminal, the S-NSSAI, and the DNN; and send indication information to the binding support network element, wherein the indication information instructs the binding support network element to select the same policy control network element for the combination of the identifier of the terminal, the S-NSSAI, and the DNN.

* * * * *